United States Patent
Vorbach

(10) Patent No.: US 9,734,064 B2
(45) Date of Patent: *Aug. 15, 2017

(54) SYSTEM AND METHOD FOR A CACHE IN A MULTI-CORE PROCESSOR

(71) Applicant: Hyperion Core Inc., Los Gatos, CA (US)

(72) Inventor: Martin Vorbach, Lingenfeld (DE)

(73) Assignee: Hyperion Core, Inc., Los Gatos, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 14/791,350

(22) Filed: Jul. 3, 2015

(65) Prior Publication Data

US 2016/0004639 A1 Jan. 7, 2016

Related U.S. Application Data

(63) Continuation of application No. 13/376,839, filed as application No. PCT/EP2010/003459 on Jun. 9, 2010, now Pat. No. 9,086,973.

(30) Foreign Application Priority Data

Jun. 9, 2009 (EP) .................................... 09007607
Jun. 15, 2009 (EP) .................................... 09007815
(Continued)

(51) Int. Cl.
*G06F 12/08* (2016.01)
*G06F 12/0815* (2016.01)
(Continued)

(52) U.S. Cl.
CPC .......... *G06F 12/0815* (2013.01); *G06F 9/526* (2013.01); *G06F 12/084* (2013.01);
(Continued)

(58) Field of Classification Search
CPC ............. G06F 12/0815; G06F 12/0811; G06F 12/0813; G06F 12/084; G06F 12/0842; G06F 12/0893; G06F 9/526
See application file for complete search history.

(56) References Cited

U.S. PATENT DOCUMENTS

| 5,381,533 A | 1/1995 | Peley et al. |
| 5,900,015 A | 5/1999 | Herger et al. |
(Continued)

FOREIGN PATENT DOCUMENTS

| GB | 2316204 A | 2/1998 |
| WO | 02071248 | 9/2002 |
(Continued)

OTHER PUBLICATIONS

European Patent Office, Examination Report for European Patent Application No. 10734026.7, Oct. 20, 2015, 9 pages.
(Continued)

*Primary Examiner* — Noura Zoubair
(74) *Attorney, Agent, or Firm* — IP Spring

(57) ABSTRACT

The invention relates to a multi-core processor system, in particular a single-package multi-core processor system, comprising at least two processor cores, preferably at least four processor cores, each of said a least two cores, preferably at least four processor core, having a local LEVEL-1 cache, a tree communication structure combining the multiple LEVEL-1 caches, the tree having at 1 a one node, preferably at least three nodes for a four processor. core multi-core processor, and TAG information is associated to data managed within the tree, usable in the treatment of the data.

19 Claims, 15 Drawing Sheets

(30) Foreign Application Priority Data

| | | | |
|---|---|---|---|
| Jul. 7, 2009 | (EP) | ................................ | 09008861 |
| Jan. 20, 2010 | (EP) | ................................ | 10000530 |
| Jan. 25, 2010 | (EP) | ................................ | 10000689 |
| Jan. 29, 2010 | (EP) | ................................ | 10000920 |
| Feb. 12, 2010 | (EP) | ................................ | 10001453 |
| Feb. 12, 2010 | (EP) | ................................ | 10001454 |
| Mar. 2, 2010 | (EP) | ................................ | 10002122 |
| May 3, 2010 | (EP) | ................................ | 10004645 |

(51) Int. Cl.
*G06F 9/52* (2006.01)
*G06F 12/0811* (2016.01)
*G06F 12/0813* (2016.01)
*G06F 12/0842* (2016.01)
*G06F 12/0893* (2016.01)
*G06F 12/084* (2016.01)

(52) U.S. Cl.
CPC ...... *G06F 12/0811* (2013.01); *G06F 12/0813* (2013.01); *G06F 12/0842* (2013.01); *G06F 12/0893* (2013.01); *G06F 2212/271* (2013.01); *G06F 2212/50* (2013.01); *G06F 2212/62* (2013.01); *Y02B 60/1225* (2013.01)

(56) References Cited

U.S. PATENT DOCUMENTS

| | | | |
|---|---|---|---|
| 6,480,937 B1 | 11/2002 | Vorbach et al. | |
| 6,571,381 B1 | 5/2003 | Vorbach et al. | |
| 6,687,788 B2 | 2/2004 | Vorbach et al. | |
| 6,986,003 B1* | 1/2006 | Sipple | G06F 9/526 |
| | | | 711/122 |
| 6,990,555 B2* | 1/2006 | Vorbach | G06F 12/0811 |
| | | | 711/122 |
| 7,010,667 B2 | 3/2006 | Vorbach | |
| 7,120,755 B2 | 10/2006 | Jamil et al. | |
| 7,130,969 B2 | 10/2006 | Hum et al. | |
| 7,437,510 B2 | 10/2008 | Rosenbluth et al. | |
| 7,454,576 B2 | 11/2008 | Chen et al. | |
| 7,457,920 B1 | 11/2008 | Kornegay et al. | |
| 7,581,076 B2 | 8/2009 | Vorbach | |
| 7,590,803 B2 | 9/2009 | Wintergerst | |
| 7,595,659 B2 | 9/2009 | Vorbach | |
| 7,657,877 B2 | 2/2010 | Vorbach | |
| 2002/0073282 A1 | 6/2002 | Chauvelet et al. | |
| 2004/0148472 A1* | 7/2004 | Barroso | G06F 12/0817 |
| | | | 711/141 |
| 2005/0132344 A1 | 6/2005 | Vorbach | |
| 2006/0143384 A1 | 6/2006 | Hughes et al. | |
| 2006/0143396 A1 | 6/2006 | Cabot | |
| 2006/0143404 A1* | 6/2006 | Chen | G06F 12/04 |
| | | | 711/141 |
| 2007/0011433 A1 | 1/2007 | Vorbach | |
| 2007/0083730 A1 | 4/2007 | Vorbach | |
| 2008/0155197 A1* | 6/2008 | Li | G06F 9/4843 |
| | | | 711/130 |
| 2009/0216951 A1* | 8/2009 | Shum | G06F 9/3851 |
| | | | 711/124 |
| 2012/0216012 A1 | 8/2012 | Vorbach et al. | |

FOREIGN PATENT DOCUMENTS

| | | |
|---|---|---|
| WO | 2006072061 | 7/2006 |
| WO | 2008077267 | 7/2008 |
| WO | 2010043401 | 4/2010 |

OTHER PUBLICATIONS

USPTO, Final Office action for U.S. Appl. No. 13/376,839, Oct. 10, 2014, 26 pages.
USPTO, Non-final Office action for U.S. Appl. No. 13/376,839, Apr. 10, 2014, 30 pages.
USPTO, Notice of Allowance for U.S. Appl. No. 13/376,839, Jan. 21, 2015, 8 pages.
USPTO, Notice of Allowance for U.S. Appl. No. 13/376,839, Mar. 10, 2015, 8 pages.
ARM11 MPCore Processor Technical Reference Manual; Revision r2p0; ARM DDI 0360F; 728 pages; 2008.
Chapman, Barbara et al.; "Using OpenMP: Portable Shared Memory Parallel Programming;" The MIT Press; Cambridge, Massachusetts; 23 pages; 2008.
"OpenMP Application Program Interface;" Open MP Architecture Review Board; version 3.0; 326 pages; May 2008.
Rotenberg, Eric et al.; "Trace Cache: a Low Latency Approach to High Bandwidth Instruction Fetching;" Proceedings of the 29th annual ACM/IEEE international symposium on Microarchitecture; IEEE Computer Society; 12 pages; 1996.
Melvin, Stephen W. et al.; "Hardware support for large atomic units in dynamically scheduled machines;" Proceedings of the 21st annual workshop on Microprogramming and microarchitecture; IEEE Computer Society Press; 4 pages; 1988.
Funk, Mark et al.; "Of GigaHertz and CPWs: Version 2;" 14 pages; Jan. 30, 2010.
Dandamudi, Sivarama P.; "Fundamentals of Computer Organization and Design;" Springer-Verlag New York, Inc.; cover-p. 1060; 2003.
Intel Corporation; "Intel Architecture Software Developer's Manual: vol. 3: System Programming;" (Intel Order No. 243192); cover-p. INDEX-18; 1999.
Tanenbaum, Andrew S.; "Modern Operating Systems;" Pearson Education, Inc.; ISBN 10:0136006639; ISBN 13-978-0136006633; cover-p. 1072; 2009.
"Standard for Information Technology, Portable Operating System Interface (POSIX®), System Interfaces;" IEEE Std 1003.1™; IEEE and the Open Group; cover-p. 1716; 2004.

* cited by examiner

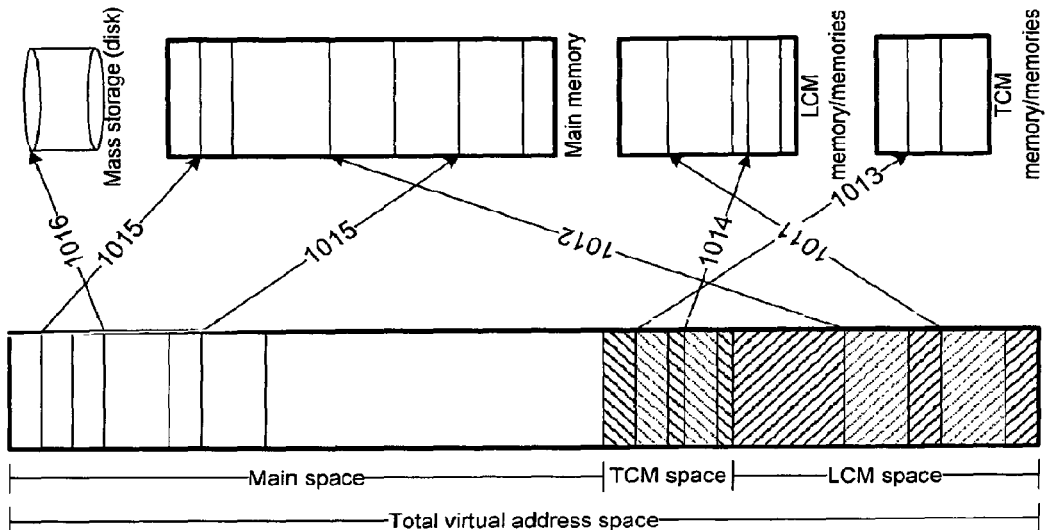
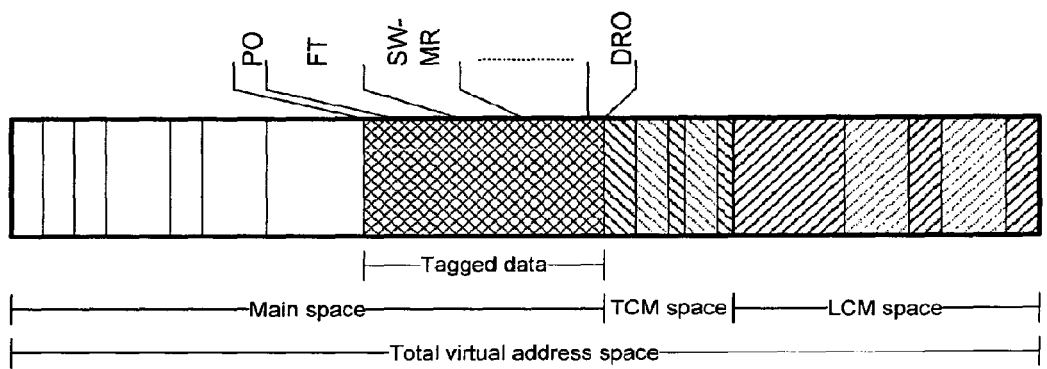
Fig. 10

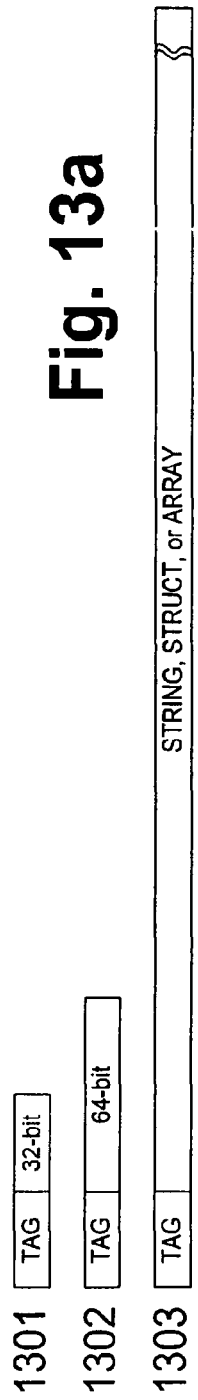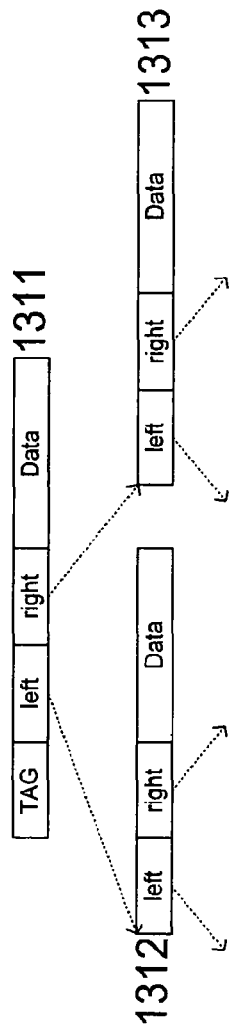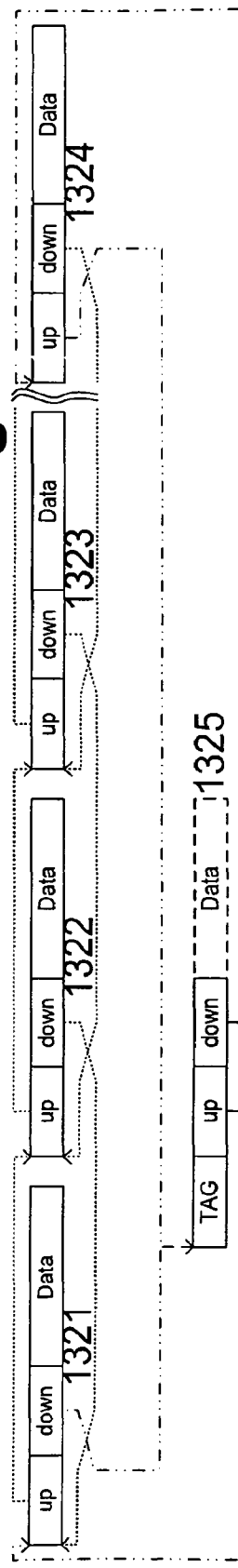
Fig. 13a
Fig. 13b
Fig. 13c

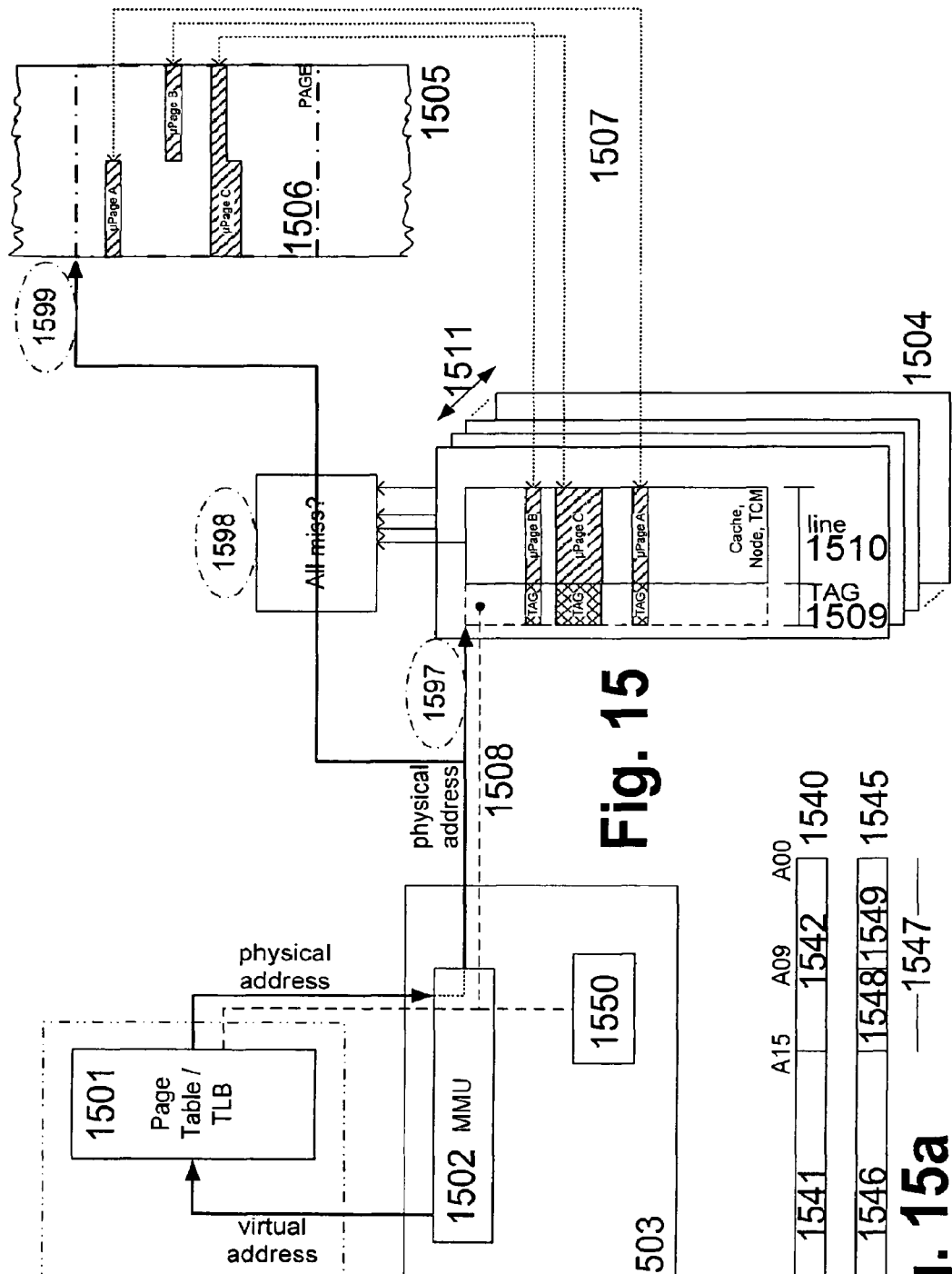

SYSTEM AND METHOD FOR A CACHE IN A MULTI-CORE PROCESSOR

CROSS-REFERENCE TO PRIOR APPLICATIONS

This application is a continuation of U.S. patent application Ser. No. 13/376,839, filed Feb. 6, 2012, which claims priority to PCT/EP2010/003459 which was filed on Jun. 9, 2010, which claims priority to the following applications:
EP 10000530.5 filed on 20 Jan. 2010
EP 10000689.9 filed on 25 Jan. 2010
EP 10000920.8 filed on 29 Jan. 2010
EP 10001453.9 filed on 12 Feb. 2010
EP 10001454.7 filed on 12 Feb. 2010
EP 10002122.9 filed on 2 Mar. 2010
EP 10004645.7 filed on 3 May 2010
EP 09007607.6 filed on 9 Jun. 2009
EP 09007815.5 filed on 15 Jun. 2009
EP 09008861.8 filed on 7 Jul. 2009, the contents of all of which are all incorporated herein by reference in their entirety.

BACKGROUND OF THE INVENTION

Traditional caches in multi-processor system operate independently. Data coherency between the caches is managed by coherency protocols, such as e.g. MESI, MOSI, MOESI, and others.

In those cache systems, the data of the same memory addresses may be duplicated and reside in multiple of the caches, wasting memory space and power and creating the need for coherency management.

A more advanced cache system for multi-core processors is disclosed in WO 2006/072061 A2 (PCT/US2005/047592), Hughes et al. in which each processor has a nearest cache, but yet has access to the caches of all other processors via a ring bus. A set of data related to a specific memory address is usually stored in solely one of the caches, but may be transferred from a cache to the cache nearest to the processor currently accessing the data.

However this method has various issues. The ring bus limits the scalability of the number of processor respective caches as it becomes inefficient. Furthermore moving data from one cache to another consumes significant time and energy.

BRIEF DESCRIPTION OF DRAWINGS

FIG. 10 is a diagrammatic illustration of an embodiment of a virtual address space having multiple sections to address memories;

FIG. 10a is a diagrammatic illustration of example mappings from a virtual address space into a physical address space;

FIG. 10b is a diagrammatic illustration of an example virtual address space including address space for tagged data;

FIG. 13a is a diagrammatic illustration of example words and other data with associated TAGs;

FIG. 13b is a diagrammatic illustration of an example tree structure including TAGs;

FIG. 13c is a diagrammatic illustration of an example double linked list using TAGs;

FIG. 15 is a diagrammatic illustration of a paging mode referred to as micro-paging used by a processor system; and FIG. 15a is a diagrammatic illustration of an example address arrangement for micro-paging.

Figure 1:
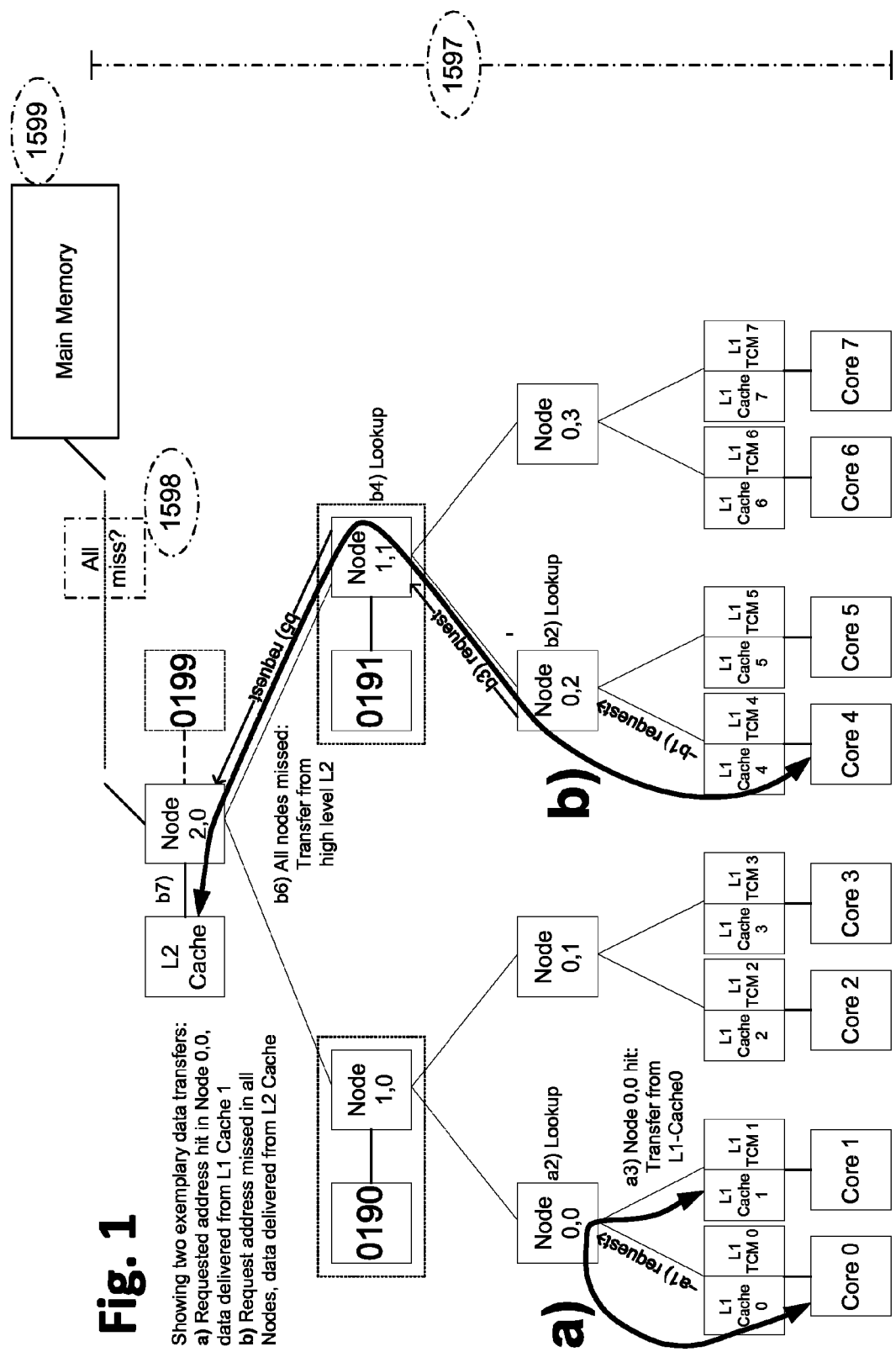
FIG. 1 is a block diagram illustrating a basic structure of a memory hierarchy tree.

Within the patent terms such as "processor", "processors" (plural) or "a plurality of processors" are used. They are related to multi processor computer systems, which are typically multi-core single-chip processors or multi-core multi chip-processors, with the plurality of chips being mounted within one single package.

Multi-chip processors are preferably being built of a stack of processor chips, the stack may comprise other chip structures, such as static and/or dynamic memories. For further details reference is made to PCT/EP 2009/007415, Vorbach, which will be used for further explanation of the implementation details and is incorporated by reference into this patent application for full disclosure.

Furthermore the described concepts are scalable, even up to system level. The inventive tree structure may be extended beyond a single processor (which may comprise a plurality of processors/processor cores) and used for multi processor systems, e.g. massive parallel computers (high performance computing) and/or multi processor mainboards, as they are used e.g. in server systems.

The present invention describes a new memory hierarchy for multicore processor architectures, such as e.g. the ZZYX processor, or other multicore processors such as the Intel Xeon, Pentium, Core2 and/or Larrabee, AMD processors, Tilera, or graphics processors such as ATI and nVidia (e.g. CUDA).

While the invention is already advantageous for multi-processor arrangements, it becomes even more efficient if at least some of the processors comprise a plurality of Load/Store-units and/or Address-Generators. Having the ability of accessing multiple memories or memory sections through a plurality of rather independent Load/Store-units and/or Address-Generators increases bandwidth and coherence problems significantly for state of the art implementations of the memory hierarchy.

It shall be noted that whereas hereinafter, frequently terms such as "each" or "every" and the like are used when certain preferred properties of elements of the architecture and so forth are described. This is done so in view of the fact that generally it may be highly preferred to have certain advantageous properties for each and every element of a group of similar elements. It will be obvious to the average skilled person however, that some if not all of the advantages of the present invention disclosed hereinafter might be obtainable, even if only to a lesser degree, if only some but not all similar elements of a group do have a particular property. Thus, the use of certain words such as "each", "any", "every" and so forth. is intended to disclose the preferred mode of invention and whereas it is considered feasible to limit any claim to only such preferred embodiments, it will be obvious that such limitations are not meant to restrict the scope of the disclosure to only the embodiments preferred.

It shall also be noted that notwithstanding the fact that a completely new architecture is disclosed hereinafter, several aspects of the disclosure are considered inventive per se, even in cases where other advantageous aspects described hereinafter are not realized.

The technology described in this patent is especially applicable on ZYXX processors as described in PCT/EP 2009/007415, Vorbach, which is fully incorporated by reference into this patent application by reference for detailed disclosure.

The ZZYX processor comprises multiple ALU-Blocks in an array with pipeline stages between each row of ALU-Blocks. Each ALU-BLOCK may comprise further internal pipeline stages. In contrast to reconfigurable processors data flows preferably in one direction only, in the following exemplary embodiments from top to bottom. Each ALU may execute a different instruction on a different set of data, whereas the structure may be understood as a MIMD (Multiple Instruction, Multiple Data) machine.

The ZZYX processor is optimized for loop execution. In contrast to traditional processors, instructions once issued to the ALUs may stay the same for a plurality of clock cycles, while multiple data words are streamed through the ALUs. Each of the multiple data words is processed based on the same temporarily fixed instructions. After a plurality of clock cycles, e.g. when the loop has terminated, the operation continues with one or a set of newly fetched, decoded and issued instruction(s).

The ZZYX processor provides sequential VLIW-like processing combined with superior dataflow and data stream processing capabilities. The ZZYX processor cores are scaleable in at least 3 ways:

1. The number of ALUs can be scaled at least two dimensionally according to the required processing performance; the term multi-dimensional is to refer to "more than one dimension". It should be noted that stacking several planes may lead to a three dimensional arrangement;
2. the amount of Load/Store units and/or Local Memory Blocks is scalable according to the data bandwidth required by the application;
3. the number of ZZYX cores per chip is scalable at least one dimensionally, preferably two or more dimensionally (in particular as definable by interconnection topology), according to the product and market. Low cost and low power mobile products (such as mobile phones, PDAs, cameras, camcorders and mobile games) may comprise only one or a very small amount of ZZYX cores, while high end consumer products (such as Home PCs, HD Settop Boxes, Home Servers, and gaming consoles) may have tens of ZZYX cores or more.

High end applications, such as HPC (high performance computing) systems, accelerators, servers, network infrastructure and high and graphics may comprise a very large number of interconnected ZZYX cores.

ZZYX processors may therefore represent one kind of multicore processor and/or chip multiprocessors (CMPs) architecture.

The major benefit of the ZZYX processor concept is the implicit software scalability. Software written for a specific ZZYX processor may run on single processor as well as on a multi processor or multicore processor arrangement without modification as will be obvious from the text following hereinafter. Thus, the software scales automatically according to the processor platform it is executed on.

The concepts of the ZZYX processor and the inventions described in this patent are applicable on traditional processors, multithreaded processors and/or multi-core processors. A traditional processor is understood as any kind of processor, which may be a microprocessor, such as an AMD Phenom, Intel Pentium, Core2 or Xeon, IBM's and Sony's CELL processor, ARM, Tensilica or ARC; but also DSPs such as the C64 family from TI, 3DSP, Starcore, or the Blackfin from Analog Devices.

The concepts disclosed are also applicable on reconfigurable processors, such as SiliconHive, IMEC's ADRES, the DRP from NEC, Stretch, or IPFlex; or multi-processors systems such as Picochip or Tilera. Most of the concepts, especially the memory hierarchy, local memories elements, and Instruction Fetch units as well as the basic processor model can be used in FPGAs, either by configuring the according mechanisms into the FPGAs or by implementing according hardwired elements fixedly into the silicon chip. FPGAs are known as Field Programmable Gate Arrays, well known from various suppliers such as XILINX (e.g. the Virtex or Spartan families), Altera, or Lattice.

The concepts disclosed are particularly well applicable on stream processors, graphics processors (GPU) as for example known from NVidia (e.g. GeForce, and especially the CUDA technology), ATI/AMD and Intel (e.g. Larrabee), and especially General Purpose Graphics Processors (GPGPU) also know from NVidia, ATI/AMD and Intel.

ZZYX processors may operate stand alone, or integrated partially, or as a core into traditional processors or FPGAs; it is noted that any such FPGA integrating a ZZYX processor as disclosed hereinafter will be or have coarse granular elements. While ZZYX may operate as a co-processor or thread re-source connected to a processor (which may be a microprocessor or DSP), it may be integrated into FPGAs as processing device. FPGAs may integrate just one ZZYX core or multiple ZZYX cores arranged in a horizontal or vertical stripe or as a multi-dimensional matrix.

All described embodiments are exemplary and solely for the purpose of outlining the inventive apparatuses and/or methods. Different aspects of the invention can be implemented or combined in various ways and/or within or together with a variety of other apparatuses and/or methods.

Various patent and literature documents which are incorporated by reference into this patent application for full disclosure and it is expressively stated, that using that methods within the scope of and in conjunction with this invention is regarded inventive per se and might be claimed.

Terminology:

In the context of this patent hardware terms referencing to a processor, such as "core", "processor core" and "processor" are used. The following shall be noted for defining the scope of the respective words in the disclosure:

Physically each of the terms may reference to a single core processor or core of a multi-core processor, while "processor" may also reference to the processor (chip) as a whole. From a hardware design consideration, the physical hardware is meant, as the hardware is ultimately the code executing and/or signal generating instance. However, as this patent closely interlinks hardware and software aspects, especially threads and their execution on a core and/or processor, the specific thread being currently executed on a core and/or processor is associated with the hardware term.

In the following, e.g. terms and wording such as " . . . preferred owner . . . " or " . . . a core/processor locking a mutex . . . ", or " . . . a core/processor setting/using a TAG . . . " are used, which references at hardware level to a core and/or processor. However, it shall be pointed out, that what is meant from a software perspective is often not a specific core and/or processor but a specific software task and/or thread being currently executed on a core and/or processor. Only at runtime the task and/or thread is assigned to a core and/or processor. This assignment may even change over time under control of e.g. a task and/or thread scheduler. Anyhow, as the executing, data and/or signal transferring, system control, etc. instance is a core and/or processor, the respective terms are used, implicitly referring to the currently executed task and/or thread too.

Nothing in this patent shall limit the terms core and/or processor to the pure hardware meaning One man skilled in the art understands, that the task and/or thread being executed is often implicitly addressed.

Accordingly, it will be understood that terms such as "processor", "core" and so forth can be used herein having a pure architectural meaning, but will also be used to have a software-related meaning. It is believed that the respective meaning will be obvious to the average skilled person.

However, in the claims as originally filed, the terms such as "core" and/or "processor" are narrowly used and are intended to be limited to the physical hardware, while the terms "task" and/or "thread" are respectively narrowly used and limited to the software code being executed, for allowing precise understanding and limitation of the scope of the claims. Applicant reserves his right to use a terminology such as "hardware core", "architectural core", "core in an architectural sense" and so forth should this be requested in the examination procedure of the present patent application.

The patent describes among other things TAGs. Some of the described TAGs may reference to cache address TAG memory in the state of the art. However, typically the TAGs according to this invention are used to define the treatment and/or type of data and should not be confused with the TAG memory of caches in the state of the art. Two types of such TAGs are described in the invention: i) Data TAGs defining e.g. the treatment of the data in the memory hierarchy; and ii) Lock-TAGs implementing software locking mechanism. In some embodiments either i) or ii) may be implemented. However in a preferred embodiment, both TAGs may be implemented. A lock-TAG could e.g. be implemented in one or a few bits of a TAG word, and the data-TAG may be implemented in a few other bits of the same TAG word. Nothing in the specification requires said TAGs to be used strictly exclusively or strictly combined.

Shown in the specification are processors or processor cores of a multi-processor/multi-core processor. It should be understood that not all processors or processor cores have to be identical. In some embodiments, different types may be implemented, e.g. a mix of at least some of standard processors, vector processors, graphic processors, configurable or reconfigurable processors. Obviously the list is not limited to the listed types. It may be even preferred, that the system is of heterogeneous architecture.

Furthermore, all or at least some of the processors and/or processor cores may be directly interconnected by a network structure for directly transmitting data among themselves, without using the inventive memory structure. Such direct interconnection networks are particularly beneficial for data stream processing (e.g. telecommunication, video, audio, imaging, multimedia), supporting the energy and/or bandwidth efficient direct transmission of data streams without bothering the memory hierarchy with the data transfers. Respective bus structures are known in the prior art, for example U.S. Pat. No. 7,010,667 and U.S. Pat. No. 7,595,659; which both are used for detailed explanation of the implementation details and are incorporated by reference into this patent application for full disclosure.

Some of the processors and/or processor cores may even be tightly coupled, e.g. a processor core with a tightly coupled reconfigurable coprocessor, a processor core with a tightly coupled vector coprocessor. In this case, a dedicated interconnection between such cores may be implemented. Particularly such cores may (at least partially) share the same Level-1 memory structure (e.g. Level-1 cache, local memory and/or Tightly Coupled Memory (TCM)). Such combinations are known in the prior art, for example U.S. Ser. No. 10/501,903; U.S. Ser. No. 10/561,135 and U.S. Ser. No. 10/551,891, all of them used for detailed explanation of the implementation details and are incorporated by reference into this patent application for full disclosure.

Within this specification terms such as "word" or "data word" are used. It shall be noted, that the size of "word" is not defined, rather a specific access is associated with the term. The size of "word" depends on the processor's word size and also on the type of data access. For example, if a character is accessed, "word" may reference to a single byte character; if a floating point value is accessed, "word" may reference to an 8-byte data word. Nothing in the specification shall limit the definition of "word" to a specific bit width.

Detailed Description of the Memory Hierarchy (Tree)

The following description discloses the structure of the inventive cache system, its operation and according software.

Each core comprises a coupled cache and/or local memory (Tightly Coupled Memory (TCM)), preferably closely connected or physically integrated. All the caches are connected via a tree-like communication structure to a higher level cache.

If the addressed data resides in the cache local to the respective core it may be delivered directly from the cache. If the data is not cached, the cache may send a request upwards in said communication tree.

Each node in the tree may check if it has access to the requested address, e.g. it may be located in a memory local to the node or anywhere in a node or leave below the node at a lower level. If the address can be located in the tree below, data communication will be established between the processor and the respective location.

If the address is not found, the request will be forwarded upwards in the tree to the next higher node.

FIG. 1 shows the basic structure and operation principle of the according tree.

The leaf nodes are constituted by the multiple cores of the processor, each core being coupled to a LEVEL-1 cache. The coupling between a core and its LEVEL-1 cache is preferably direct and close, to achieve fast response times at low latency and simultaneously high bandwidth. Preferably the cache and core are physically located close to each other or even integrated.

The root node is defined in this exemplary figure by the LEVEL-2 cache of the memory hierarchy.

The nodes between root and leaf nodes are subsequently referred to as "node".

FIG. 1 provides a simple exemplary overview of the invention, not all details and steps are disclosed, but will be described subsequently in great detail. Two data requests are shown, one in the left hand branch of the tree and another one in the right hand branch.

Description of the left hand branch transfer a): Core 0 requests data not stored in its local LEVEL-1 cache. In response to the cache miss, an address request (a1) is sent to the next higher level node (Node 0,0) within the tree. This node looks-up (a2) the requested address finding it in an entry of Core 1 and/or relays the request to the LEVEL-1 Cache of Core 1. This cache has the requested address cached and manages the request in response.

In response data is transferred from the LEVEL-1 cache of Core 1 to Core 0: either a single data transfer between the LEVEL-1 cache of Core 1 and the requesting Core 0 may be initiated, which may be e.g. a read, write, read-modify-write or semaphore lock, or a whole cache line is transferred via the tree from the LEVEL-1 cache of Core 1 into the LEVEL-1 cache of Core 0.

The relay can be achieved using several methods and implementations of the node, which will be described in great detail. In one embodiment the requesting Core 0 may already provide the target's cache address (the LEVEL-1 cache of Core 1), if a respective hardware support is implemented. One respective embodiment, the ATAG will also be described subsequently in detail.

While data is typically transferred at the time of the access by the executed task, in one embodiment data might be pre-loaded/prefetched into caches, and/or the subsequently described TCM and/or LCM memories. Preloading can be initiated for example:

i) by an executed task;
ii) speculative (e.g. driven by temporal or spatial locality and the likelihood that data surrounding a currently accessed address, will be required soon (see for example FIG. 14a,b,c of PCT/EP2009/007415, Vorbach));
iii) by code lookahead, pre-detecting memory access instructions and pre-calculating/-estimating the address;
iv) sorting memory load instructions in front of a thread, so that the data can be preloaded, before the thread starts (reference is made to U.S. Pat. No. 7,581,076 and U.S. Pat. No. 7,657,877, which methods are basically with slight modification applicable on threads and multiprocessors/multi-core processors). The respective documents are incorporated by reference within this specification for full disclosure and it is expressively claimed, that using that methods within the scope of this invention is regarded inventive per se and might be claimed.

Description of the Right Hand Branch Transfer b):
Core 4 requests data not stored in its local LEVEL-1 cache. The location if the address is unknown and none of the nodes Node 0,2 and Node 1,1 have access (b2, b4) to the respective address below via their children. The request is respectively relayed from each node to its superior node (b1, b3). The request is relayed (b5) to the root node (Node 2,0). Neither the root node nor its children have access to the requested address (b6). Ultimately the LEVEL-2 cache is checked, which has the requested address stored (b7).

In response data is transferred between Core 4 and the LEVEL-2 cache: e.g. either a single data transfer between the LEVEL-2 cache and the requesting Core 4 may be initiated, which may be e.g. a read, write, read-modify-write or semaphore lock, or a whole cache line is transferred down the tree into the LEVEL-1 cache of Core 4.

As said, the methods and implementation to relay the requests and data through the nodes will be subsequently described.

It shall be explicitly mentioned, that the invention is not limited for implementation between LEVEL-1 and LEVEL-2 caches. The structure can be implemented at any point within a memory hierarchy and between any caches. For instance could the tree even comprise own caches in at least some of the nodes, which would obviously shift the LEVEL-2 cache of FIG. 1 to an L(x) cache (note: x would be equal to 4 in case of FIG. 1).

Furthermore the invention is not limited to one LEVEL-2 cache only, there could be multiple LEVEL-2 caches on the root level. Also there is no limitation to use only one tree. In respect of bandwidth and response time, it could be beneficial to use multiple trees within a multi-core processor in parallel, in particular multiple, non-communicating trees, wherein preferably however the number of nodes in at least some trees is high, preferably at least three, preferably even higher.

The invention is applicable on multi-core processors, which comprise multiple processor cores on one single silicon chip. While by today usually the cache memories are integrated on the same silicon chip, the invention is applicable and beneficial for processors, in which at least some memories are located on another silicon chip. Preferably the multi-core processor chip and the memory chip are tightly coupled and integrated in one package. The tight coupling could be achieved using a MCM (Multi Chip Module) packaging technology or preferably a stacked chip technology, in which the chips are stacked one on top of each other.

The chips may be connected together via a common substrate, by physical connections directly between the two chips.

In one embodiment the LEVEL-2 cache and/or cache and memory structures above (e.g. LEVEL-3 cache) may be implemented on a separate silicon chip, while the LEVEL-1 caches and cores are implemented on another. The tree structure could be implemented on any of the two chips, best fitting the area, power consumption and technology constraints.

In another embodiment the LEVEL-1 cache could already be located on a separated silicon chip, so that one silicon chip is solely occupied by the processor cores.

Certainly more than two silicon chips may be used to implement a processor according to this invention. One embodiment could even comprise a chip stack or MCM of 4 silicon chips, a first one for the processor-cores, a second one for the LEVEL-1 caches, a third one for the tree and a fourth one for the LEVEL-2 cache.

One or more silicon dies, potentially stacked, mounted in a single package, e.g. an MCM, are understood and referenced to as a single package processor.

The invention is also applicable on multi-core or multi-cell co-processors, e.g. on graphics processors (GPUs) or general purpose graphics processors (GPGPU). Furthermore and especially the invention is applicable on configurable or reconfigurable processors or coprocessors, such as for instance Field Programmable Gate Array chips or systems (FPGAs).

Network processors benefit from this invention for both, the memory hierarchy and potentially even the data transmission network.

Various different constellations and implementations of the present invention are feasible and obvious for one skilled in the art.

Several Embodiments of a Node are Described in More Detail:

1. Node with lookup-table for address lookup

A node may determine via a lookup table, whether the data is available in one of the caches downwards or, if not, may repeat the request upwards in the tree.

If the data is cached downwards, the according cache may deliver the data via the tree structure to the requesting core. However, it should be noted that it is also feasible to transfer only information via the tree relating to the location and/or non-location of cached data and to establish the actual data transfer via a different data path once the location of data has been established. Accordingly, the node data traffic could be reduced.

The specific node contains a lookup table operating as address book, and data relaying capabilities.

2. Node with Cache

A node may comprise a full cache with the respective memory and operate as a cache instance of its own. Several implementations will be described subsequently, e.g. FIG. 1 shows a respective cache memory (0190, 0191) at stage 1 of the tree (0190 @ Node 1,0 and 0191 @ Node 1,1).

3. Relaying Node

A node may operate solely as data relay and as such does not comprise cache or lookup tables. It only forwards an incoming data transfer and/or data transfer request upwards and downwards and relays results or resulting handshakes back.

While inside a processor various nodes can be used, nodes with lookup-tables (directories) for address lookup (according to 1.) are preferred as they provide the best performance, size and power ratio.

Nodes with cache are large and consume significantly more power, also additional cache hierarchies may be in contradiction to the efficient data management of the basic tree based concept of this invention. However in systems where frequently a plurality of processors write to the same set of data, the best performance may be achieved, if the respective set of data is not transferred to the lowest level in the tree, but kept in a cache of a higher level node, where ideally all accessing processors may access with an almost equal latency.

Nodes solely relaying data lead to increased traffic in the tree, and by such increase bandwidth requirements and power consumption. Furthermore a full search has to be executed for all requests, which drastically increases the latency.

In some embodiments, nodes may record the history of data set transfers, e.g. to which nodes and/or branches a specific set of data has been transferred, whether it is still located there, flushed, invalidated, owned by a specific processor and/or shared between processors. The bookkeeping of the transfers and the directions of sets of data supports the fast localization of data sets within the tree. On embodiment of such a bookkeeping mechanism are the subsequently described Cache-lookup-Tables (CLT).

If the address is not available in any of the LEVEL-1 caches, the highest node may request the address from the LEVEL-2 cache.

The tree is not limited to a binary structure, means to the basis of 2, in which each node has two children. With a slightly more complex node, more than two children (or, remaining in the "tree" terminology, "branches") can be implemented. For instance, according to our analysis, nodes with 4 children appear to be a preferably compromise between node complexity and traffic latency. Note that each child may have further children. It should be noted that the number of "grandchildren" may differ from child to child and may differ from the number of children. Typically each node may require a latency of at least clock cycle for transmitting data. Therefore, binary trees (with a basis of 2) are rather inefficient as a large number of nodes is involved in a data transmission from one leaf of the tree (means core) to another. For rather small amounts of cores, a ring structure as described by Hughes may require less latency. Quadruple trees with a basis of 4 greatly reduce the number of nodes in the tree and therefore the latency of data transmissions.

Latency L can be calculated as follows:

1. Ring structure with n cores:

$$L = \frac{n}{2} - 1$$

2. Tree structure basis b with n cores:

$$L = (2 * \log_b n) - 1$$

Figure 2:
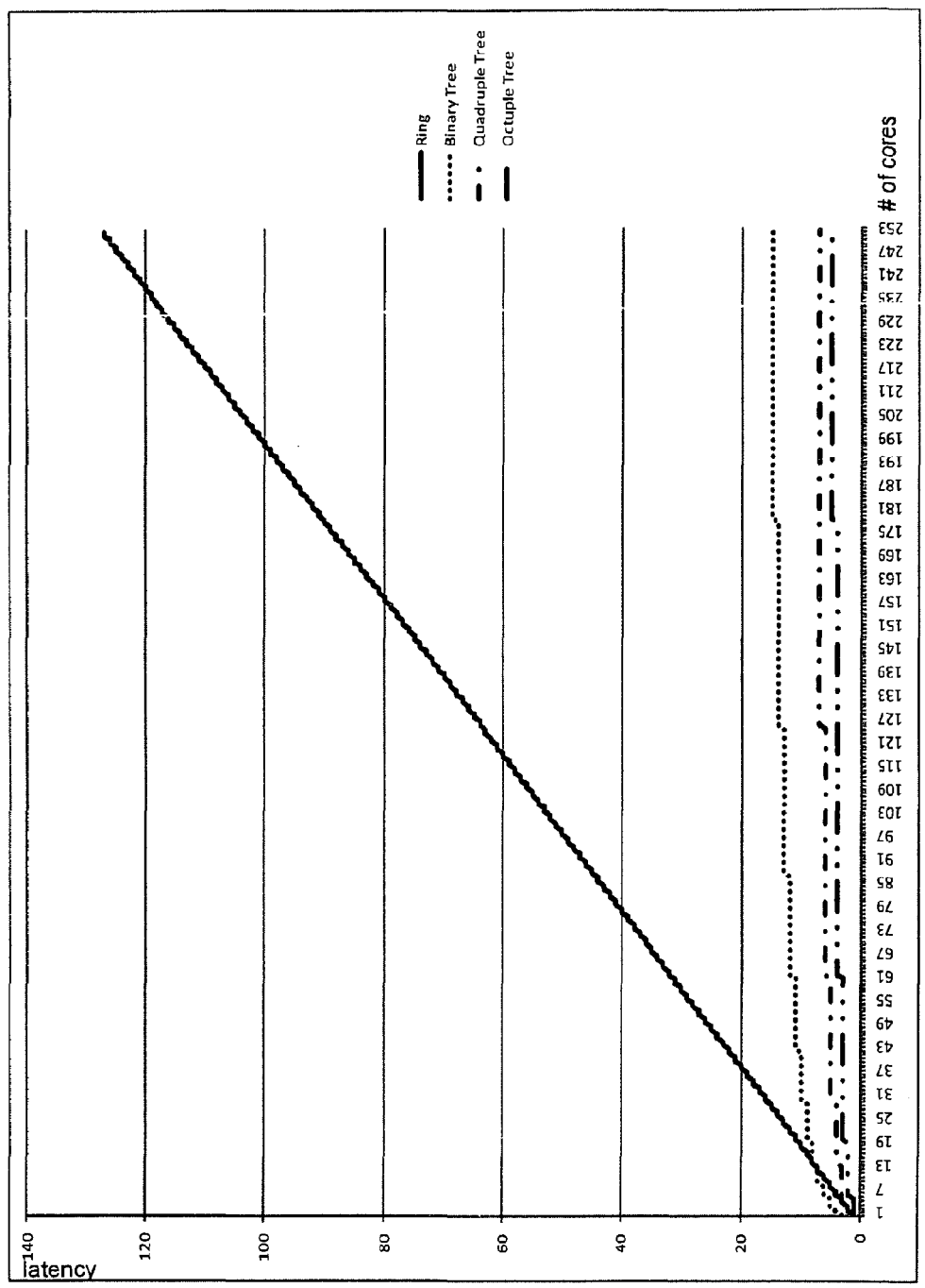
FIG. 2 is a diagrammatic illustration of a comparison between implementations of binary tree and ring structures.

A comparison between the various implementations is shown in FIG. 2. While the latency using a ring bus according to Hughes at al. increases drastically with increasing number of cores, the tree structures scale significantly better.

With increasing b the complexity of a node increases, but the latency of the data transfer decreases. This holds, until the node becomes so complex, that its size is either not economical any more or its internal structure requires latency of more than one clock cycle.

Octal-trees with a basis of 8 appear to be other candidates having a preferable ratio between node complexity and transmission latency.

Preferably no data is duplicated within the cache structure. Each address is cached only once in one of the caches local to the cores.

Hughes at al. describe a method to move cache lines from one cache molecule to another cache molecule closer to the requesting core. Therefore a saturation counter deciding after which number of accesses the line shall be moved is implemented in each cache line and bits are indicating the direction of the core. After the saturation counter reaches a predetermined maximum value, the line is moved to another cache closer to the requesting core, the direction is determined by said bits.

However at runtime this method proves highly inefficient.

First it is impossible to determine meaningful maximum values for the saturation counters for each of the cache lines in respect of each of the cores.

Second, due to the non deterministic nature of the move operation cache lines may be moved back and forth between the caches at runtime, depending on the saturation counters, causing significantly more traffic than necessary, and by such consuming energy, wasting bandwidth and increasing the probability of false cache misses.

Third, as cache and core are not physically coupled and the move operation does not transfer the cache line directly to the cache closest to or physically coupled with the requesting core. After moving the data, the position of the target cache will be still be inefficient in most cases. Therefore another move may be triggered to move the cache line again closer to the requesting core.

While it may be beneficial to move the cache line of requested data from the LEVEL-1 cache it resides in to the LEVEL-1 cache of the requesting processor. However, the move will consume time and energy and may even require the flush of a cache line of the requesting processor. Taken the time requirement for the flush and the move into account, it is rather preferable to keep the data in the original cache of the owning core and just move single data words as requested from the according cache to the requesting core; or move the cache line only if the requesting core accesses it significantly more often than the owning core and if so, only directly into the LEVEL-1 cache of the requesting core—which becomes subsequently, after the move of the cache line, the owning core.

The described invention overcomes the problems of the state of the art by significant improvements:
1. Preferably no saturation counters are used, and if, they are preferably not coupled to the cache lines but integral in at least one of the lookup tables of the nodes (CLTs) or in the subsequently described ATAGs of the cores LEVEL-1 caches.
2. Cache lines are not—if at all—moved, potentially even repeatedly, from one cache to another cache closer to the requesting core, but only in one single move from the cache if the owning core directly into the cache closely coupled to the requesting core.
3. As software design environments are able to determine the probability and frequency of accesses to specific addresses, e.g. by analysis of the code, heuristic approaches or statistics (e.g. via profiling), the core with the largest amount of data transfers and/or the highest frequency of accesses on a specific cache line may be determined as preferred owner of the cache line, referred to as the "preferred". The preferred owner may access the code by a special mechanism, e.g. an explicit load or store instruction or a specific protocol, and by such the data is either transferred from main memory or another cache into the cache physically coupled to the requesting core and remains there.

Cores not being preferred will not trigger a transfer of the cache line.

Using the strategies above it is highly beneficial if data potentially required by a core likely resides in a vicinity of the core, as in this case the transmission way through the tree structure is minimal, such reducing transmission time and power consumption.

Various strategies and methods are known in the state of the art to improve the locality of data; as for instance the one described in WO2008/077267, Wenlong et al. Cache lookup Table (CLT) In one embodiment at least some of the nodes, preferably all of them, may comprise a Cache lookup Table. The Cache lookup Table enables checking whether a requested address is stored in a cache below this node and is build similarly to a cache tag memory. An incoming address, either from another lower level or higher-level node, or from a core below is looked up, by splitting the address in two parts, one part of the address, typically the least significant part is used as address for the CLT memory. Some data delivered from the memory is compared with the remaining part of the address, if equal, the cache comprising the requested address is found. Another part of the data received from the CLT memory may indicate the respective cache by its address or a kind of specific identification (CacheID), or at least the direction where the cache is located.

If the requested address is not found, a miss (CLT-MISS) is indicated.

As a CLT may operate like a TAG memory, it has similar limitations. The principle operation of a TAG memory is described in the ATAG section. The most significant one is the limited amount of possible address lookups. Therefore CLTs are preferably multi-way associative. Yet, it cannot be guaranteed that all potential addresses can be hold in the CLT. Therefore a CLT-MISS is not a certain indication that the required address is not cached below the respective node. In case of a CLT-MISS the address request is therefore not only forwarded via the edges of the tree towards the next higher level node, but also through all lower level child nodes below the respective node to the LEVEL-1 caches, which will lookup the address. In case the requested address is found by a LEVEL-1 cache, it may report a hit back to the respective node.

If the associativity of the CLTs is sufficiently large, the correctness of an address lookup can be guaranteed. In this case, the checking of the nodes below can be avoided, such significantly improving the performance and bandwidth of the tree.

Respective CLTs may mirror all the TAGs of all nodes below and ultimately the leaves for providing the necessary associativity. For doing so, additional TAG memories are required to increase the associativity. Requests to lower levels are anyhow handled by a respective CLT, therefore a simple protocol can inform the respective CLT of the position of an address in the leaves and allow the correct update of its own mirrored TAG.

While providing respectively large TAG memories for the required associativity might be too expensive for higher nodes, at least lower level nodes close to the leaves may benefit of a positive cost performance ratio.

It shall be mentioned, that race conditions can occur, e.g. if due to latency or other timing aspects, a higher level node reports back faster than a lower level node. For example let us assume e.g. a Level-2 cache reports the availability of the requested address faster than e.g. a leaf node also comprising the address. In this case wrongly the Level-2 cache will be accessed. Such race condition can be avoided by implementing a respective protocol within the tree, for example:
1. Each node or leaf reports an address request either with a hit and a miss
2. Only after all reports arrived at the requesting node the direction of the data access is decided
3. If multiple nodes report a hit, depending on a defined policy, one node might be prioritized. Typically lower level nodes or leaves should have a higher priority.

In some preferred embodiments a CLT may comprise usage statistics and/or eviction methods, such as e.g. Least-Recently-Used (LRU) to increase the efficiency of the address lookup. Often and/or recently requested addresses may be stored in the CLT, while rarely and/or seldom used addresses may be evicted.

When a LEVEL-1 cache line is flushed, the according address lookup is deleted in all nodes. It may occur that the flush is not noted to or recognized by all CLTs. Therefore, if a node guides an address request to a LEVEL-1 cache in error due to a faulty entry in the CLT, the LEVEL-1 cache may report a CACHE-MISS back. In response the respective CLT entry will be corrected and the request will be broadcast as it would have been done in case of a CLT-MISS.

Alien TAG (ATAG)

In one embodiment at least some of the LEVEL-1 caches may comprise an Alien-TAG (ATAG) memory.

TAG memories are used to check the existence of a requested address in the respective cache. The requested address is split into (at least) two parts and one part (TAG-ADR), usually the least significant part, is used to address the TAG memory. The TAG memory provides the according data, which is compared with the remaining part (REMAINDER) of the re-quested address, if equal the requested address is cached. Typically multi-associative caches are used, comprising multiple TAG memories, and by such supporting to cache multiple sets of data with identical TAG-ADRs but different REMAINDERS.

According the present invention an additional TAG memory is attached to a LEVEL-1 cache. Whenever a requested address is found in an alien cache, the location if the alien cache is stored in the ATAG, by its address or a kind of specific identification (CacheID), or at least the direction where the cache is located.

In some embodiments an ATAG may be implemented with features of state of the art caches. For instance multi-associative ATAGs are preferred in typical embodiments, further more usage statistics and eviction methods, such as Least-Recently-Used (LRU) are preferably implemented.

Address not Cached by Preferred Owner

As described already, the core with the most frequent access to and/or the highest amount of data traffic with a specific cache line, may be declared as preferred. This could be done by various methods, e.g.
  i) implicitly in the binary of software, e.g. by declaration through a compiler, profiler, linker, another analysis tool or the programmer himself; and/or
  ii) by the operating system, e.g. by a task- or thread-scheduler, or a load balancer.

In one embodiment, a plurality of methods may be used simultaneously, e.g. a preliminary declaration is predefined according to i), which might be optimized according to runtime evaluations according to ii).

As said before, within the context of this patent, a software task and/or thread might be addressed from the software aspect by the terms core and/or processor. It shall be noted here, that the preferred owner is the core and/or processor currently executing the task and/or thread being the preferred owner of the respective data. This task and/or thread might be transferred from one processor to another over time. The hardware has to ensure that the data is correctly addressed, which is implicitly supported by the tree's address lookup and data movement features.

In all cases it may happen, that the specific cache line is accessed and cached by another core but the preferred first. As already described, the preferred can force the move of the respective cache line from the current owner's cache into its cache.

This could be done by various means, e.g. by
  a) issuing a specific MOVE command, initiation the move;
  b) forcing a FLUSH in the alien cache of the current owner and immediately requesting the data
  c) attaching a preferred flag to the address request and by such initiating the immediate move from the current owners ache into its own, if a CACHE-HIT happens.

Multiple Preferred Owners, or No Preferred Owner at all

It may happen that multiple preferred owners are concurrently executed on the processor. Many reasons exist, such as multiple threads or multiple tasks accessing the same data with similar frequency. Most part of the data space may not have any nominated preferred owner at all, as no analysis was done or the data is simply not often enough accessed to nominate preferred ownership.

While the saturation counters described by Hughes et al. are highly inefficient and not able to distinguish between multiple accessing cores, a timer system may be used in this invention. The counter attached to the cache line as disclosed by Hughes et al. is unable to actually monitor quasi simultaneous accesses from multiple cores within a specific time frame. It does not support a record per core, but only per direction. Therefore unnecessary and inefficient moves of the cache lines are initiated.

The problem is that Hughes et al. attach the counter to the data and therefore multiple requesting cores confuse the counter and obviously lead to false statistics.

In difference to Hughes at al. the access-statistics-timers of the present invention are not attached to the cache line of the data in the owning cores LEVEL-1 cache, but are located in the ATAGs of the LEVEL-1 cache of the requesting cores. As each of the cores may have its dedicated ATAG and therefore access-statistics-timer, the quasi simultaneous access of multiple cores to a specific cache line can be actually profiled: Each requester has a correct statistics in its dedicated access-statistics-timers located in its ATAG: If a requested address in an alien core is hold in the ATAG of the requesting core, the access-statistics-timer in the ATAG attached to the respective entry increments.

After a specific period of time, the access-statistics-timer is reset. If the value of the access-statistics-timer exceeds a specific maximum threshold before reset, the cache line is often enough accessed by the respective core to justify a move into its respective LEVEL-1 cache. A move request is issued, e.g. with the next address request.

In one embodiment together with the move request all CLTs may be invalidated or updated to the new residence of the data. All address requests into the cache line which has been moved may be put on hold by the CLTs until the complete line is moved and entirely stored in the target LEVEL-1 cache.

In one embodiment the threshold (TIMER-THRESHOLD) for all access-statistics-timers of the cores accessing a respective cache line may be automatically adapted in order to avoid inefficient moves.

Various strategies can be implemented. For instance could, in response to an access into a specific cache line, the last access-statistics-timer value (TIMER-MAX) of the current owner's ATAG before reset could be delivered back to the accessing core(s). The accessing core(s) in response update(s) the threshold (TIMER-THRESHOLD) of its/their respective access-statistics-timer to the received TIMER-MAX value. As a result, other requesting cores may initiate another move of the cache line back from the new owner's cache only, if they access the data at least as frequent as the new owner, which is true if the value of the requesting cores' access-statistics-timer exceeds the threshold (TIMER-THRESHOLD).

Various modifications are feasible, e.g. could TIMER-THRESHOLD be increased with each transfer of the ownership of a cache line from one LEVEL-1 cache to another by a defined offset in order to implement a hysteresis, further avoiding inefficient moving of cache lines. Furthermore TIMER-THRESHOLD could be reduced over time again, so that an owning core may not block the transfer of the cache line to other requesters unreasonably, e.g. if the frequency of requests of the current owner is going down. The reduction of TIMER-THRESHOLD can be achieved by returning the current owners last access-statistics-timer value (TIMER-MAX) before reset, possibly as said increased by an offset to implement a hysteresis, to requesting cores, which in response adjust their TIMER-THRESHOLD.

Additional Features of the Inventive Caches

The tree structure requires latency for data transfers between cores and alien caches. Those latencies may differ, depending on the distance of the requesting core from the alien cache. To ensure the program order preservation, maintain coherency and support atomic accesses, e.g. for semaphoring, cache lines may be locked by a requesting core for modification, e.g. for read-modify-write accesses. While locked, no other core is granted access to the data. There may be various level of locking, e.g. a shared-lock may allow for read accesses but not write accesses, while an exclusive-lock may not allow any accesses at all.

A shared-lock allows read accesses only and multiple threads can hold such a log in parallel. Exclusive locks can only ever be held by one thread, but they allow writing too. Note that an exclusive lock also conflicts with threads holding/wanting a shared lock.

In one embodiment upgradeable-locks may be supported: A thread gets a shared lock first and then optionally upgrades to an exclusive lock.

After the data modification is done by the core which locked the cache line, the line must be released by the same core.

Alternatively, a superior task, e.g. the operating system, a scheduler or debugger may unlock a cache line, even by another core. For supporting such operations, the superior task, e.g. the operating system, a scheduler or debugger may be executed in a more privileged protection domain, for instance in a more privileged ring in Protected Mode, Supervisor or Hypervisor Mode. (For an exemplary protection system reference is made to the "Intel Architecture Software Developers Manual; Intel Corporation, 1999; Volume 3: System Programming; Intel order number 243192). At the domain with the lowest privilege no instructions are supported to modify alien locks. Executing such instructions may cause a processor trap indicating the execution of an invalid instruction. However, such instructions may be executable at more privileged protection domains.

Data Set Duplication

In some cases it might be preferred to duplicate a set of dato related to a specific memory address. For example this may be the case, if a plurality of processors may require read access to the same set of data concurrently and/or frequently. Traversing through the tree structure becomes rather inefficient. In such cases the set of data may be duplicated and stored in a plurality of caches.

In case a processor requires write access to the set of data all instances within the tree may be locked.

Typically, locks are advisory locks, where each thread cooperates by acquiring the lock before accessing the corresponding data. Some systems may also implement mandatory locks, where attempting unauthorized access to a locked resource may force an exception in the entity attempting to make the access.

A (binary) semaphore, typically called mutex (as within this patent), is the simplest type of lock. In terms of access to the data, no distinction is made between shared (read only) or exclusive (read and write) modes. Other schemes provide for a shared mode, where several threads can acquire a shared lock for read-only access to the data. Other modes such as exclusive, intend-to-exclude and intend-to-upgrade are also widely implemented.

Independent of the type of lock chosen above, locks can be classified by what happens when the lock strategy prevents progress of a thread. Most locking designs block the execution of the thread requesting the lock until it is allowed to access the locked resource. A spinlock is a lock where the thread simply waits ("spins") until the lock becomes available. It is very efficient if threads are only likely to be blocked for a short period of time, as it avoids the overhead of operating system process re-scheduling. It is wasteful if the lock is held for a long period of time. In this case the execution of the respective thread is preferably temporarily stopped and another thread is activated (e.g. by the thread scheduler).

Locks may require hardware support for efficient implementation. This usually takes the form of one or more atomic instructions such as "test-and-set", "fetch-and-add" or "com-pare-and-swap". These instructions allow a single process to test if the lock is free, and if free, acquire the lock in a single atomic operation.

While the inventive method is applicable on all kinds of locks, semaphores and/or mutexes, a simple method is exemplary used, comprising 2 instructions:
1) Read-For-Ownership (RFO): reads a data word of the set of data and locks the respective set. The read and lock sequence is preferably atomic, with no other processor, task or thread being allowed to access the data word in between the read and set of the lock.
2) Write-For-Release (WFR): writes a data word into the set of data and unlocks the respective set.

Note, that depending on the implementation the accessed single data word could be locked or a larger block such as the respective cache line or memory page which contains the respective data word.

The lock signal (e.g. generated and/or represented by a Read-For-Ownership instruction) traverses through the tree. At each node the existence of a duplicate set of data to be locked is checked. The nodes process the lock signals in the following way:
1) The node forwards the lock signal downwards to the branches (but the one it came from):
   a. If the node supports a bookkeeping mechanism such as a directory (e.g. Cache-lookup-Table), the mechanism looks up the location of the data set. In case a duplicate exists in some of the branches of the node, the lock signal is forwarded into the related branches.
   It shall be noted, that this works only, if the CLT is guaranteed to be consistent with all nodes below (see the respective discussion earlier in this patent).
   However, this may not be true for all embodiments: Then the lock must always be distributed to all branches and a respective bus protocol within the tree may ensure atomic access and/or distribution.
   b. If the node does not support the lock signal is forwarded into all branches of the node.
2) And the node forwards the lock signal upwards to the node above, unless the lock signal came from the higher node.

Each keeper of a duplicate, which may be a leaf of the tree, a node (e.g. comprising a cache), and/or the memory structure located at the highest node (root) of the tree, locks the duplicate set of data and returns an acknowledge signal. Locked means, that: all further accesses from any processor but the locking one to the set of data of any type (e.g. read or write) are rejected or placed on hold.

Each node requires an incoming acknowledge on each edge previously a lock signal has been sent. Only if all edges received the acknowledge signal, the node itself may forward an acknowledge signal on that edge, on which it previously received the lock signal. Eventually the processor which has released the lock signal will receive the acknowledge signal that all duplicates in the hierarchy are locked for exclusive access by the very processor.

As said before, within the context of this patent, a software task and/or thread might be addressed from the hardware aspect by the terms core and/or processor. It shall be noted here, that locks are not operated by the core and/or processor hardware per se, but by the task and/or thread being executed by the core and/or processor. However, ultimately the core and/or processor is the executing instance and manages the hardware and memory accordingly.

When multiple threads are synchronized using any kind of locking mechanism, there is always a potential for deadlocks caused by conflicting dependencies. The concepts described in this specification may be no exception to that general rule.

Usually conflicting dependencies are introduced by the software and thus have to be considered a programming error. However, any implementation of locking mechanisms has to ensure not to introduce additional implicit dependencies that are not directly visible to the programmer. For example, if a memory access is denied due to a lock held by another thread, the scheduler must be able to schedule other threads, so that the lock is eventually released and the blocked thread can continue. The locking concepts introduced in this patent accordingly avoid additional dependencies, if implemented properly.

As discussed in this patent, in the preferred embodiment, the lock preferably comprises the ThreadID of the locking thread (and/or task). Therefore it is possible to move the thread and/or task owning a lock freely between cores and/or processors. As long as the ThreadID remains unchanged, the respective thread and/or task remains in control of the lock and can freely access it regardless of the core and/or processor executing the thread and/or task.

For clarification it shall be noted, that in the preferred embodiment, locks are controlled by threads and/or tasks and managed by the respective ThreadID, but not by a physical core and/or processor.

The processor may now write exclusively to the set of data, the written data is transferred through the tree to all duplicates to maintain coherence.

The final write transfer is (in the exemplary method) accomplished by a Write-For-Release instruction, which transfers the last write data through the tree and implicitly unlocks the receiving sets of data.

In case it cannot be determined at the time of the write instruction whether the set of data can be released, a release instruction (REL) may be used in the exemplary method to unlock the respective sets of data without any further data transmission.

The inventive approach may limit the control of TAGs and/or Locks solely to the owning thread. While this is one of the benefits of the invention, it may become troublesome, if other functions shall take control on purpose. E.g. may the Operating System need to kill a crashed, blocked or deadlocked thread.

For enabling the operating system to take control, instructions may be implemented in the core and/or processor to modify any TAGs and/or Locks in higher privileged code, e g running in protected mode, supervisor mode or a higher privileged ring.

Furthermore the TAG and/or Lock management may be implemented in the operating system, so that it can monitor the existence, and possibly the settings, of the TAGs and/or Locks. Threads and/or compiler libraries call the respective operating system functions to manage the respective functionality (e.g. locking, acquiring, releasing, and/or testing Locks). Further details are described in the subsequent operating system section of this patent.

In one embodiment, the memory hierarchy may provide methods for accessing existing locks and tags. These methods could be used by an operating system to locate and possibly modify all tags and/or locks associated with a specific ThreadID, for example if the respective thread has terminated or has crashed.

Data Set Handling

The memory hierarchy may be able to manage data set more efficient, if certain characteristics of the data sets are de-fined, guiding their handling within the hierarchy.

Data sets may have an associated TAG. The TAG may e.g. define, whether a data set may be duplicated and/or where it shall be located.

The TAG may be defined by the programmer and/or the compiler or linker, a profiling tool and/or the operating system.

In a preferred embodiment the TAG may be defined by at least some of the following methods (some methods may be combined):

1. Data analysis at compile time
    At compile time various graph analysis methods (e.g. graph analysis) may define e.g. whether a variable is read only, and/or accessed by only one thread, or accessed by a plurality of threads. Also it can be analyzed whether threads have read-only, write-only or read/write access to a variable.
    While the compiler has only part of the complete application under control (e.g. one or a few threads), the linker may be able to analyze the whole application, after linking all code parts (e.g. threads) together. Therefore it may be necessary that not the compiler but the linker does the respective analysis or both tools do it jointly.
    As will be discussed below, the access patterns on variables provide important information for optimizing the handling of the data within the memory hierarchy.
2. Profiling at debug time
    Already at the time of debugging the code, first rudimentary profiling (done by a profiling tool) may deliver access patterns and frequencies for variables shared between multiple threads. It can be defined whether a variable is more frequently read or written by a specific threads, or whether a threads reads or writes the variable at all. Some threads may only read the data of a variable, while others only write to it and again others may read and write. Some may access the data far more frequent than others.
3. Profiling at runtime
    Ultimately at runtime, the operating system or a tool running temporarily on top of the operating system may profile the realistic behavior of a program on site on a real set of data. Similar checks are done as when pro-filing at debug time, with far more precise results. While for most applications it might be sufficient to do the profiling only once or sporadically using a dedicated tool, some applications in some environments may benefit from continuous profiling for optimal results, in which case the profiling tool may either operate continuously or profiling might be integral part of the operating system. Instead of adding the profiler to the operating system or have it as a separated tool, it might be preferred in some environments to compile and/or link the respective profiling code directly into at least some of the application, or provide the respective profiling code as part of a runtime library.

In one embodiment, the hardware may provide support for pro-filing data access patterns. E.g. the data cache memories and/or the subsequently described TAG cache memories may provide some counters (data access statistics counters) to measure the access frequency and/or access patterns. Obvious for a man skilled in the art, those counters may be implemented similarly to the previously described access-statistic-timers.

It might be too costly to implement such counters for every possible set of data. So preferably only some sets of data selected for profiling might be profiled by those counters.

E.g. could an additional bit in the TAG indicate that the respective set of data is subject to hardware profiling.

In one embodiment, profiling counters are implemented in each cache for monitoring at least the selected sets of data. When addressing the respective TAG, the processor does not only receive the TAG information for the set of data, but may receive, e.g. on the data bus and/or some additional TAG bit (which may e.g. be transferred on a dedicated TAG bus or on the data bus) the value of the data access statistics counters.

The TAG may be attached to a specific variable, in which case the system has to support the respective checking, or it might be part of a memory page, e.g. the header, in which case the MMU may be enhanced to manage it. Both implementations have advantages, but also disadvantages.

The attachment to a variable enables very fine grained optimization and checking E g may only those variables have an TAG, which are shared among processors, and the TAG may be enhanced to manage also the locking of the specific variable. However, the management overhead may be high and additional hardware may be required to check the TAGs.

Having the TAG in the page header, enables the MMU to easily detect it and manage the page accordingly. However, the approach is highly inefficient for single word variables. In one embodiment variables with similar access pattern may be grouped into memory pages with the same TAG, and by such in-creasing the overall efficiency.

Depending on the system (e.g. server, business/home/multimedia PC, infrastructure, mobile-device, . . . with the respective cost, size and power dissipation targets) one of the two methods may be implemented.

In a preferred embodiment both methods may be implemented together and depending on the application and/or the type and/or size of a data set, the respective method may be selected by the compiler, programmer and/or operating system.

Depending on the system implementation untagged variables may be treated in different ways. Advanced systems executing only code generated by a respective compiler may define them by default as not shared between multiple cores and/or processors (non-shared) and not coherent within multiple instances of memories (non-coherent). However, backwards compatible systems (being compatible to previous versions of software) may define them as shared and coherent to ensure the correct execution of legacy code. In a preferred embodiment each application may define the default treatment of non tagged variables by setting the default mode (e.g. non shared and non coherent; or shared and coherent) in software.

TAG in the Page Header

A TAG is attached, depending on the granularity either to a memory page or line. A memory line is preferably of the same size of cache lines in the memory hierarchy or a fraction (preferably of 2n) thereof.

Within the memory hierarchy, a page or line and its TAG are atomic and never separated. Usually the processor does not require access the TAG, unless it is set for newly generated variables or local copies of a global variable.

The memory instances in the memory hierarchy, e.g. memories located in the nodes, LEVEL-1, LEVEL-2, . . . , Level-n Cache, and/or TCM may analyze the TAG for critical accesses. E.g. when a variable within a page or line is requested from the LEVEL-2 cache, the cache controller may check the TAG how to manage the page or line, e.g. whether it should be kept in the cache or transferred to a lower cache level (LEVEL-1); e.g. if it may be duplicated and distributed to a plurality of LEVEL-1 caches of different processors or whether only on instance of the variable should exist in the system; e.g. if the variable shall be moved through the tree to different owners or should be kept solely at the preferred owner.

In a preferred embodiment the memory instances check autonomously, without the involvement of a processor, the TAG and move and/or manage the data set accordingly within the memory hierarchy.

The TAG may be checked before the respective page or line is accessed, or in some embodiments the memories may be implemented two-, dual-, or multi-ported to support simultaneous access to the data and the TAG.

In a preferred embodiment, the memory instance may comprise a history buffer (as also described in other sections of this patent), in which the access TAGs are cached and, in case a TAG has been checked already, the access may not be repeated again, such saving an access cycle.

For supporting the memory instances to access the TAG it is placed in a header with a fixed address within the page or line. For example the TAG may be located within the descriptor table of the memory pages, lines may comprise a similar, but smaller descriptor table.

Preferably variables (or data) are sorted by the compiler, memory allocation instance (e.g. of the program or within the hardware) and/or the Operating System and grouped into blocks of data having the same access pattern, resulting in the same TAGs. Preferably also the access pattern from various threads/tasks and/or processors are evaluated when grouping variables. This is particularly beneficial e.g. when the block is floating between processors, being moved always towards the currently accessing processor. If many different processors are accessing the block, unnecessary traffic is generated and the access times increase. Therefore, ideally the block contains only (or mainly) data being used by the same or a very limited set of processors. Those blocks are split into memory lines, each line having a descriptor defining the TAG. Lines may coincide with memory pages e.g. as being used for the memory management to translate virtual into physical addresses and the descriptors may be part of a page descriptor.

In one embodiment each cache line within the cache memory has an associated separated memory (Descriptor Memory), which is simultaneously accessible, storing the descriptor for the respective line. The separated and concurrently accessible memory provides for efficient access without the cost of using memories with a plurality of ports or the penalty of multi-cyclic memory access for sequentially accessing the TAG and data.

In case
a) the memory line coincides with the cache line, the respective descriptor can be directly copied into the Descriptor Memory.
b) the memory line is larger than the cache line, the respective descriptor is copied from the top of the memory line into each cache line storing a section of the memory line. The location of the descriptor is calculated by the cache controllers based on the alignment of the memory lines.
c) the memory line is smaller than a cache line, the cache may support plurality Descriptor Memories (or Descriptor Memory banks within a single Descriptor Memory) per cache line, each of the plurality of Descriptor memories being associated with the respective section of the cache line.

When data of a cache line or memory line are transferred within the memory hierarchy, the respective descriptor is typically transferred together with the data.

In one embodiment, the respective TAGs are passed to all structures required for calculating the physical address. This is efficient as the address translation from the virtual into the physical address has usually to be done anyhow. Particularly, the TAG information may be stored in the caches of the address translation tables (e.g. Translation Lookaside Buffers TLB). Likely the granularity of the groups of variables is smaller than the size of a page. In this case, the size may be subdivided into micro-pages (memory line). Each micro-page (memory lines) may have a respective entry in a list, which is accessible through the address translation tables. Micro-page information might be cached as address translation tables are.

It is very time consuming for caches to check the address translation tables before deciding on the treatment of a specific cache line. Therefore it is preferred that in this embodiment the cache lines are also be extended with TAG information.

TAG Attached to Variables

Transfers of variable having an associated TAG may be managed by special opcodes, for example:

ld32wi <VariableBase>, r: "load 32-bit with TAG" loads the 32-bit word at address <adr+size of TAG> into register r, the TAG is positioned at address <VariableBase>.

st32wi r, <VariableBase>: "store 32-bit with TAG" stores the 32-bit word of register r to address <adr+size of TAG>, the TAG is positioned at address <VariableBase> and remains unmodified.

The TAG can be accessed by a simple load (ld) or store (st) opcode to address <VariableBase>. Within the memory hierarchy, a variable and its TAG are atomic and never separated. Preferably special measures are implemented in the compiler and/or used by the programmer to align variables and their TAGs to cache-lines and/or memory pages. Without alignment, the hardware may be forced to load e.g. two cache lines or two memory pages, just because the variable and its TAG cross the boundary of a single page or line.

Usually the processor does not require to access the TAG, un-less it is set for newly generated variables or local copies of a global variable, and unless the TAGs are used for locking purposes as will be subsequently described.

The memory instances in the memory hierarchy, e.g. memories located in the nodes, LEVEL-1, LEVEL-2, . . . , Level-n Cache, and/or TCM may analyze the TAG for critical accesses. E.g. when a variable is requested from the LEVEL-2 cache, the cache controller may check the TAG how to manage the variable, e.g. whether it should be kept in the cache or transferred to a lower cache level (LEVEL-1); e.g. whether it may be duplicated and distributed to a plurality of LEVEL-1 caches of different processors or whether only on instance of the variable should exist in the system; e.g. whether the variable shall be moved through the tree to different owners or should be kept solely at the preferred owner.

In one embodiment the memory instances check autonomously, without the involvement of a processor, the TAG and move and/or manage the data set accordingly within the memory hierarchy.

The TAG may be checked before the respective data is accessed, or in some embodiments the memories may be implemented two-, dual-, or multi-ported to support simultaneous access to the data and the TAG or separate single ported memories. For accessing the variable and its TAG in a single clock cycle, preferably memories with more than one port are used, Single port memories require to lookup the TAG before (or after) the variable access and require therefore more than one clock cycle (typically 2 cycles).

In a one embodiment, the memory instance may comprise a history buffer (as also described in other sections of this patent), in which the access TAGs are cached and, in case a TAG has been checked already, the access may not be repeated again, thus saving an access cycle. In one embodiment, the processor may read TAGs and then cache them internally. In this case, the processor may transfer the TAGs on an additional TAG-bus to the memory hierarchy. All instances of the memory hierarchy (e.g. LEVEL-1, LEVEL-2, . . . , Level-n caches) get the TAG for a respective data set signaled by the processor and additional measures, such as TAG checks, multi-port memories, etc are unnecessary.

For supporting the memory instances to access the TAG it is necessary to transmit its address. For single byte or word variables the memory instances could calculate the address of the TAG autonomously by accessing the leading data word (adr-1) for pre-TAGs located before a variable or the trailing word (adr+size of TAG) post-TAGs located behind a variable.

However, for more complex variables, such as data structures or strings, this simple addressing approach is not sufficient, as the offset between the TAG and the addressed data word has to be defined. Providing a base, pointing to the TAG and the distance between the TAG and the word to be addressed is one solution. The addressing is basically identical to indirect addressing, having a base and an offset.

According instruction may be supported by the processor to manage e.g. data structures and/or strings, for example:
ldstruct32 <VariableBase><VariableOffset>, r: "load 32-bit of a structure with TAG" loads a 32-bit word at address <VariableBase+VariableOffset> into register r, the TAG is positioned at address <VariableBase>.

ststruct32 r, <VariableBase><VariableOffset>: "store 32-bit of a structure with TAG" stores the 32-bit word of register r to address <VariableBase+VariableOffset>, the TAG is positioned at address <VariableBase> and remains unmodified.

VariableBase and VariableOffset may depend on the processor hardware, or system hardware implementation and are implicitly fixed. Alternatively, they may be defined by the operating system and/or application software; in that case the operating system, the compiler and/or linker and/or a library (e.g. C Standard library) may define the values.

As indirect addressing is beneficial in addition to calculating the distance within the data structure, more complex addressing operations may be supported by instructions having a base <base> (e.g. for pointing to a stack or frame), an off-set <VariableBase> (pointing to the TAG) and the distance <VariableOffset> (pointing to the data).

The respective memory address is calculated by adding all components:

memadr=<base>+<VariableBase>+<VariableOffset>

For one skilled in the art it is obvious, that several variations of the exemplary addressing scheme and instructions are possible, all having the same or similar effect.

The hardware requires enhanced address and control buses at least within the memory hierarchy (e.g. the LEVEL-1, LEVEL-2, . . . Level-n caches).

Both address portions, the TAG (base) and the distance between TAG and data word have to be transmitted to the memory hierarchy separately, so as to allow the access of both, the TAG and the data word for the memory instances. Therefore <VariableBase> and <VariableOffset> are transmitted dedicatedly on separate address buses. For indirect addressing, the base address <base> may be added by the load store unit to the address <VariableBase>, the sum is then transmitted via the <VariableBase> bus. Alternatively even the base <base> may be dedicatedly transmitted on a separate bus, which may make sense in some embodiments, e.g. with advanced memory management techniques.

The control bus has additionally to transmit a signal (INDICATED) notifying the memory hierarchy of an access to a set of data comprising a TAG.

With INDICATED set, the receiving memory instance (instances) may evaluate and regard the TAG. If not set, the set of data does either not comprise a TAG or it shall be disregarded.

Implementation of TAGs

As already described, TAGs might be used to provide additional information on variables, e.g. to manage their coherency or as subsequently described for locking purposes.

Basic data structures might be managed using a TAG associated with the structure. Access to data is relative to the base of the structure. The TAG may be located preferably directly at the base or any other easily computable position relative to the base, e.g.:

For integral data types (such as CHAR, INT, UNSIGNED, SHORT or LONG) and floating data types (such as FLOAT or DOUBLE) the TAG is directly associated with the (single) data word. Typically, the (single) data word is transferred by one single instruction (e.g. a load or store instruction). The TAG might be located directly in front or after the data.

Aggregate data types (such as ARRAY, STRUCT or UNION) have one TAG associated with the structure. Typically, the transfer of a plurality of data word is required to access those data types, which requires a plurality of instructions (e.g. load or store instructions). The TAG might be located directly in front or after structure, comprising a plurality of data.

Accessing those variables may comprise:

checking of the TAG at the address VariableBase±TagOffset, (preferably with TagOffset=0); and accessing the data at VariableBase±VariableOffset (typically and preferably with VariableOffset=size_of_TAG for integral data types and VariableOffset=size_of_TAG+offset for aggregate data types). Size_of_TAG is the size of the TAG.

The TAG and the variable may be accessed in parallel (as previously described) or sequentially. If accessing sequentially, it is beneficial to retrieve the TAG before accessing the variable to set up the variable's data access in accordance with the TAG.

Examples are shown in FIG. 13a. 1301 shows a 32-bit word for a 32-bit processor with a leading 32-bit TAG, 1302 a respective 64-bit word. 1303 shows a STRING, STRUCT or ARRAY with an associated TAG.

More complex data structures such as lists or trees are now discussed.

In one embodiment, each list or tree entry could have an associated TAG, similar to a STRUCT as shown in 1303. However, this requires TAG handling for each of the entries, which may reduce the system performance unnecessarily. Furthermore, if the tagging is (also) used for locking, as is subsequently described, the whole data structure should be locked, not single entries, but locking each entry separately is dramatically inefficient.

In one preferred embodiment, the TAG may only be associated with the first entry of a data structure. The first entry is the one, which is referred to by the default settings of pointers of the code and will be referred to as ROOTENTRY. Each access into the data structure is relative to the ROOTENTRY (ROOT-relative access) and the ROOTENTRY's TAG is checked for each access. The whole data structure inherits the settings of the ROOTENTRY's tag. The instructions described above, may be used for such accesses.

An exemplary tree structure is shown in FIG. 13b. The ROOTENTRY 1311 comprises a TAG, at least the subsequent entries 1312 and 1313 either do not comprise the TAG or do not use it.

An exemplary double linked list structure is shown in FIG. 13c. The list comprises at least the elements 1321, 1322, 1323, and 1324. As the list is double linked, two pointers may exist for accessing the list, one to the first and another one to the last entry. In this case, both entries require a respective TAG. While this is a possible solution if both TAGs are simultaneously set, it requires additional effort and complicates referencing significantly. Note, that for locking purposes both TAGs have to be set atomically, without any interruption of the access in between, in accordance to mutex and semaphore theories.

In a preferred embodiment, therefore an additional ROOTENTRY is inserted, chaining the double linked list into a ring, by combining the pointer to the first and last entry in one ROOTENTRY (1325). The ROOTENTRY 1325 comprises the singular TAG. The insertion of a ROOTENTRY requires modification of the algorithm, such that the "first" pointer is replaced by a pointer to root which then uses "up" for pointing to the first entry. The "last" pointer is replaced by a pointer to root which then uses "down" for pointing to the "last" entry.

As code libraries (e.g. for C/C++) implement typically double linked lists using a struct having the features of ROOTENTRY, the inventive approach is per se compatible with existing code and no respective modifications are required.

In C syntax:
first is replaced by (*root)→up
last is replaced by (*root)→down

Single linked list do not require the insertion of a ROOTENTRY. As only one pointer is referencing to the first entry of the list, the first entry is sufficient as ROOTENTRY.

A double linked list is in theory the simplest structure for demonstrating the method. It is obvious for one skilled in the art, that the insertion of a ROOTENTRY is applicable for other, especially more complex, data structures to solve the respective problems.

Extended pointer arithmetic is required to support ROOT-relative data access. Respective pointers consist of two fields: A pointer to the ROOTENTRY and the offset between the ROOTENTRY and the addressed object. The basics are the same as has been previously described for TAG attached to variables, see e.g. the instructions ld32wi <VariableBase>, r and st32wi r, <VariableBase>.

The main difference is that for singular variables the TAG addressing can be managed implicitly. When the TAG is inherited, reference to the original variable (ancestor) must be made for retrieving the inherited TAG information.

Respective pointers implicitly comprise two fields, the address of the ROOTENTRY and the OFFSET to the respective data. Such a pointer might be defined as an array the two values:

p:=[&ROOTENTRY, OFFSET]

Traditional pointer arithmetic as known from pointers in the state of the art, preferably modifies the OFFSET value only, e.g. according to the C/C++ specification, pointers move in steps according to the size of the object pointed to. For example:

p++: =[&ROOTENTRY, OFFSET+1*size(object)]
p−=i: =[&ROOTENTRY, OFFSET−i*size(object)]

Processors may support the extended pointers with a respective data format, e.g. may 32-bit processors handle such pointers as 64-bit packed integers, comprising two fields ROOTENTRY and OFFSET, each being a 32-bit wide integer.

Preferably the address arithmetic of the processor, e.g. in the Load/Store Unit implicitly sums up ROOTENTRY and OFFSET by a respectively implemented adder in hardware to calculate the address. For supporting indirect addressing, additional adders may be implemented in hardware, e.g. to compute FramePointer+(ROOTENTRY+OFFSET)$_\#$ TAG Performance and Cache TAG and data may be accessed in parallel. As previously said, the TAG and data address might be transmitted concurrently on the data bus. A respective memory, such as e.g. two-port memories, may support concurrent access to TAG and data. Such a system or method has no negative impact on the performance of the memory system. However, the increase in bus width and memory size affects the system cost. Note, separate single-port memories may be alternatively used.

Alternatively, TAG and data may be accessed sequentially. First, the TAG is addressed and checked and then data is addressed and transmitted. While this has no impact on the system cost (besides larger memories due to the introduction of the TAGs), data access is slowed down. For increasing the efficiency of the described tagging system, in one embodiment the use of TAGs might be limited to shared variables. As typically, most of the variables of an algorithm are local and shared variables are rather rare, this limitation reduces the tagging overhead significantly.

In addition, the penalty of the TAG accesses may be reduced by a TAG-Cache, for example see FIG. 15, 1550. A TAG-Cache operates like known caches and is implemented similar to a Translation-Lookaside-Buffer (TLB). It is placed between a processor core and the next memory instance, which is typically the Level-1 data cache.

A TAG once read from the higher-level memory, which is typically the Level-1 data cache or a memory located higher in the memory hierarchy, is stored in the TAG cache's memory. Whenever the TAG is accessed again, it is read from the TAG cache.

If TAGs are written by the processor core, which typically happens only when initiating a new variable, the TAG is immediately written into the higher-level memory. Depending on the strategy, it is only written to the higher-level memory and not stored in the TAG cache at all or written into both, similar to the write-through data cache strategy known in the art.

TAGs used for locking (Lock-TAG), as will be subsequently described in detail, are treated differently. As those TAGs are changed by a plurality of processor cores, the each TAG cache needs updating whenever the TAG is stored in the memory hierarchy. Ultimately, a coherence system for handling the TAGs would be required; and yet, the access will not be atomic as required for mutex' and semaphores.

A different cache policy for Lock-TAGs is implemented: Lock-TAGs are cached and treated in the following steps:

1. If a cached Lock-TAG indicates, that access to the data is denied for the respective processor core (i.e. the current thread being executed on the respective processor core), it is declared invalid and the according TAG in the higher-level memory is checked.
2. This is repeated until the lock is unlocked and in an atomic access, the respective processor core modifies the TAG and claims ownership of the lock. The accordingly modified TAG is cached in the TAG-cache, now indicating that the lock is owned by the respective processor core (i.e. the current thread being executed on the respective processor core).
3. If the cached Lock-TAG now indicates, that the respective processor core (i.e. the current thread being executed on the respective processor core) has access, it is regarded valid. The TAG is directly read from the cache, but not read from the higher-level memory.
4. As soon as the respective processor core (i.e. the current thread being executed on the respective processor core) releases the lock, the TAG-Cache is updated at the same time as the higher-level memory TAG is modified. The whole process may restart at step 1 again.

Processor Signals TAG

Various implementation issues of the memory hierarchy are minimized or even completely avoided, if the processor transmits the respective TAGs to the memory system for the data access on the system bus. The processor can transmit the respective TAGs together with the address, before or after the address, depending on the implemented bus protocol. For burst sequences, access to data structures or strings only one TAG may be transmitted for a plurality of data word transfers.

In this case, it may not be necessary for the caches to check the TAGs by themselves, as the TAG is implicitly provided by the processor.

When a data transfer on the cache level (between caches and/or between a cache and the main memory) is required, e.g. to load a required cache line from a higher level cache or the main memory, the TAG associated with the cache transfer initiating data access might be stored at cache level. The TAG might then be transmitted between the caches and/or the higher-level memory, to characterize the type of the respective data and define its treatment within the cache hierarchy according to its TAG.

Figure 14:
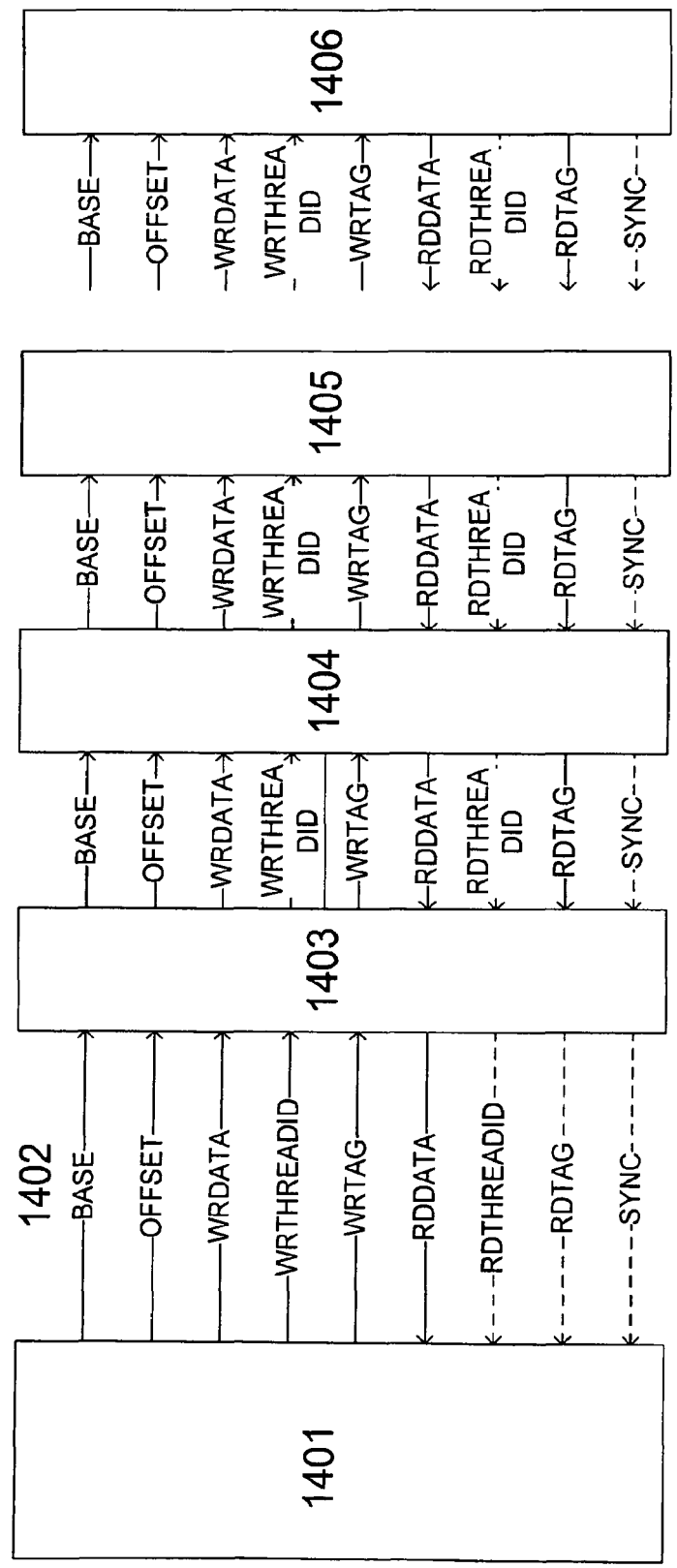
FIG. 14 is a block diagram illustrating an example implementation of information including TAG information transmitted between a processor, caches, and memory.

FIG. 14 illustrates an exemplary embodiment. A processor 1401, which may have a plurality of processor cores, transmits over a bus system 1402 the following information:

The base address (BASE) of the data access, typically pointing to the respective TAG.

The offset (OFFSET) added to the base address to access the respective data word.

The thread ID (WRTHREADID) of the currently executed thread, e.g. to control the locking of the respective data.

The TAG (WRTAG)—if previously read and cached—of the data to inform the memory hierarchy of its treatment.

The processor (1401) may receive back the following information via the bus (1402):

Read Data (RDDATA).

The thread ID (RDTHREADID) of the accessed data.

The TAG (RDTAG) of the accessed data.

Synchronization information to show the validity of the RDDATA, RDTAG, and/or RDTHREADID; also if locking is supported, status information of the LOCK, e.g. access to the data granted (lock not in place or unlocked) or access rejected (locked).

The information might be transmitted to the cache hierarchy (e.g. the Level-1 cache (1403) and/or the main memory (1406). All respective information, or a subset might be transmitted between the caches of the memory hierarchy (e.g. 1403, 1404, 1405). Some of the information might be omitted between the caches or condensed, e.g. may the BASE and OFFSET be combined into one single address between the caches and/or the caches and the main memory. While, in a preferred embodiment, most of the information (particularly the TAGs) should be transmitted between the caches to determine the treatment of the respective data within the memory hierarchy, it might not be necessary to transfer more information than e.g. data and address and some control between the caches and the main memory.

For the sake of completeness, it shall be mentioned, that typical control signals (e.g. RD, WR, BOFF, RDY, WAIT, etc) are not shown in FIG. 14 as those are obvious for one skilled in the art. Also, it is obvious that at least some of the unidirectional signals could be implemented bi-directional for reducing the amount of signal on the bus.

Processors can transmit the TAGs using various methods. Two embodiments are exemplary described in detail:

In one embodiment, TAGs are cached in TAG-caches as previously described. Together with the address, the TAG may be transferred via the bus system to the memory hierarchy. If a TAG related to an address is not cached yet, the TAG is first retrieved from the memory hierarchy. For subsequent data accesses, it is available in the cache for transfer.

An exemplary access pattern may proceed like this:
1. Retrieve TAG for a first data (word or structure) and store it in the TAG-cache
2. Access first data with TAG from TAG-cache
3. Continue processing with other accesses
4. For accessing the first data again, check TAG-cache
   1. If TAG is still cached, continue with step 2
   2. If TAG is not cached anymore or invalidated (e.g. a lock-TAG has been unlocked), continue with step 1 Retrieving the TAG may comprise the step of locking a lock, if the TAG is a lock-TAG.

In one embodiment, special memory access instructions are used to define the TAGs. Those instructions comprise additionally a TAG field, which might be a constant field or a reference to a register containing the TAG. When executing the instruction, the processor may transmit the TAG information implicit in or referenced by the instruction to the memory hierarchy.

Exemplary instructions might be:
ldtagd32 <VariableBase>, TAG, r: "load 32-bit of tagged data" loads a 32-bit word at address <VariableBase> into register r, and transfers tag TAG with the address to the memory hierarchy. sttagd32 r, <VariableBase>, TAG: "store 32-bit of tagged data" stores the 32-bit word of register r to address <VariableBase>, and transfers tag TAG with the address to the memory hierarchy.

In one embodiment unused parts of the address (e.g. the lower address bits (LSB) or the highest address bits (MSB)) may carry the TAG information.

It shall be noted, that various embodiments, in particular the previously described ones, may coexist in one processor implementation.

Particularly in such implementations it is useful to have an instruction storing data together with its associated TAG, e.g. such as stdt32 r, <VariableBase>, TAG: "store 32-bit of tagged data and the respective TAG" stores the 32-bit word of register r to address <VariableBase+VariableOffset>, and the TAG is stored to address <VariableBase+TagOffset>.

Using TAGs for Locking

The described TAGs might be used additionally or alternatively to implement variable locking. As previously said, the TAGs might be attached to each variable or to blocks of variables. In the latter case, the whole block will be locked or unlocked according to the TAG. In a third case, complex data structures might have one TAG per structure.

Using TAGs for locking is more efficient than explicit locking code, as the locking might be managed completely in hardware, which is faster than software locking Additionally programming becomes less complex and the code and system security is enhanced as the locking is implicitly implemented.

Locking mechanisms according to the state of the art typically use a zero value to indicate the unlocked state and any value different than zero to indicate a locked state.

This definition causes often problems, e.g.:
1. If within the thread the lock is repeatedly tested at different code sections, e.g. one code section may set the lock, then another section of the same code tries to set the lock again but cannot, the thread is blocked. As the unlock is at another section of the same blocked thread, the lock cannot be reset and the thread deadlocks.
2. In addition, the zero/non-zero terminology provides no indication of the thread owning, locking or unlocking a lock. A thread "owns" a lock in our terminology, when it has the lock set. In erroneous conditions, a lock might be unlocked by another non-owning thread. Such errors are extremely difficult to debug and detect.

While in one embodiment the same method may be used and the same values (zero for unlocked, non-zero for locked) may be stored in the TAGs to implement the lock, in a preferred embodiment the thread ID of the respective thread is stored in the TAG. Storing the thread ID to declare "ownership" of a lock and lock all other threads out, solves major software problems (e.g. the ones described above).

If the thread ID of the currently executed task matches the thread ID in the lock (or the lock is open), access is granted, else the lock blocks the data access.

In some embodiments, locks may support multiple locking, e.g. to support recursive code. The lock may comprise a counter, tracking the number of lock vs. unlock requests. Only if the number of lock requests equals the number of unlock requests, the lock is released.

A thread with a blocked data access has to wait until the lock opens. Such a waiting thread may wait or trigger switching to another thread or task. The hardware itself can initiate such a switch, by generating a hardware trap initiating a switch if the threads IDs do not match.

A lock is open if a specific predefined open value, which is not used as thread ID, is stored in the TAG; a zero value is exemplary used in this specification.

In case the owning thread tries to lock the lock again, the threads own ID can be detected in the lock and the thread can continue to operate. However, at least for debugging code, an interrupt might be generated to allow for detecting the un-clean code part (as such should never happen in well-written code).

Similarly, for unlocking the lock, the unlocking thread's ID can be compared with the ID stored in the lock. In case the IDs do not match, the unlock request is rejected. As such is a severe failure, an interrupt, trap or exception might be generated to allow for detecting the incorrect code part.

Some code may use the TAG locking feature for all variables, other code might—for performance reasons—only use TAG locking for some of the variables, e.g. the most critical or extensively shared ones.

TAG locking supports better tracking of locking errors and issues than traditional locking methods. The locking is directly associated with the respective variable and the hardware implicitly manages the lock and recognizes faulty access.

If ThreadIDs are used for setting locks, in addition erroneous accesses can be tracked, e.g.:
A thread not being owner of the lock, ignoring the lock and trying to access the locked data, possibly causing hazards or race conditions.
A thread owning the lock, trying to lock again, possibly causing a dead-lock (as previously described).

Locks in the state of the art (zero for unlocked, non-zero for locked) do not support the tracking of such errors. Therefore debuggers (e.g. GNU Debugger GDB) may use the inventive method to manage locks. Debugging code produced by compilers for debugging purposes, may also use the inventive locking system. After debugging, when the final product code is compiled, the locking might be simplified, e.g. by limiting the inventive locking to e.g. the most critical or extensively shared variables, or e.g. replacing it completely by locks in the state of the art (zero for unlocked, non-zero for locked).

It shall be mentioned that the inventive locks do not necessarily have to be implemented in hardware. The respective locking mechanism are implementable in software too, either manually written by the programmer, embedded in a library (e.g. such as OpenMP) or automatically generated by a tool. While such mechanisms are widely used already, the inventive hardware support may allow using such locks more efficiently and safely, while minimal or no modification is required to existing code.

TAGs

At least all or a subset of the following TAGs may be supported (it shall be mentioned, that data TAGs are managed in hardware by the processor, but on the software level they are managed on the currently processed thread; as already mentioned, within this specification the term processor refers to the hardware level, from a software perspective the thread currently executed on the processor (or processor core) is meant):

SingleOwner (SO) (solely one processor)
The set of data is being solely accessed by one single processor. Ideally it will be moved into the level 1 memory structure (LEVEL-1 Cache, TCM) of that processor. Ideally no write through mechanism may be used for write operations into this set of data, as it is not shared and no coherence issues exit.

Duplicate-Read-Only (DRO)
The set of data (typically constants) is being only read by a plurality of processors, no write operations are performed. Ideally the set of data is duplicated and located in the level 1 memory structure (LEVEL-1 Cache, TCM) of each accessing processor. By definition, no coherence or locking issues exist.

Preferred-Owner (PO)
The set of data is mainly accessed (e.g. read and/or write) by one processor called the preferred owner, but may also be accessed (e.g. read and/or write) by other processor rather seldom. The set of data is not being duplicated and solely located in the level 1 memory structure (LEVEL-1 Cache, TCM) of the preferred owner. No implicit measures for keeping multiple copies of data coherent are necessary, as the set of data exists only once in the memory space of the Preferred Owner. Locking, semaphoring, mutex, etc. mechanisms may be implemented (e.g. in software and/or in hardware, e.g. using TAGs as described in this patent) where necessary (e.g. if multiple processor cores access the set of data).

Floating (FT)
The set of data is rather sequentially and/or randomly accessed (e.g. read and/or write) by a plurality of processors. The set of data is not being duplicated and solely located in the level 1 memory structure (LEVEL-1 Cache, TCM) of the one processor. It is moved through the cache hierarchy towards the most recent accessing processor core in accordance to the frequency of the accesses as described previously at length. No implicit measures for keeping multiple copies of data coherent are necessary, as the set of data exists only once. Locking, semaphoring, mutex, etc. mechanisms may be implemented (e.g. in software and/or in hardware, e.g. using TAGs as described in this patent) where necessary (e.g. if multiple processor cores access the set of data).

Single-Write/Multi-Read (SW-MR, Broadcast)
The set of data is being read by a plurality of processors, write operations are performed by only one processor. Ideally the set of data is duplicated a plurality of times and located in the level 1 memory structure (LEVEL-1 Cache, TCM) of each accessing processor. Coherence measures may be used, but preferably the respective memories may be blocked for read access and then each of the respective memories gets the new data written to. The cache hierarchy e.g. the nodes, or alternatively an extended ATAG structure, may protocol which lower level memories need to be updated for a specific data write. Locking, semaphoring, mutex, etc. mechanisms may be used where necessary to manage the data update, e.g. to support atomic access by the only writing processor.

Write-Exceeds-Read (WER, W>R)
The set of data is being written frequently by a plurality of processors, but comparably seldom read. Ideally a single set of data is held at a higher level in the memory hierarchy, which is not being duplicated. Write access to higher level memory instances implicit no performance issues, as the latency towards the memory does not delay the processor(s). Read accesses are seldom, therefore the latency is acceptable. No implicit measures for keeping multiple copies of data coherent are necessary, as the set of data exists only once. Locking, semaphoring, mutex, etc. mechanisms may be implemented (e.g. in software and/or in hardware, e.g. using TAGs as described in this patent) where necessary (e.g. if multiple processor cores access the set of data).

Write-Almost-Equal-Read (WAER, W≈R)

The set of data is almost as often written as read by a plurality of processors. Ideally the set of data is held at a higher level in the memory hierarchy, yet not too far away from the processors to keep the read latency at an acceptable level. The set may be duplicated and exist in a plurality if cache instances. If duplicated, the instances are preferably synchronized in hardware using coherence protocols, the memory instances are preferably in "write-through" mode, newly written data is either written through to higher memory levels or distributed to the duplicate sets using a coherence and/or update protocol (e.g. as described for SW-MR). Further coherence protocols are preferably established between each memory instance and its accessing processors. Locking, semaphoring, mutex, etc. mechanisms may be implemented (e.g. in software and/or in hardware, e.g. using TAGs as described in this patent) where necessary (e.g. if multiple processor cores access the set of data).

Read-Exceeds-Write (REW, W<R)

The set of data is being frequently read by a plurality of processors, but seldom written. Ideally the set of data is duplicated and located in the level 1 memory instance (LEVEL-1 Cache, TCM) of each accessing processor.

The instances are preferably synchronized in hardware using coherence protocols, the memory instances are preferably in "write-through" mode, newly written data is either written though to higher memory levels or distributed to the duplicate sets using a coherence and/or update protocol (e.g. as described for SW-MR).

Locking, semaphoring, mutex, etc. mechanisms may be implemented (e.g. in software and/or in hardware, e.g. using TAGs as described in this patent) where necessary (e.g. if multiple processor cores access the set of data).

Keep Local (KL)

The set of data is being frequently used by at least one processor core, but too large (or not frequent enough used) to be stored in the Level 1 memory hierarchy (e.g. a Tightly Coupled Memory (TCM) or the Level 1 cache). Examples for this kind of data are e.g. reference frames for video encoding, address translation table for the memory management unit, database indexes, database and/or internet caches, etc.

Preferably the set of data is not being duplicated and solely located in one single memory instance at a higher level in the memory structure. Therefore, as the data exists only once, typically no implicit measures for keeping multiple copies of data coherent are necessary. Locking, semaphoring, mutex, etc. mechanisms may be implemented (e.g. in software and/or in hardware, e.g. using TAGs as described in this patent) where necessary (e.g. if multiple processor cores access the set of data).

Coherence

A major problem, originating in the existence of multiple Load/Store-Units, Address Generators and/or Tightly Coupled Memories, is to maintain the coherence of the respective memories or memory sections, even if the units are dedicated solely to one single processor. Two exemplary cases are:

1. E.g. having multiple TCMs theoretically identical address ranges could be located in more than one of the TCM memories.
2. E.g. multiple Address Generators and/or Load/Store-Units could access the same section within a memory (e.g. the main memory).

In this patent, coherence required for maintaining the coherence within local memories dedicated and/or coupled to one single processor is referred to as "local coherence"; while coherence in the memory hierarchy, shared by a plurality of processors, is called "global coherence".

Preferably the programmer and/or compiler ensures that the addressing does not collide and solely one resource (e.g. solely one TCM and/or solely one Address Generator) is maintaining an address range and/or memory section. However, sometimes this is not possible, disregarded or cannot be guaranteed.

In one embodiment, the solution is to "virtualize" the TCMs, e.g. by implementing a crossbar switch between the Load/Store Units and the TCMs. The addresses generated by the Load/Store Units are checked vs. the address ranges of each of the TCMs. The single TCM with the respective address range is selected via the crossbar switch and the data is accordingly transferred. Checking the address ranges requires additional time and adds latency, also arbitration may be required to arbtrate each of the TCMs, again adding latency. Also, significant hardware is required to implement the crossbars.

As said before, optimally the problem is avoided by well-written software, and said coherence issues occur ideally seldom. Therefore, the preferred embodiment is implemented as a mixed solution, managed in hardware and software:

Any address range is solely held in one single TCM and/or memory section. The Load/Store-Unit and/or Address Generator accessing the respective address range first is entitled to be the sole owner.

1. Any address, generated by any Load/Store-Unit and/or Address Generator, is checked by comparators vs. the address ranges of all TCMs and/or memory sections.
2. In case a Load/Store-Unit and/or Address Generator generates an address in an address range it is not entitled to, the check may generate a signal CoherenceFault causing e.g. a Software Interrupt or Trap. Program execution is stopped at the respective memory instruction and a software routine (called CoherenceManager) is called, e.g. via an interrupt manager.
3. The signal CoherenceFault indicates the Load/Store-Unit, and memory section or TCM causing the problem.
4. The CoherenceManager flushes both memory sections and/or TCMs, the one already comprising the address range and if necessary the new, currently accessed memory sections and/or TCM. Then, it loads the data of the respective address range into the new, currently accessed memory sections and/or TCM.
5. The CoherenceManager returns the execution (e.g. via the interrupt manager) to exactly the memory instruction which previously caused the problem, which is then executed once again.

In a preferred embodiment the signal CoherenceFault is generated only on write accesses to the respective memory range, as read accesses would not disturb the coherence. Accordingly read only memory ranges, e.g. comprising constants or data structures such as arrays of constants, could be accessed from various Load/Store-Units or Address Generators in parallel or even exist duplicated in a plurality of TCMs without causing a coherence fault.

In an advanced embodiment, the CoherenceFault may not be used to interrupt the execution (e.g. by issuing a Trap or Interrupt), but may trigger a block move hardware unit (Coherence Unit), e.g. being based on one or a plurality of DirectMemoryAccess Controllers (DMA), which flush and fill the respective memory sections and/or TCMs. This Coherence Unit may be located globally in the processor and manage all memory sections and/or TCMs. However, preferably each TCM, Cache Controller and/or Memory may comprise a Coherence Unit, which is reducing the complexity of the processor internal bus system and the controlling. Implementing the Coherence Unit in hardware makes the processor slightly more expensive, but reduces the software overhead significantly, avoids interrupts and consequently the execution time of the interrupt manager, interrupt response times and minimizes the overhead of data movement due to the context switch.

Profiling measures may be provided by the hardware, to track and/or monitor coherence issues, such as e.g. CoherenceFaults and/or data block transfers. Particularly counters and interrupts, traps, and/or exceptions may be implemented and/or supported by the hardware.

Minimizing the Coherent Data Space

Maintaining the memory coherence requires bandwidth in the memory hierarchy and reduces the data transfer rate. State machines within the memory hierarchy being busy with coherence protocols are not able to manage data transfers. Data write-back to higher memory instances as required for cache write-through or write-back coherency policies block other data transfers on the bus and in the according memory instances.

One aspect of the invention is to reduce the coherent data space of processors. It is not necessary to establish coherence policies, e.g. cache write-back or write-through, but also coherence protocols such as snooping, for data not being shared between a plurality of threads and/or processors. Some coherence measures, e.g. snooping, may not reduce the system performance or bandwidth, but yet the mechanism consumes power, which is certainly also true for e.g. data transfers (e.g. due to cache write-back or write-through). Therefore avoiding unnecessary coherence measures is not only beneficial for the system performance but also for power saving. One approach is to identify data not being shared and attach an according TAG as previously described. Yet the TAG must be detected and managed and it requires additional memory space. Therefore the subsequently described methods may be used alternatively or additionally.

Preferably, the stack keeps only locally used data and is simultaneously the highest performance method of transferring data between the processor and the memory hierarchy.

In one embodiment, stack accesses are signaled to the memory hierarchy, defining the respective data as locally used only—which may disable coherence measures (e.g. such as coherence protocols and/or cache write-back or write-through).

The signaling may be implemented in hardware by a) transfer-ring a "stack-access" signal from the processor to the memory hierarchy or b) the respective memory page or line might be defined by the software as stack, e.g. by a descriptor table or header (some possible implementation has been previously described).

The signal may be generated by e.g. the instruction decoder, a load/store unit and/or an address generator by using dedicated stack access instructions or by e.g. a load/store unit and/or an address generator whenever the stack pointer or frame pointer is used for generating an address. The latter is preferred as the signal is automatically generated when-ever the stack pointer or frame pointer is used for addressing e.g. for normal load/store instructions. This happens for example when the stack pointer is used as base address for an indirect address calculation, which is common for stack accesses.

Code using the stack for globally used variables shared among multiple processors and/or processor cores (i.e. currently executed threads), which are e.g. used by a plurality of threads and or accessing variables on the stack via pointers, may collide with the described concept. At compile time, the compiler is in most cases able to detect globally used variables and/or variables which are accessed via pointers, e.g.:

1. Variables or Pointers being passed between a parent thread and a child thread. Often libraries are used to manage threads, e.g. the POSIX Pthread API is commonly used; reference is made to the ANSI/IEEE POSIX 1003.1-1995 and IEEE Std 1003.1, 2004 standards, which are incorporated into this patent for full disclosure. Such libraries may even support compiler directives or inline assembler code to define global variables.
2. Variables or Pointers being marked as global by compiler directives (hints, pragmas).
3. Variables having a mutex or semaphore lock (the respective handling by the compiler is described in a later section of this specification)

As a compiler only manages one compilation unit at a time, it might be unable to analyse and detect globally used shared variables transferred between compilation units. In this case, the linker is analyzing data shared between compilation units at link time. For globally used shared variables the linker may modify the binary code such, that the respective variables are marked and/or treated as globally used.

In case a variable is accessed via pointers, the compiler might be able, by analysing the pointer arithmetic, to distinguish between local and global access to the respective variable. If such analysis is not possible for any reason, the variable may be regarded as global to ensure correct data processing.

Local variables may be managed as previously described and preferably kept relative to the stack, which are called local stack subsequently.

Globally used shared variables are managed separately: E.g.

a) Using a second "global" stack (GlobalStack). Such stack is preferably supported by the hardware, e.g. with a second stack pointer, or emulated in software. The emulation code might be automatically linked into the binary at compile time and/or runtime by the compiler and/or the linker, it might be part of the compiler library (e.g. C-Library), or it might be part of the operating system. In this case a local stack exists for the local variables and a global stack for the global variables. The stacks might be distinguished by different instructions for each stack and/or by different stack pointers.

b) By a global memory allocation (e.g. allocating space on the heap). Preferably an optimized memory allocation algorithm is used, e.g. might the allocated space on the heap be used for a plurality of global variables, which are managed in a stack-like manner by the software. The allocation code might be automatically linked into the binary by the compiler and/or the linker at compile time and/or runtime, or it might be part of the compiler library (e.g. C-Library), or it might be part of the operating system.

Binaries (which cannot be compiled anew) (e.g. legacy code) may be managed in various ways:

The simplest approach is to implement a control flag (CoherenceControl), e.g. in the processor control register, which enables or disables the coherence control. When the flag CoherenceControl is not set, the enhanced coherence control is disabled and the coherence is completely maintained for all variables and memories (e.g. the stack, which will be globally accessible). Preferably in the default mode or after hardware reset, the flag (CoherenceControl) is not set.

Legacy code is obviously not setting the control flag (CoherenceControl) during execution, therefore coherence is completely maintained.

Binaries being compiled to meet the requirements for limited coherence maintenance (as described above) may set the control flag (CoherenceControl), the according code is automatically inserted by the compiler.

In case the optimization of the legacy code is crucial, e.g. to increase the performance and/or reduce the power dissipation, the legacy code might be analyzed and modified in accordance to the inventive methods.

The access patterns on memory data can be analyzed by different approaches. Data being local might be identified by adding a respective TAG.

The stack might be defined local and all global or potentially global data (that is data which cannot be determined for certain by the analysis) on the stack may be removed and either moved to the heap or to an additional stack (GlobalStack). Both methods have been previously described in detail.

The analysis and code modification might for example be processed by a dedicated tool, which is executed once to trans-form the binary code, or it might be processed by a kind of interpreter running between the operating system and the executed binary code. Similar interpreters transforming the bi-nary at runtime are known in the prior art from Digital Equipment Corporation (DEC), which had several implementation to transform code (e.g. Intel x86 code) to their Alpha processors.

Another example are virtual machines on processors or processor cores without virtualization extension, analyzing the code for system calls etc.

Register Spilling

Applying the described concept to spilled register data is highly efficient. Register allocation of the compiler spills some registers to the memory hierarchy when additional data has to be managed within the register set of the processor, but too few registers are available. Register spilling should be very fast in both directions, writing to the memory and reading back from the memory. On the other hand, the spilled registers are inherently local, and depending on the code, register spills may occur frequently. Therefore, the processor efficiency in terms of bandwidth within the memory hierarchy, data access times and power dissipation can be significantly optimized applying the described concept on register spilling.

Typically, the compiler uses the stack to spill the registers with the stack pointer or frame pointer as a base. Spilling is implemented by stack relative load/store operations (e.g. using indirect addressing with the stack pointer as base). Based on the described concept, spilling is inherently optimized, as the stack is regarded local.

In some implementations a dedicated Spill Pointer may be implemented to define the memory space to which register data is spilled. This memory space is defined as local and no mechanisms for coherence, writing-back or -through etc. are implemented. In one embodiment the Spill Pointer does reference to the memory hierarchy, but spills directly to a tightly coupled memory (TCM), which is significantly reducing the load within the memory hierarchy. Whenever the spill pointer is used in address generation, a signal "spill-data" might be transferred together with the address to indicate a respective data transfer to the memory hierarchy.

While traditional TCM memories may be too limited in size to be used for large memory structures (e.g. stacks can grow relatively large). Reference is made to PCT/EP2009/007415, e.g. FIG. 14, which describes a special TCM being able to manage large data structures by a window like approach which has a visible set of the data structure (called window) in the TCM while surrounding structures are offloaded to the memory hierarchy. It shall be noted, that the offloaded data might be defined local with no coherence handling according to this invention.

Special data type indication signals used for data transfers between the processor and the memory hierarchy, such as "stack-access" and/or "spilled-data" are called TransferType signals.

Locking of Data in the Memory Hierarchy, Prioritizing

In one embodiment, the cache eviction strategy may depend on at least some of the previously described information provided by the program to the memory hierarchy.

Cache lines may to be evicted whenever current data accesses require data currently not stored in the cache, which causes a cache miss, but the respective cache locations are all occupied with other data already (e.g. all 4 sets of a 4-way associative cache contain data).

Inept eviction of cache lines increase the bandwidth necessary for data transfer between a cache and its higher-level memory unnecessary, consume power and simultaneously cause unnecessary cache misses decreasing the processor performance.

Heap data (and program code) have typically high spatial locality, data in a vicinity of referenced data will tend to be referenced soon.

Stack data (and register spills) have typically high temporal and spatial locality, an item referenced will tend to be referenced again soon.

Therefore it is not preferred to evict stack or spilled register data from the cache, as the likelihood that exactly the same data (or in case of stack, data very close by, likely in the same cache line) will be referenced again in the near future is comparably high.

In one embodiment, the respective cache controller is able to detect data sets respectively cache lines, which contain higher prioritized data. Such data might be stack data, register spill data and/or any kind of data with a respective TAG. As said before, such TAG might be directly associated with the data words or it might be kept in a descriptor, relevant for the respective data, e.g. a page descriptor and/or a cache line descriptor. Such TAG may also be provided from the processor to the memory hierarchy (and ultimately the cache) by the signal TransferType identifying the kind of data transfer as previously described.

Cache line having such a higher prioritizing TAG set, by any means, are preferably not evicted.

Only if there is no other choice, the eviction may occur.

The respective eviction strategy may have the following order:
Priority of choosing a line to replace upon a cache miss:
1. Any invalid line. If no lines meet this, then:
2. Any line not having a higher priority TAG. If no lines meet this then:
3. Any line.

Associative caches are typically implementing a Least Recently Used (LRU) strategy to select one of a plurality of associative data sets for replacement (and eviction).

The respective eviction strategy may have the following order:
1. Any invalid line. If no lines meet this, then:
2. Any line not having a higher priority TAG and not used LRU bit set. If no lines
3. Any line not having a higher priority TAG. If no lines meet this then:
4. Any line.

Another method is the use of a Least Frequently Used (LFU) counter, which can be implemented instead of or in conjunction with the LRU.

Speculative Prefetching and Flushing

The described TAG may be used to implement speculative pre-fetching and/or flushing of data (e.g. cache lines) in a cache. For example a cache controller may prefetch the following stack block, whenever the address to the stack overruns or underruns a certain threshold. Reference is made to PCT/EP 2009/007415, e.g. FIG. 14, which describes according mechanisms for TCM memories, which may be implemented by the cache controller according to this invention.

Level-1 Memory Architecture Having a Plurality of Memory instances being Concurrently Accessible The invention described hereinafter is preferably applied on Level-1 memory architectures. While typically the Level-1 memory is referred to as one or a plurality of TCMs, it shall be clarified, that a TCM could by also a Level-1 cache. In a preferred embodiment each TCM might be separately configurable at runtime by an executed algorithm and/or the operating system to operate as one of a Tightly Coupled Memory and a Level-1 cache. Preferably each TCM supports multiple banks of memory which may have different address ranges and/or the caches are multi-way associative. Associatively in the range of 2-, 4-, or 8-ways is regarded ideal for the most typical implementations.

While latency is of less importance for data flow, digital signal processing and reconfigurable processors, it has a significant impact on sequential algorithms requiring rather random and irregular access to the memory hierarchy.

Memories (TCM) tightly coupled to a processor core offer faster access at higher bandwidth and lower latency. One exemplary embodiment is described in PCT/EP 2009/007415, Vorback, which will be used for further explanation of the implementation details. Basically, all kind of existing TCM architectures as e.g. known from ARM processor, but also modern cache structures as e.g. known from Intel (e.g. Core2, Sandy-bridge, Larrabee) or nVidia, benefit from the inventions described in this patent.

As described in PCT/EP 2009/007415, Vorbach (see FIGS. 15 and 15a in PCT/EP 2009/007415, Vorbach) in one preferred embodiment the TCM supports automatic prefetch. The memory space in the TCM is virtual and translated via a subsequent MMU into physical addresses in the main memory. Virtual address spaces may be transferred block wise (e.g. in virtual memory pages) between the main memory and the TCM, in some embodiments the transfers may be done autonomously by Direct Memory Access (DMA) controllers.

As also described in PCT/EP 2009/007415, Vorbach (see e.g. FIGS. 7 and 9), processors benefit from a plurality of Address-Generators (AGEN) located in one or preferably a plurality of Load/Store Units and therewith supporting con-cur-rent memory access. This parallelism increases the utilization of the memory bandwidth significantly.

Consequently it is beneficial to have not one but a plurality of Tightly Couples Memories (TCMs) for parallel access. A TCM may operate as TCM or Level-1 cache.

The subsequently described structure may be located in each Load/Store-Unit of a processor core (e.g. of the Local Memory Block of the ZZYX), especially in the Local Address Generator (LAG) or between the LAG and the subsequent memory structure including the TCM. For details regarding the exemplary Load/Store-Units, Local Memories and Local Address Generators (LAGs) of the exemplary ZZYX processor see PCT/EP 2009/007415, Vorbach.

Tightly and Locally Coupled Memory System—Die Stack

Subsequently various embodiments of memories or memory hierarchies are discussed, being integrated on separated die(s) closely coupled to at least one processor die. Preferably the die(s) are closely interconnected to the processor die in a die stack and the same package Preferably, a very large bus interconnects the dices, enabling high data bandwidth. The close physical coupling in the same die stack and package is significantly reducing the capacity on the bus and enabling high transfer rates at low power dissipation.

Whenever subsequently the term "physically separated die" is used said architecture is meant. It shall be expressively noted, that the term "physically separated die" stands also for a plurality of physically separated die, without explicitly mentioning it.

The memory bandwidth of multi-core processors is even more crucial than for single-core processors.

Memories tightly coupled to specific processor cores are one approach to reduce bandwidth issues. On the other hand those memories are inflexible from a programming perspective, expensive and yet rather slow. The TCM memory of the ARM1136 processor for example is
a) located on the same die as the processor, reducing the yield and/or number of possible processor cores on the die. Also it is limited to a SRAM implementation as no satisfactory mixed DRAM+Logic silicon processes have been implemented yet
b) part of the physical memory space and under full control of the MMU. While this appears practical, the address translation and protection in the Memory Management Unit (MMU) increases the latency significantly.

In one embodiment the TCM is located on a physically separated die. Each processor core may have one dedicated TCM block on this separated TCM die. Processor cores and the TCMs are connected preferably via a wide data bus (>=128 bit) pro-viding high bandwidth at low frequencies for power saving reasons. The TCM die may comprise static memory (SRAM) or dynamic memory (DRAM), some implementation may even comprise Flash Memory or at least some additionally Flash Memory part.

In one embodiment the memory hierarchy including lookup tables and cache memories (e.g. the tree of FIG. 1) or at least parts of the memory hierarchy may be located on a physically separated die.

In some embodiments, Locally Coupled Memory (LCM) may be located on a physically separated die. It may replace the traditional TCMs or being additionally implemented. While it may be implemented in any kind of memory technology (e.g. SRAM, Flash, . . . ), preferably DRAM is used. The LCM might be shared by some or all processor cores as large memory area or consist of a plurality of smaller memory blocks each specifically dedicated to one processor core. Preferably the memory blocks are connected via a wide data bus (>=128 bit) to their respective processor cores. If the LCM is implemented as one or a plurality of large shared memories, the data bus might be even larger (>1024 bits). In both cases, the wide bus provides high bandwidth at low frequencies for power saving reasons.

Usually real TCM memory is reserved for small but performance critical data, for example: jump tables and/or interrupt tables, constants (e.g. for mathematical transformations (FFT, and others)), often used blocks of data being too large for being kept in the register file (e.g. video macro-blocks), crypto keys, local scratch data and spilled register data. Usually all these data are solely related with the processor core the TCM is associated to, but not shared between multiple processor cores.

It is therefore preferred to implement a "real" TCM memory, having very fast access time and low latency. It may not be located in the physical address space, but in the virtual to avoid access delays caused by the Memory Management Unit (MMU), e.g. due to address translation. Preferably, it has a window in the virtual memory space, into which it is directly mapped. In an enhanced embodiment, a plurality of windows may be supported, each being mapped into the TCM memory (at different areas) or banks of the TCM memory.

The hardware maps the window in the virtual memory space by one or a few simple and fast comparisons onto the physical TCM memory. The comparison preferably comprises a process TAG check, to ensure that the correct task and/or thread is accessing the TCM, by such avoiding erroneous referencing to TCM data of another process. Code is directly addressing the TCM. Processors not comprising the TCM may map the virtual address window into the physical memory through the MMU. This ensures code compatibility.

Switching from one thread to another may require exchanging the TCM. In this case the TCM content of a first suspended thread is completely or partially swapped into a higher level memory and afterwards the TCM content of the second resumed thread is swapped in from the higher level memory hierarchy. As the swap operations take plenty of time, it is preferred to swap to a very local but large memory at high bandwidth.

Preferably, the Locally Coupled Memory (LCM) is used for swapping the TCM. It has (as said before) preferably a very large bus interface, enabling high data bandwidth and being preferably closely coupled on another die in the same die stack and package, the capacity on the bus is low enabling high transfer rates at low power dissipation.

The swap operation is preferably performed by a Direct Memory Access controller (DMA) under control of the Operating System.

Nevertheless, moving the TCM to Locally Coupled Memory (LCM) may still negatively impact the system's performance. For most applications the negative impact may be acceptable. But some performance critical application may not be able to tolerate the delay. Having a plurality of processor cores it is therefore preferred to lock such tasks and/or threads to a specific core, where they are only very seldom or preferably not at all replace by switching another tasks and/or thread during runtime.

The swapping of TCM memory of one or a plurality of processor cores, typically by a plurality of tasks and/or threads, has significant impact on the definition of LCM within the memory architecture.

Basically, the LCM could be organized within the physical memory of the system. All transfers to the LCM are managed by the MMU accordingly. Virtual addresses could be marked (e.g. by said TAG and/or respective entries in the according descriptor tables) as to be preferably kept in the LCM. Then the LCM could be swapped against a second level storage of the system (e.g. a mass storage media, a network, the internet . . . ).

However, as the system benefits from the high bandwidth and low access time of the LCM, swapping to such distant and slow memories is inefficient.

Locally Coupled Memories (LCM) may be preferably used to store large and frequently needed data blocks, such as reference frames for video coding, address translation table for the memory management unit, database indexes, database and/or internet caches, etc. Also, they may be used for larger data blocks being shared between a plurality of processor cores.

Preferably Locally Coupled Memories (LCM) are evicted to the systems main memory (the primary storage, typically Dynamic RAM (DRAM)) and not to the mass storage (the secondary storage, typically hard-disk, flash memory, file servers, etc.). Address translation of Virtual Addresses onto LCM addresses should be fast and theoretically a direct mapping of virtual addresses is feasible as it has been previously described for the TCM memories. As the LCM space is much larger than the TCM space, direct mapping appears too limiting and therefore the LCM space is preferably under the control of the Memory Management Unit (MMU) transferring virtual addresses into physical addresses of the LCM. However, to increase the access speed, the translation time should be minimal. Therefore the address translation tables are a) preferably are locally stored within the processor or at least partially stored in the LCM, to avoid the access time of the memory hierarchy and/or b) kept short, so that one or two lookups are sufficient to translate a virtual address into its physical. Similar to virtual addresses mapped into the TCM, the LCM addresses may be located at specific positions within the virtual address range.

One simple exemplary embodiment of this type of LCM addressing is shown below:

| A47 . . . A32 | A31 . . . A18 | A17 . . . A00 |
|---|---|---|
| fixed | translated | index |

The value of the higher address bits A47 . . . A32 is fixed, e.g. to 0xFA00, defining the respective data to be located in the Locally Coupled Memory.

The middle addresses A31 . . . A18 point into a $2^{14}$=16 k entry page table. The records in the page table may contain at least some of the following information the base address in the Locally Coupled Memory (LCM), the task/thread ID of the processes owning the referenced data, an evicted marker and other fields, e.g. TAGs as described in this patent, locking as described in this patent, defining cache management and coherence for the data block (e.g. a shared TAG marking the data block as shared by a plurality of processor cores), or whether it is executable code or data, etc.

The lower 18 bits A17 . . . A00 are added as index to the base address for generating the physical address within the LCM. In this exemplary structure a page table having only 16 k entries is sufficient to map $2^{18}=256$ k blocks of data of a 4G memory space within a total memory space of $2^{48}$ into the LCM memory. The page table is small enough to be located close by the processor core, preferably on the same die or at least in close vicinity within a die stack.

Figure 8:
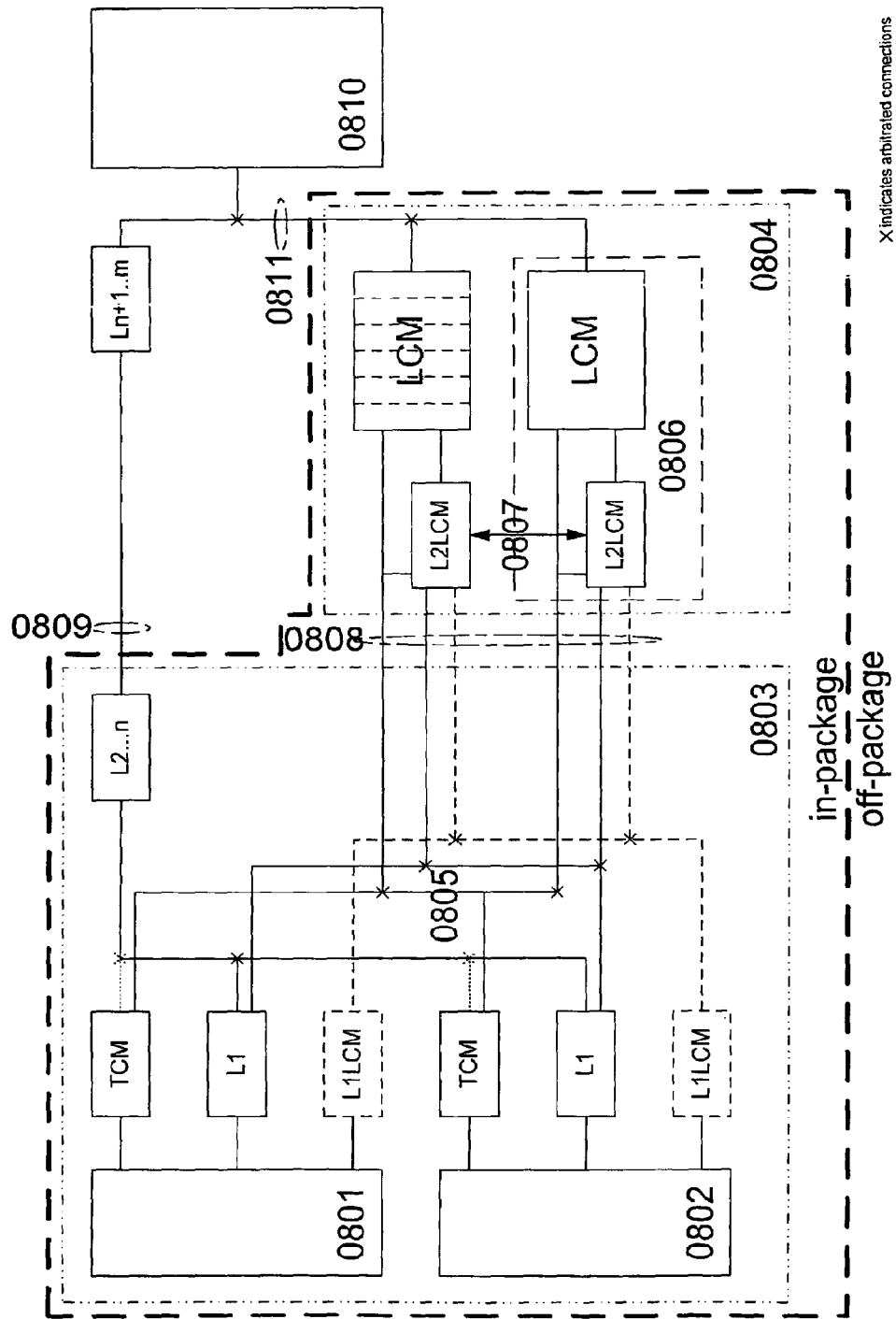
FIG. 8 is a block diagram illustrating an example overview including a memory hierarchy.

FIG. 8 gives an overview of theoretical considerations to the memory hierarchy. In this example two processor cores (0801, 0802) are used, but it is obvious that the hierarchy can be easily extended to a plurality of cores or scaled down to one core only. Each core has its dedicated Tightly Coupled Memory (TCM), which may comprise a plurality of separated memories, each being accessible by a dedicated Load/Store Unit. For details reference is made to PCT/EP2009/007415, Vorbach, e.g. FIG. 9. Each core has its dedicated local Level-1 cache (LEVEL-1). The Level-1 caches are connected to some higher level cache instances (LEVEL-2 . . . n), typically a single LEVEL-2 cache. In typical embodiments the processor cores, the local memories (TCM, LEVEL-1) and some higher level cache instances are located on a single silicon die (0803).

The Level-1 caches (LEVEL-1) are connected via a bus to the higher level cache instances (LEVEL-2 . . . n). The bus is typically arbitrated, so that one of the cores has access at a time. Parallel access may be supported in some implementations.

The TCM memories may also be connected to the higher level cache instances (LEVEL-2 . . . n) (dotted bus connection). However, in a preferred embodiment they are not directly connected to the higher level cache instances, but to the LCM. The LCM it preferably located on a separated die (0804). The die comprises the Locally Connected Memory (LCM) and additionally may comprise a dedicated Level-2 (LEVEL-2-LCM) cache. The LCM might be implemented as DRAM for optimal size and power dissipation, but might be SRAM in some implementations for faster access.

Other preferred RAM implementations are described below. Depending on the market and the respective requirements of a specific processor implementation, some of the below listed cores may be preferable over others:

Thyristor-RAMs (TRAM) may provide ideal power and speed spin-offs, combining the low power requirement with the high access speed of SRAMs. T-RAM is a new type of DRAM computer memory invented and developed by T-RAM Semiconductor, which departs from the usual designs of memory cells, combining the strengths of the DRAM and SRAM: high speed and high volume. This technology, which exploits the electrical property known as negative differential resistance and is called Thin-Capacitively-Coupled-Thyristor, is used to create memory cells capable of very high packing densities. Due to this, this memory is highly scalable, and already has a storage density that is several times higher than found in conventional six-transistor SRAM memory. It is expected the next generation of T-RAM memory to have the same density as DRAM.

Twin Transistor RAMs (TTRAM) may be an ideal replacement for DRAM as the cells are slightly smaller, particularly if a silicon on insulator (SOI) silicon process is used anyhow. While, theoretically and if the access to the memory is fast enough, TTRAM is applicable for cache and TCM memories, they may be particularly applicable for LCM memories. Twin Transistor RAM (TTRAM) is developed by Renesas. TTRAM is similar to conventional one-transistor, one-capacitor DRAM in concept, but eliminates the capacitor by relying on the floating body effect inherent in a silicon on insulator (SOI) manufacturing process. This effect causes capacitance to build up between the transistors and the underlying substrate, originally considered a nuisance, but here used to replace a part outright. Since a transistor created using the SOI process is somewhat smaller than a capacitor, TTRAM offers somewhat higher densities than conventional DRAM. Since prices are strongly related to density, TTRAM is theoretically less expensive. However the requirement to be built on SOI fab lines, which are currently the "leading edge", makes the cost somewhat unpredictable at this point.

In the TTRAM memory cell, two transistors are serially connected on an SOI substrate. One is an access transistor, while the other is used as a storage transistor and fulfils the same function as the capacitor in a conventional DRAM cell. Data reads and writes are performed according to the conduction state of the access transistor and the floating-body potential state of the storage transistor. The fact that TTRAM memory cell operations don't require a step-up voltage or negative voltage, as DRAM cells do, makes the new cell design suitable for use with future finer processes and lower operating voltages.

With the Renesas TTRAM, a read signal from a memory cell appears as a difference in the transistor on-current. A current-mirror type sense amplifier detects this difference at high speed, using a reference memory cell that allows reliable identification of the 0 and 1 data levels. This reading method significantly decreases power consumption by eliminating the charging and discharging of bit lines, operations required for reading DRAM memory cells.

A similar technology is Z-RAM, which uses only a single transistor and is thus even higher density than TTRAM. Like TTRAM, Z-RAM relies on the floating body effect of SOI, and presumably has a similar manufacturing process. Z-RAM also claims to be faster, as fast as SRAM used in cache, which makes it particularly interesting for those CPU designs, which are being built on SOI lines anyway.

Z-RAMs may be more area efficient then SRAM cells, particularly if a silicon on insulator (SOI) silicon process is used anyhow. Z-RAM, short for "zero capacitor RAM", is a registered trademark for a novel DRAM computer memory technology developed by Innovative Silicon based on the floating body effect of silicon on insulator (SOI) process technology Innovative Silicon claims the technology offers memory access speeds similar to the standard six-transistor SRAM cell used in cache memory but uses only a single transistor, therefore affording much higher packing densities.

Z-RAM relies on the floating body effect, an artifact of the SOI process technology, which places transistors in isolated tubs (the transistor body voltages "float" with respect to the wafer substrate below the tubs). The floating body effect causes a variable capacitance to appear between the bottom of the tub and the underlying substrate. The same effect, however, allows a DRAM-like cell to be built without adding a separate capacitor, the floating body effect taking the place of the conventional capacitor. Because the capacitor is located under the transistor (instead of adjacent to, or above the transistor as in conventional DRAMs), another connotation of the name "Z-RAM" is that it extends in the negative z-direction.

The reduced cell size leads, in a roundabout way, to Z-RAM being faster than even SRAM if used in large enough blocks. While individual SRAM cells are sensed faster than Z-RAM cells, the significantly smaller cell reduces the size of Z-RAM memory blocks and thus reduces the physical distance that data must transit to exit the memory block. As these metal traces have a fixed delay per unit length independent of memory technology, the shorter lengths of the Z-RAM signal traces can offset the faster SRAM cell access times. For a large cache memory (as typically found in a high performance microprocessor), TCM and/or LCM, Z-RAM offers equivalent speed as SRAM but requiring much less space (and thus cost). Response times as low as 3 ns have been claimed.

SOI technology is targeted at very high performance computing markets but is a relatively expensive technology compared with more common CMOS technology. Z-RAM offers the hope of cheaper on-chip cache memory, with little or no performance degradation, a most compelling proposition if the memory cell can be proven to work in production volumes.

Also, in some applications, it might be beneficial if the LCM provide non-volatile data storage. In those applications, flash-memory might be used for the LCM memory, or upcoming memory technologies, like e.g.:

Ferroelectric RAM (FeRAM or FRAM) is a random access memory similar in construction to DRAM but uses a ferroelectric layer instead of a dielectric layer to achieve non-volatility. FeRAM is alternative non-volatile memory technologies that offer the same functionality as Flash memory.

FeRAM advantages over Flash include: lower power usage, faster write performance and a much greater maximum number (exceeding 1016 for 3.3 V devices) of write-erase cycles. FeRAM disadvantages are: much lower storage densities than Flash devices, storage capacity limitations and higher cost, which makes them an unlikely candidate for LCM memories in most applications, however, in a few markets, the advantages of FeRAMs may make them an ideal choice.

Magnetoresistive Random Access Memory, which unlike conventional RAM chip technologies, in MRAM data is not stored as electric charge or current flows, but by magnetic storage elements. The elements are formed from two ferromagnetic plates, each of which can hold a magnetic field, separated by a thin insulating layer. One of the two plates is a permanent magnet set to a particular polarity, the other's field can be changed to match that of an external field to store memory. This configuration is known as a spin valve and is the simplest structure for a MRAM bit.

The Programmable Metallization Cell (PMC), is a new form of non-volatile computer memory being developed at Arizona State University and its spinoff, Axon Technologies. Infineon Technologies, who licensed the technology in 2004, refers to it as conductive-bridging RAM, or CBRAM. NEC has a variant called "Nanobridge" and Sony calls their version "electrolytic memory".

PCM provides a combination of longer lifetimes, lower power, and better memory density. Phase-change memory (also known as PCM, PRAM, PCRAM, Ovonic Unified Memory, Chalcogenide RAM and C-RAM) is a type of non-volatile computer memory. PRAM uses the unique behavior of chalcogenide glass, which can be "switched" between two states, crystalline and amorphous, with the application of heat. Recent versions can achieve two additional distinct states, effectively doubling its storage capacity. PRAM is one of a number of new memory technologies that are attempting to compete in the non-volatile role with the almost universal Flash memory, which has a number of practical problems these replacements hope to address.

SONOS, short for "Silicon-Oxide-Nitride-Oxide-Silicon", is a type of non-volatile computer memory closely related to Flash RAM. It is distinguished from mainstream Flash by the use of silicon nitride (Si3N4) instead of polysilicon for the charge storage material. A further variant is "SHINOS" ("Silicon Hi-k Nitride Oxide Silicon"). SONGS promises lower programming voltages and higher program/erase cycle endurance than polysilicon-based Flash, and is an area of active research and development effort. Companies offering SONGS-based products include GlobalFoundries Inc., Cypress Semiconductor, Macronix, Toshiba, and United Microelectronics Corporation.

IBM Racetrack Memory is an experimental non-volatile memory device under development at IBM's Almaden Research Center. In early 2008, a 3-bit version was successfully demonstrated. Racetrack has to potential to offer storage density higher than comparable solid-state memory devices like Flash RAM and similar to conventional disk drives, but with much higher read/write performance. It is one of a number of new technologies trying to become a universal memory in the future. Racetrack Memory uses spin-coherent electric current to move the magnetic domains along a nanoscopic permalloy wire about 200 nm across and 100 nm thick. As current is passed through the wire, the domains pass by magnetic read/write heads positioned near the wire, which alter the domains to record patterns of bits. A Racetrack Memory device is made up of many such wires and read/write elements. In general operational concept, Racetrack Memory is similar to the earlier twistor memory or bubble memory of the 1960s and 70s. Both of these used electrical currents to "push" a magnetic pattern through a substrate. Dramatic improvements in magnetic detection capabilities, based on the development of spintronic magnetoresistive sensing materials and devices, allow the use of much smaller magnetic domains to provide far higher areal densities.

Nano-RAM (NRAM) is a proprietary computer memory technology from the company Nantero. It is a type of nonvolatile random access memory based on the mechanical position of carbon nanotubes deposited on a chip-like substrate. In theory the small size of the nanotubes allows for very high density memories. Nantero also refers to it as NRAM in short. NRAM has a density, at least in theory, similar to that of DRAM. DRAM consists of a number of capacitors, which are essentially two small metal plates with a thin insulator between them. NRAM is similar, with the terminals and electrodes being roughly the same size as the plates in a DRAM, the nano-tubes between them being so much smaller they add nothing to the overall size. However it seems there is a minimum size at which a DRAM can be built, below which there is simply not enough charge being stored to be able to effectively read it. NRAM appears to be limited only by the current state of the art in lithography. This means that NRAM may be able to become much denser than DRAM, meaning that it will also be less expensive, if it becomes possible to control the locations of carbon nanotubes at the scale the semiconductor industry can control the placement of devices on silicon.

Additionally, unlike DRAM, NRAM does not require power to "refresh" it, and will retain its memory even after the power is removed. Additionally the power needed to write to the device is much lower than a DRAM, which has to build up charge on the plates. This means that NRAM will not only compete with DRAM in terms of cost, but will require much less power to run, and as a result also be much faster (write performance is largely determined by the total charge needed). NRAM can theoretically reach performance similar to SRAM, which is faster than DRAM but much less dense, and thus much more expensive.

In comparison with other NVRAM ("Non-Volatile RAM") technologies, NRAM has the potential to be even more advantageous. The most common form of NVRAM today is Flash RAM, which combines a bistable transistor circuit known as a flip-flop (also the basis of SRAM) with a high-performance insulator wrapped around one of the transistor's bases. After being written to, the insulator traps electrons in the base electrode, locking it into the "1" state. However, in order to change that bit the insulator has to be "overcharged" to erase any charge already stored in it. This requires about 10 Volts. Flash systems thus have to include a "charge pump" that slowly builds up power and then releases it at higher voltage. This process is not only very slow, but degrades the insulators as well. For this reason Flash has a limited life-time, between 10,000 and 1,000,000 "writes" before the device will no longer operate effectively.

It shall be explicitly noted, that the memory technologies described above, are depending on the specific application field of the processor also applicable for TCM memories and/or cache memories.

Some of the memories require special silicon processes and may not be usable for integration on the same die as the processor core(s). One aspect of this patent is the integration and combination of memories with processor cores by means of a stack of dies. Those memory technologies requiring a different silicon than the processor and/or those cheaper to integrate on a separated die, are implemented on a separated die and connected to the processor core(s) via a die stack. This is not only applicable for LCM memories, but also for TCMs and caches.

In some embodiments, for example, non-volatile Tightly Coupled Memories (TCM) may be implemented for each processor core, e.g. in addition or alternatively to normal TCM memories according to the state of the art. Those may be placed on a separated die and each of the respective processor cores may have a direct connection to its respective memory on the separated die. Obviously this is applicable for any kind of memory connected to one or a plurality of processor cores, such as e.g. caches.

Separated Level-1 caches may be implemented in the LCM path (LCM-Level-1, LEVEL-1LCM). One major benefit of the Level 1 memory architecture is that all TCM memories, both Level-1 caches—the standard LEVEL-1 cache and the optionally separated LCM-Level-1 cache are concurrently accessible by the respective processor core, such significantly improving the memory bandwidth.

For interconnecting the Level 1 memories (TCM memories, both Level-1 caches—the standard LEVEL-1 cache and the optionally separated LCM-Level-1 cache) with the higher level memory architecture preferably a plurality of buses (0805) are implemented, allowing concurrent data transfers between a plurality of Level 1 memories with the higher level memories. There may be one bus implemented for transferring data between the Level-1 caches (LEVEL-1) and the higher level cache instances (LEVEL-2 . . . n); another bus between the TCM memories and the LCM instance and other buses between the Level 1 caches (LEVEL-1 and/or LEVEL-1LCM) and the LCM instance. If dedicated LEVEL-1LCM caches are implemented, the standard LEVEL-1 caches may not have a bus connection to the LCM instance.

Typically the LEVEL-1 and/or LEVEL-1LCM caches connect to (and transfer data with) the LCM through a higher level cache (e.g. a LEVEL-22 cache, LEVEL-2-LCM). The TCM memories may also connect to (and transfer data with) the LCM through that cache. As said the TCM typically contain a different type of data, e.g. constants, arrays of constants, scratch data, etc. According to the nature of the TCMs they are usually loaded or off-loaded in a block-wise manner in conjunction with context switches but not sporadically and/or single word oriented during operation. Therefore, in a preferred embodiment, the TCM bus connects directly to (and transfers data directly with) the LCM, bypassing the LEVEL-2-LCM caches.

In one embodiment, the LCM may be split in a plurality of memory banks (see dotted lines within LCM), allowing access to at least some of the banks in parallel for increasing the bandwidth. In this embodiment, the LEVEL-2-LCM cache may be also implemented having banks of cache memories, with multi-port TAG memories.

In some implementations, a plurality of completely separated LCM memories may be implemented (two shown in the exemplary embodiment), even having a separated LEVEL-2-LCM cache (see the dotted box 0806). The separated LCMs may operate e.g. in different address ranges to allow efficient concurrent data transfers. Those implementations are highly efficient, if the processor cores typically operate on dedicated LCM data, and only seldom access the data of other processor cores. The separation of the address ranges may be managed by the operating system, defining different address ranges for each of the processor cores (or potentially groups of processor cores) at the start-up of an application. In some embodiments threads within a task may share the same address range (and therefore LCM memory) to allow efficient exchange of data, while other tasks (and their threads) operate in completely different address ranges to increase the bandwidth of the LCM hierarchy by allowing concurrent data transfer to different LCM memories. In some embodiments (when e.g. address ranges may overlap) the LEVEL-2-LCM caches ensure the coherence (0807) of the data cached and/or stored in the respective LCM.

The higher level cache instances (LEVEL-2 . . . n) is connected to the system's main memory (0810), typically through another cache hierarchy (Level −n+1 . . . n). The LCM memories are also connected to the system main memory (0810), but typically bypass the additional cache hierarchy (Level −n+1 . . . n) due to the nature of the data managed (for similar reasons as previously described for the LEVEL-2-LCM bypass of the TCM data). As described subsequently in detail, simple rules can avoid inconsistencies, e.g. by using disjunct parts of the virtual address space.

The chip-to-chip interface (0808) between the chips in the die stack (and/or in the same package) is preferably implemented using a wide interface for high bandwidth data transfers at low power dissipation. The data bus is implemented such, that a plurality of data words having typically 128 bits (preferably even 1024 bits) are transferred in parallel in a single clock cycle.

The interfaces to the off-package memory (0809 and 0811) on the contrary are preferably implemented small, transferring less data words in parallel. They might be even implemented serially. In both cases, the interface operates at considerably high frequency. Those measures are taken to reduce the pad count and/or off-package layout complexity, which is preferred to reduce power consumption of the interfaces and/or the system design complexity.

Figure 9:
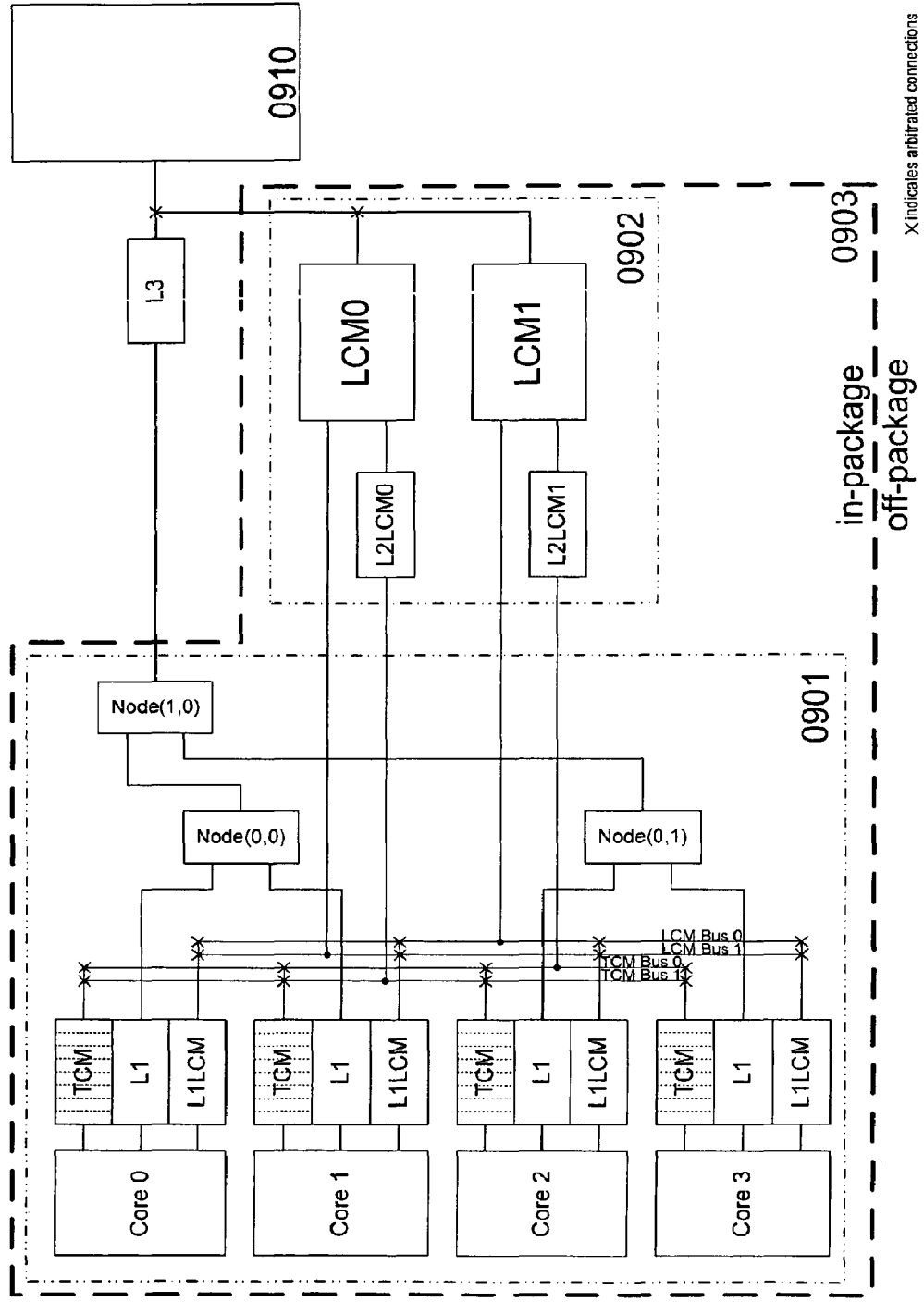
FIG. 9 is a block diagram illustrating an example implementation including separated memories and a memory hierarchy.

An exemplary implementation is shown in FIG. 9.

Four processor cores (Core 0, Core 1, Core 2, Core 3) are implemented on the processor die (0901). The Level-1 memory architecture of each of the cores comprises a) a TCM memory, preferably having multiple instances of memories being independently and concurrently accessible (as indicated by the dotted lines, exemplary embodiments are shown in PCT/EP 2009/007415), b) a Level-1 cache for data transfer with the external memory structure, c) a Level-1 cache for data transfer with the LCM memory. Preferably, the LCM memories are located on a separated die (0902) within the same package (0903).

The LCM memory is split into two separated memories (LCM0 and LCM1). The memories are independent and concurrently accessible. To keep the system design efficient, the memories are positioned in separated physical address ranges which do not overlap. This eliminates coherence issues between the memories (LCM0 and LCM1). Each of the memories has its dedicated Level-2 cache (LEVEL-2-LCM0 for LCM0 and LEVEL-2-LCM1 for LCM1). As the memories are located in distinct address spaces, no coherence protocols between the caches are necessary.

The LEVEL-1LCM caches are connected to two separated LCM buses, each bus being dedicated to one of the LCM memories. The connection to the respective bus is arbitrated between all LEVEL-1LCM caches. The respective bus is selected on basis of the address range of the data transfer, as each of the LCM memories are located in distinct address spaces. The two buses support maximum bandwidth as they are simultaneously available for concurrent data transfers.

Similarly the TCM memories are connected via two separated TCM buses supporting concurrent data transfers to the LCM memories. The TCM memories typically do not access the LCM memories randomly and/or sporadically, but typically load or off-load blocks of data. Those reside within the TCM for a comparably long time, as they typically only load or off-load due to context (application, task or thread) switches. As caching of those data blocks is inefficient (as it is typically not required) the TCM buses bypass the LEVEL-2-LCM caches and are directly connected to the LCM memories. There, the access via the LEVEL-2-LCM cache and the TCM bus is arbitrated.

The main memory hierarchy is formed by a tree according to FIG. 1. The Level-1 caches (LEVEL-1) are connected to a first level of nodes (Node(0,0) and Node(0,1)), which then connect to a root node (Node(1,0)) forming a binary tree. In this example the Nodes form a Level-2 cache instance of their own (e.g. by having local cache memories, see e.g. 0190 and 0191, which is also described subsequently "Tree having large memories"). The root node is connected to the package external (off-package) main memory (0910) via an external Level-3 cache (LEVEL-3).

Data Access/Read Strategy in the Tree (i.e. Memory Hierarchy)

In a preferred embodiment, the tree has to check for each data access for local availability of the data in the tree. Preferably, this policy is strictly required, ensuring that data is only accessed at higher memory level (above the tree), if it is definitively not available within the tree. This preferred policy ensures the data coherence in the tree.

Memory hierarchies in the prior art implement various policies how to manage data within the structure:

Strictly inclusive caches guarantee to keep all data in the LEVEL-1 caches also in the higher-level caches (e.g. LEVEL-2).

Exclusive caches guarantee that data is kept exactly once in the hierarchy, i.e. in exactly one cache.

Mainly inclusive caches may or may not keep data in the LEVEL-1 caches also in the higher-level caches (e.g. LEVEL-2).

In the prior art, a memory hierarchy is implementing using one of such policies, but may never change from one to another or even mix those.

According to this invention, data (e.g. TAGged data structures and/or pages having a TAG) may be treated differently, depending on the TAG. For example, data tagged with:

Single Owner (SO), Preferred Owner (PO), Floating (FT) is exclusive and exists only once in the tree;

Single-Write/Multi-Read (SW-MR), Duplicate-Read-Only (DRO) may be available at least in a plurality of Level-1 caches;

Write-Exceeds-Read (WER, W>R) is exclusive and exists only once in the tree, and is located as a single instance in a higher level cache in the tree;

Write-Almost-Equal-Read (WAER, W≈R) may exists multiple times in the tree and is located in at least one higher level cache in the tree.

In any case, the preferred standard policy is to only duplicate data if unavoidable and/or allowed/required by the TAG for avoiding coherence issues and reducing the efforts for maintaining coherence.

Cache Write Policy

Basically, the caches may implement any write strategy (write-back, write-through), particularly it may be beneficial if some caches within the memory hierarchy operate using other write strategies than others.

As previously described, it is preferred if addressed data is accessed in the memory hierarchy (tree) first and only if the addressed data is not available in the tree higher-level memories are accessed. On basis of this policy, it is not necessary to update the main memory frequently, as all processors and/or processor cores will access the data in the tree (if available). Therefore, it is not necessary to implement the costly, bandwidth consuming, write-through strategy, but a bandwidth conserving write-back strategy is preferred. It shall be noted, that obvious for one skilled in the art the tree can be extended beyond the boundaries of a single chip up to system level. On system level a plurality of chips may access and/or share data in the extended tree.

Note, that certain data TAGs as described in detail in this specification may require updating copies of the same data stored in other locations in the memory hierarchy. These updates are closer to a write-through policy than to a write-back policy. However, this kind of updates only applies to the pages and/or cache lines the respective TAG refers to and does not conflict with the generally preferred write-back strategy. Furthermore, such updates preferably involve only data instances within the tree, but may not update higher-level memories and/or the main memory.

Tree Having Large Memories

In one embodiment the nodes of the memory hierarchy according to FIG. 1 may comprise significant amounts of memory (e.g. 0190, 0191) to implement a cache tree. This is particularly beneficial if the memory management strategy provides for data blocks being held at higher levels, e.g. a) data blocks being shared between a plurality of processor cores, which are more frequent written than read, (Write-Exceeds-Read (WER, W>R)); or b) relatively large data blocks being frequently used by at least one processor core, but too large to keep it close to the processor core in the Level 1 cache (e.g. reference frames for video encoding, address translation table for the memory management unit, database indexes, database and/or internet caches, etc., (Keep-Local (KL))). It might be inefficient to implement memory in each of the nodes, but having memories at some levels may reduce the data transfer and bandwidth within the tree significantly. The tree of FIG. 1 may for example not have memories at node level 0 (nodes 0,0; 0,1; 0,2; 0,3), but at node level 1 (node 1,0; 1,1).

Those memories (Node Memories or NM) might be static RAM (SRAM) or, particularly at higher levels, dynamic RAM (DRAM). The Node Memories (NM) might be alternatively implemented and/or used to the LCM and even completely replace the LCM in the system as their handling in software as well as the hardware implementation is less complex.

When large Node Memories are implemented, in particular if DRAM silicon processes are used, it is preferred to position them on a physically separated die. The die may also comprise the tree nodes (including e.g. their state-machines, bus interfaces, lookup tables, etc) and bus hierarchy.

The interconnection between this physically separated die to other die(s), comprising e.g. the processor cores or in one embodiment the tree nodes or the tree hierarchy is preferably implemented using very wide buses (256 bit, preferably even 1024 bits) for achieving high data transfer bandwidth, operating at preferably low frequency for power saving.

Memory Space and Addressing

It is preferred to keep often accessed data very close to the processor cores in the TCM memories. Therefore, the access of the TCM memories should be optimized for high bandwidth and in particular low latency. Frequently accessed data, such as stack, spilled register variables, constants and scratch data benefit from low access latencies.

However, accessing the TCM memories through the Memory Management Unit for translating the virtual address into a physical address is highly inefficient as the latency is significantly increased. On the other hand, directly addressing the TCMs in software using physical addresses, is inflexible and—without any Memory Management Unit—context switches become highly problematic.

For LCM memories mainly the same considerations apply, only the data typically stored in the LCM may be less frequently accessed and a slightly higher latency is acceptable without significant performance decrease.

In one preferred embodiment the virtual address space may be divided into multiple sections, some sections have specific fixed addresses. An example is shown in FIG. 10.

A 48-bit virtual address space is divided into 3 sections:
1. TCM section (TCM space)
   The higher virtual address bits (A32 to A47) are fixed to all 1 (OxFFFF hexadecimal) and the virtual address bits A20 to A31 are also fixed to all 1 (0x0FFF) to de-fine the TCM space within the virtual address space.
2. LCM section (LCM space)
   The higher virtual address bits (A32 to A47) are fixed to all 1 except A32 (which is 0) (OxFFFE hexadecimal) to define the LCM space within the virtual address space.
3. Normal address section (main space)
   All remaining addresses (except A47 . . . A32==OxFFFE and A47 . . . A32==OxFFFF) are within the traditional virtual address space as being defined by the state of the art.

FIG. 10a shows exemplary mappings from the virtual address space into the physical address space. Shown is a virtual address space, according to one embodiment of the invention, with fixed TMC and LMC spaces, either due to fixed addresses defined either by the hardware or by software parameters. Virtual addresses in the LCM space are typically mapped into the physical LCM memory space (1011), but some LCM data may reside temporarily in the main memory space (1012), off-loaded by the Memory Management Unit.

Respectively virtual addresses in the TCM space are typically mapped into the physical TCM memory space (1013), but some LCM data may reside temporarily in the LCM memory space (1014), off-loaded by the Memory Management Unit. They can be further off-loaded from the LCM memory space into the main memory.

Respectively virtual addresses in the main memory space are typically mapped into the physical main memory space (1015), but some main memory data may reside temporarily on a mass storage media (such as a disk drive) (1016), off-loaded by the Memory Management Unit. Any data in the main memory (including off-loaded LCM and/or TCM data) can be further off-loaded by the Memory Management Unit to a mass storage media (such as a disk drive).

TCM Section

The TCM section is a window within the virtual memory space into one or a plurality TCM memories and/or memory banks According to the exemplary embodiment of FIG. 10, the address bits A16 to A19 select one of a plurality of TCM memories, the address bits A12 to A15 select one of 16 banks within the selected TCM memory and the lower address bits A00 to A11 define the data address within the selected bank.

In a preferred embodiment, the addresses A00 to A19 are not translated, but define directly the physical address. This reduces the latency significantly, as not additional latency for the address translation by a Memory Management Unit (MMU) is required.

Figure 11A:
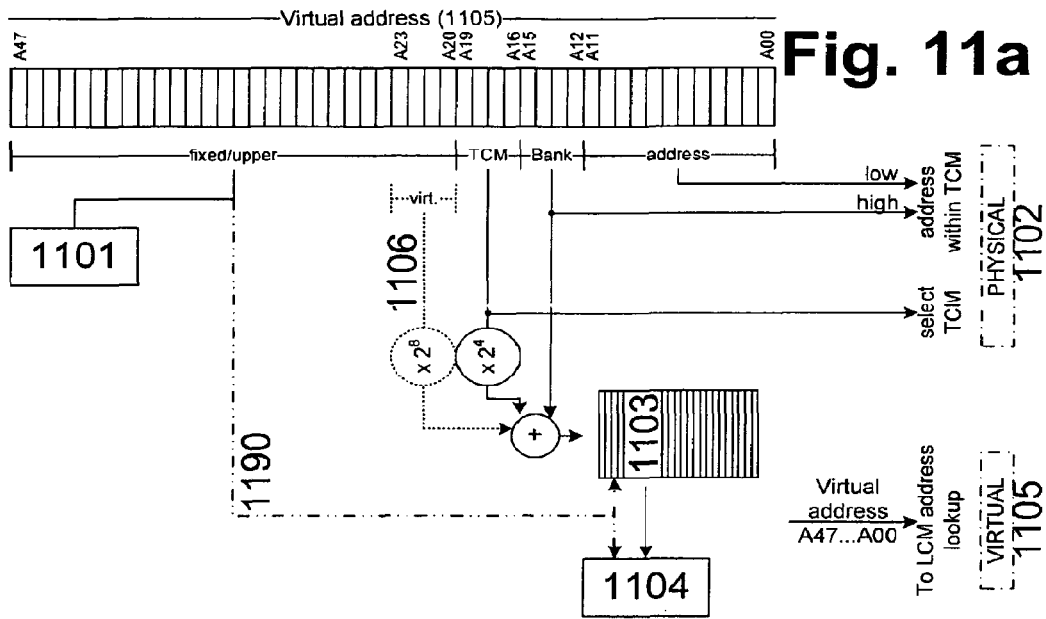
FIG. 11a is a diagrammatic illustration of an example implementation of virtual address control logic with respect to tightly coupled memory (TCM)
Figure 12:
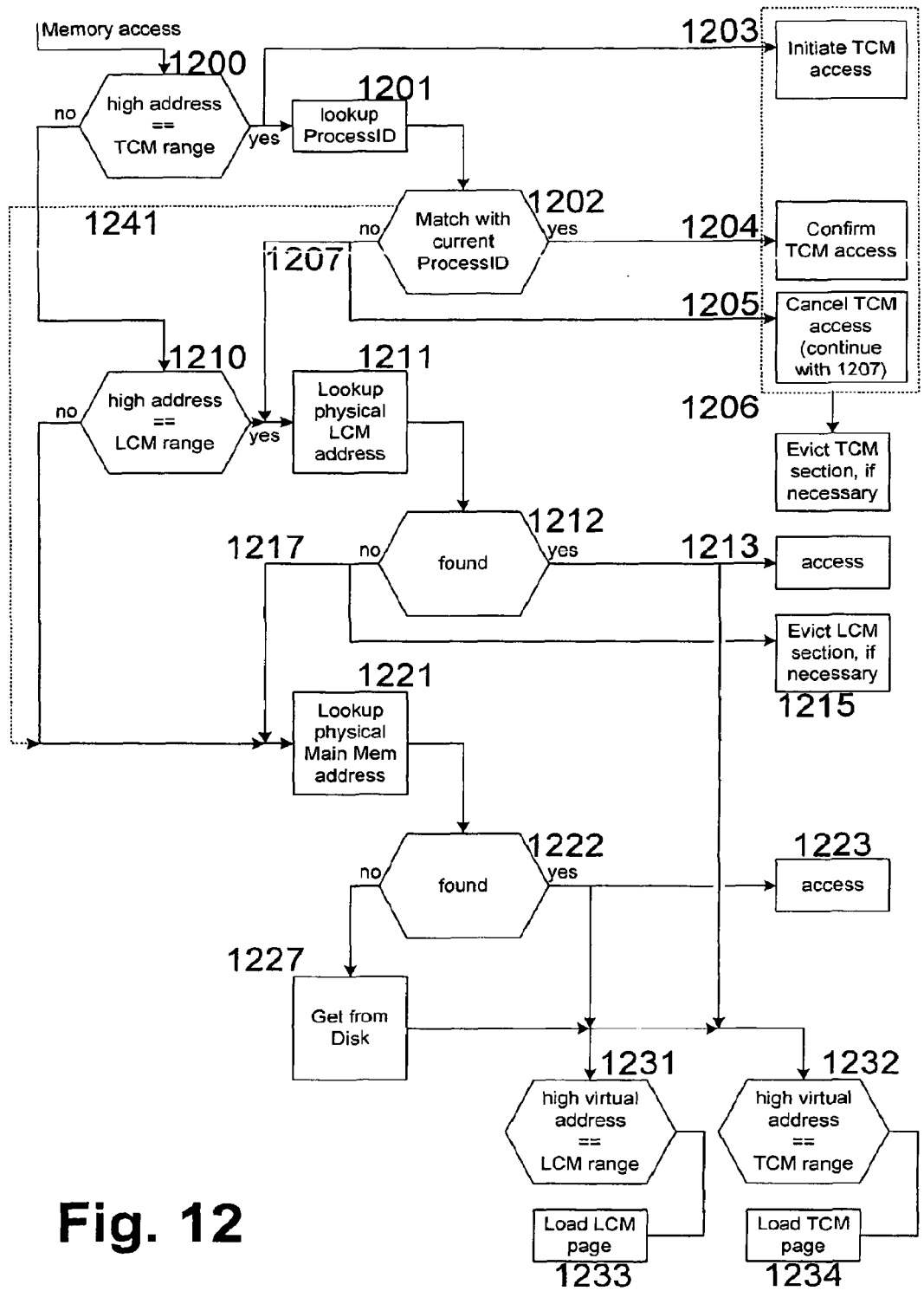
FIG. 12 is a flow diagram illustrating example access methods to memories.

An exemplary embodiment of the virtual address control logic, e.g. implemented within the Memory Management Unit, is shown in FIG. 11a, the respective access methods are shown in FIG. 12. The address bits A20 to A47 are checked by a comparator (1101) for the predefined fixed address (e.g. A47 . . . A20==OxFFFFFFFE), which indicate a TCM access (1200).

The TCM bits (A16 . . . A19) select directly and without any address translation one TCM memory of a maximum of 16 TCM memories. The bank bits (A12 . . . A15) select directly and without any address translation one bank (of 16) within the selected TCM memory. The lowest address bits finally directly address the data within the selected bank. As all virtual address bits (A00 . . . A19) defining the data location within the TCM memory space are directly mapped onto the physical TCM memory address bits (1102), without any form of translation, the data access is very fast.

The direct address translation has one significant problem: There is no mechanism in case of context switches to automatically off-load and load the TCM memories. Even worse, for two threads belonging to different tasks, one thread could erroneously access the TCM data of the other thread and operate on the wrong set of data. The software has to ensure that the TCM data is updated with each context switch. This is theoretically doable but not preferred as it is risky and slow.

In a preferred embodiment, the TCM—and depending on the implementation preferably also the bank address—has a related entry in a lookup table (1103), which is looked-up (1201) in parallel with the data access (1203) in the TCM. The entry represents the ProcessID (PID) of a task and its threads owning the data in the respective TCM section. If the respective TCM section is unused, an invalid tag is stored in the lookup table, e.g. after reset of the processor. If the respective TCM section is evicted, an invalid and/or evicted tag is stored in the lookup table. A comparator (1104) compares (1202) the ProcessID entry with the ProcessID of the currently executed thread (or task).

In one embodiment, a virtual address space may be supported, that maps parts of the virtual address space (pseudo virtual addresses) directly onto physical address spaces (e.g. TCM, LCM) without or only with limited address translation. As exemplary shown in FIG. 11a, some pseudo virtual addresses (1106, A20 . . . 23) may be additionally checked for a match in the lookup table 1103.

If the address pattern has the correct ProcessID stored in 1103, the respective address range A00 . . . A19 is stored in the TCM. If the ProcessID is wrong (the compared ProcessIDs 1202 do not match) or the look-up table entry is invalidated, the address range is not present in the TCM and must be loaded, while previously evicting the data stored at the required range if necessary. As no address translation of the pseudo virtual addresses is done, the method is not a real virtual address translation, which would be more complicated and time consuming. Still the TCM memories are accessible in parallel to the address range check and no address translation is done or required. The access fails if the pseudo virtual address does not match the address range present in the TCM, in which case the respective range is loaded. TCM access is delayed until the correct data is present in the TCM.

Only if the entry's ProcessIDs matches the ProcessID of the current thread (or task) the TCM access is confirmed (1204), which means in case of a write operation the writing into the TCM is enabled, in case of a read operation the read data is marked valid and accepted by the processor core. Otherwise, the TCM access is temporary cancelled (1205) and put on hold. If an access is put on hold, the currently accessed TCM section is evicted (1206), which means preferably off-loaded (spilled) to the LCM memory; in some cases and/or implementations it may also be off-loaded to the main memory.

After eviction the currently accessed TCM section is loaded (1207) with the data belonging to the currently executed ProcessID, either from the LCM or main memory as it is subsequently described. The ProcessID lookup table (1103) is up dated with the current ProcessID, which data now resides in the according TCM sections. Once the respective data is available in the TCM the data access once put on hold (1205) is completed.

Both off-loading and loading of the TCM data is done in hardware by a Direct Memory Access (DMA) controller like TCM controller unit. The addresses (target address for off-load and source address for load) are preferably calculated by the MMU controller (preferably with a special implementation for the LCM memories as subsequently described in FIG. 11a and FIG. 12) on basis of the virtual TCM address (1105), which provides the addresses to the TCM controller unit.

The lookup table (1103) is preferably implemented such, that fast access with low latency is possible. Preferably, the lookup table is accessible with one clock cycle latency. Therefore, it is typically located on the processor die (e.g. 0901), close to the Load/Store units and/or the Memory Management Unit (MMU) and implemented as Static RAM (SRAM). For details reference is made to the exemplary implementation of PCT/EP2009/007415, e.g. FIG. 15).

LCM Section

Figure 11B:
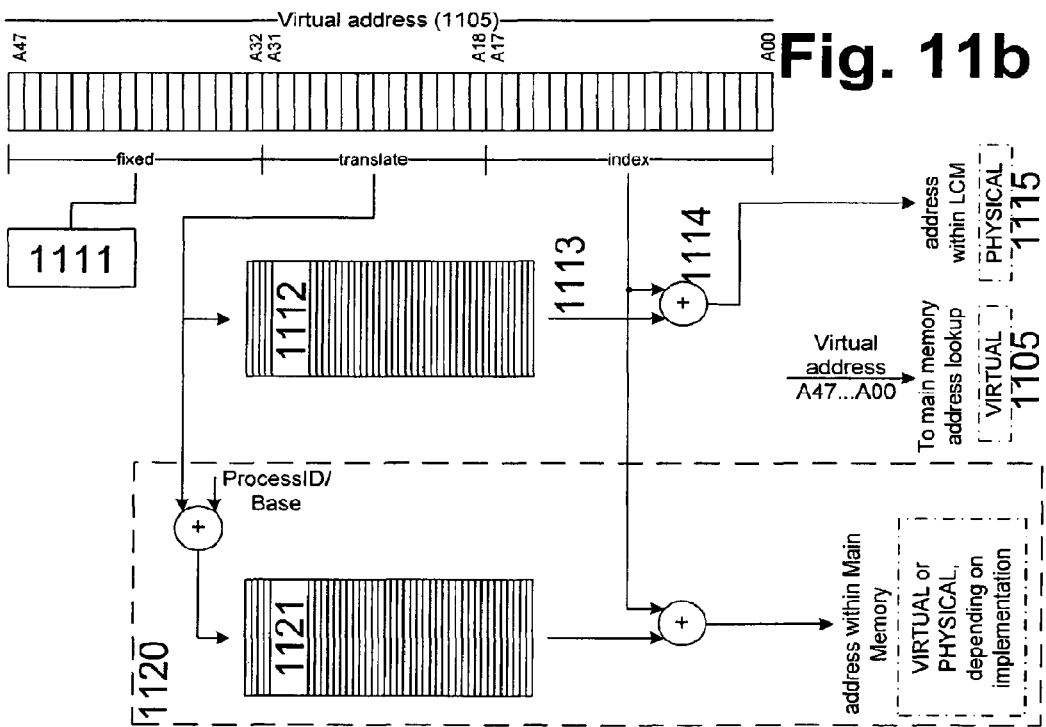
FIG. 11b is a diagrammatic illustration of an example implementation of virtual address control logic with respect to locally coupled memory (LCM)

To reduce the latency for LCM accesses, the address translation of the LCM space (see FIG. 10) is preferably kept simple and therefore limited to one lookup only. Theoretically this leads to either a very large address lookup table (page table) (wide large virtual address range, wide "LCM lookup" field) or very large pages (wide large index range, wide "index" field). To keep both ranges of acceptable size the highest address bits may be fixed to a specific value or pattern, which may be detected by simple logic and directly references the LCM memory space. In the exemplary implementation of FIG. 10, FIG. 11, and FIG. 12 the address bits A33 to A47 are fixed to all 1 and A32 is fixed to 0 (A32 . . . A47==0xFFFE). The addresses A32 to A47 are checked by a comparator (see FIG. 11b, 1111); a match indicated a LCM access (1210). The next lower address bits A20 to A31 are looked-up (1211) in an LCM address translation table (LCMATT, 1112).

In case the addressed data is located in the LCM (1212), the LCM address translation table (LCMATT, 1112) returns the base physical address in the LCM (1113), which is added (1114) to the lower virtual address (index) to compute the physical address in the LCM (1115) and the data access in the LCM is performed (1213).

In case no entry is found in the LCMATT or the entry is marked invalid and/or evicted (LCMATT miss) (1212), the LCM access is aborted and the virtual address 1116 is searched in the address translations table(s) of the main memory (1217).

If the LCM is full and/or the selected memory page is in use and contains modified data, it is evicted to the main memory hierarchy (1215).

In some implementations, the LCM address translation table (LCMATT) and the main memory address translation table(s) (MMATT) are searched simultaneously. This enables faster access to the main memory in case of a miss in the LCMATT, but increases power dissipation and possibly required additional bandwidth in the main memory hierarchy (e.g. the Nodes in FIG. 1 and FIG. 8, and/or the Level-1, -2, and -3 caches in FIG. 1, FIG. 7, and FIG. 8). In some embodiments, it may be selectable by software either globally for all LCM addresses or for a subset of LCM addresses whether the MMATT are concurrently searched.

In some embodiments, an address translation structure (1120) separate from the address translation (page tables) for the main memory is used to translate virtual LCM addresses for the main memory hierarchy in case of a LCMATT miss. The separate structure (1120) may comprise one or a plurality of address translation tables (1121), which are either located within the LCM, the main memory or (at least partially) implemented as Translation Lookaside Buffers (TLBs). TLBs are well known in the state of the art. As the MMATT the separate structure may be searched in parallel to the LCMATT for speeding up the access of the main memory in case of a LCMATT miss.

The address translation table (LCMATT) is preferably implemented such, that fast access with low latency is possible. Preferably the lookup table is accessible with one to three clock cycle(s) latency. Therefore, it is typically located on the processor die (e.g. 0901) or LCM die (e.g. 0902). In some embodiments, Translation Lookaside Buffers (TLB) may be implemented to speed up the lookup. TLBs are cache structures, typically implemented in SRAM and located close to the Load/Store Unit and/or Memory Management Unit on the processor die (e.g. 0901).

TCM and LCM in the Full Virtual Address Space

Based in the description of FIG. 11a, another embodiment is described, allowing for placing TCM and/or LCM anywhere in the virtual memory space, and not requiring the use of fixed address spaces.

The memory 1103 is extended such, that not only the ProcessID is stored, but also the upper part of the virtual address.

The upper part of the virtual address is that part of the address, which is not used to address the TCM and/or LCM directly. In this exemplary embodiment, this are the address bits A20 to A47 for the TCM and A32 to A47 for LCM. The comparator 1104 compares in this embodiment not only the ProcessID, but checks also, if the upper part of the current virtual (1190) address matches the one stored in the memory 1103. Only if both, the ProcessID and the address part match, access to the TCM is granted. Whenever the TCM memory is up-dated with data from a higher-level memory, the upper part of the respective virtual address (1190) is stored in 1103, together with the ProcessID.

This embodiment allows for having TCM memory virtually addressed and located anywhere in the virtual address range, at the penalty of a larger memory 1103 and a wider comparator 1104. In addition, the identification if TCM data requires additional software effort, as it is not clearly assigned to a specific address range.

Obviously, for one skilled in the art, the LCM addressing can be extended using a similar memory and comparator structure for checking the respective upper part of the virtual address. Only there is no need to check the ProcessID.

Obvious for one skilled in the art, the previous embodiment can be extended to a cache-like structure, in which the memory 1103 is organized as the TAG-memory of a cache. A first main difference to the previous embodiment is in the addressing. Some of the upper part of the virtual address (e.g. A31 to A47) may be used index for addressing the memory 1103 and the addresses A12 to A19 (Bank+TCM) and the remainder of the upper part (e.g. A20 to A30) constitute an address TAG. The comparator 1104 then compares the stored address TAGs of the indexed line with the respective part of the current virtual address. Note that the TAGs described in this embodiment are address TAGs and should not be confused with the data TAGs described in the remainder of this specification.

In yet another implementation, the TCM and/or LCM address space might still be fixed within the virtual address space, but not at a predefined address (i.e. fixed address bits A20 to A47 for the TCM and A32 to A47 for LCM). In this embodiment, the address might be programmable, either on a global basis (e.g. defined by the system or operating system) or at a process basis (e.g. defined by a process). The respective parts of the virtual address are then not compared to a fixed predefined but programmable value.

Various other implementations based on the ones described are feasible for one skilled in the art.

Main Memory

The Main Memory address translation works basically according to the state of the art. The incoming virtual address is translated (1221) into the respective physical address using address translation tables (page tables, as known in the state of the art). Translation Lookaside Buffers (TLBs) may be implemented in the processor die (e.g. 0901) caching the address translation tables for faster lookup.

If the TCM and/or LCM addresses are found in the according memories (see 1202 and 1212), no main memory access is per-formed. If not, the main memories address translation tables (page tables) are searched for the respective address entries. At this level TCM and LCM addresses are processed in exactly the same way as normal virtual addresses, no distinction is made. If (1222) the respective virtual address is available in the physical memory, it is accessed (1223). If (1222) not (page fault) the according page is loaded from a mass storage memory (e.g. a page- or swap-file on a hard-drive, flash-drive, database, etc) (1227).

If the main memory access is initiated by a TCM (1232) or LCM (1231) address not only the addressed word is accessed, but a) In case of a miss (1212) in the LCMALT table (1211), the respective LCM page is loaded (1233);

b) In case of a mismatch (1202) in the ProcessID table (1201), the respective TCM page is loaded (1234).

Preferably, the address range check (1200 and 1210) and initiation of the respective action (either 1201, 1211 or 1221) according to FIG. 12 is processed simultaneously in parallel within the same clock cycle.

In one embodiment, the address lookup 1221 is concurrently initiated with the range checks 1200 and 1210. In case one of the range checks (1200 or 1210) succeeds, the main memory access is aborted. This concurrent processing may save at least one clock cycle when main memory access is required.

In case of mismatches (1207) and/or misses (1217) the next step is preferably entered sequentially for reducing the power consumption and memory bandwidth requirements. However, in some implementation, at least some of the lookups (1201, 1211, and/or 1221) are preformed concurrently to achieve the maximum performance. The specific behaviour might be configurable in software, by the application (e.g. the task or thread) and/or the operating system (e.g. based on user set-tings, e.g. setting performance/power efficiency trade-offs).

Inverted Page Tables

Traditional page tables, e.g. multi-level page tables (see FIG. 10, Main Space: lookup 0, lookup 1, lookup 2) work well for 32-bit processors, but are too large for 64-bit processors. Inverted Page Tables are used in 64-bit systems, which use the physical page number as an index. Those tables grow in accordance to the physical memory size and are more efficient from that perspective. But, hashes are required for searching the page tables. Therefore, inverted page tables are typically entirely managed in software, e.g. by the operating system, and rely on the Translation Lookaside Buffers (TLB)s for caching the address translation to perform. Details can be found e.g. in "Modern Operating Systems, Andrew S. Tanenbaum", or "Fundamentals of Computer Organization and Design, Sivarama P. Dandamudi", which are both fully incorporated by reference.

The inventive address translation system, e.g. according to FIG. 12, may implement both multi-level page tables and/or inverted page tables. Independent of the used method, the steps for selecting the TCM and/or LCM space remain the same. The lookup 1221 is processed according to the used method, either using multi-level or inverted page tables.

As said, preferable TLBs are implemented, so that first the TLB (as a hardware address cache) is checked and then, only in case of a miss, the page tables are searched. The implementation of TLBs and the respective details are well known in the art, reference is made e.g. to the two books referenced above (Tanenbaum and Dandamundi).

Definition of TAGs by Virtual Memory Space

So far, TAGs have been described, which were attached either directly attached to data or to pages via a page header. In both cases, additional memory space is required for storing the TAGs and special treatment of the TAGs might be required. In one embodiment, TAGs may be defined by the virtual address. Some address spaces within the virtual address space are reserved for tagged data, which means data having a TAG as previously described. FIG. 10b shows an exemplary virtual address space. Within the address space for tagged data, address spaces are defined for each type of TAG. Exemplary shown are spaces for data i. having a Preferred-Owner (PO),
ii. being Floating (FT),
iii. being Single-Write/Multi-Read (SW-MR), and
iv. being Duplicate-Read-Only (DRO),
v. further data types may reside in the dotted space.

All described methods remain basically same, even at a operating system and compiler level; but instead of generating TAGs and attaching them to data, data is assigned to specific virtual memory spaces. The virtual memory spaces might be fixedly defined or definable by the software (e.g. compiler, the application program itself, and/or operating system), depending on the requirements of the application.

At hardware level, the respective TAG information might be extracted from the virtual address, which respective bits might be distributed in the memory hierarchy (tree) like TAG information. Alternatively or additionally, the Memory Management Unit may derive the TAG information from the virtual address via the address translation tables (e.g. page table, TLB).

Virtual Page Sizes

For purpose of efficiency, some processors of the state of the art support at least two different virtual page sizes in the main memory. Typically, i) standard page sizes in the range of 4 KB-16 KB (SPAGE) and ii) large or huge pages of 1 MB up to 1 GB (LPAGE) are supported. Processors according to this invention preferably support at least one additional page size, fitting the size of the TCM memory. Pages of the size of the TCM memory (e.g. FIG. 10, TCM space, A00 . . . A15) support the optimal automatic handling (loading and unloading) of the TCM as previously described. In preferred embodiments additionally or alternatively, pages of the size of a TCM bank (e.g. FIG. 10, TCM space A00 . . . A11) are supported.

Micro-Paging

The support of such additional, small page sizes may be burdensome, at least from two perspectives: The system and compilers have to handle the additional page format and such small page size requires large page tables. However, one skilled in the art understands that the inventive structure according to e.g. FIG. 1, FIG. 3, FIG. 4, FIG. 5, and FIG. 6 implicitly supports an additional preferred paging mode, subsequently called Micro-Paging. The respective method is described in FIG. 1 and FIG. 15:

A Page Table (1501), which may also be cached in a Translation Lookaside Buffer, translates virtual addresses into physical addresses. The page table may be organized in any way, e.g. as multi-level page table, virtualized page table or inverted page table. The page table is typically located in the main memory, the Translation Lookaside Buffer is ideally located within or closely to the processor core.

The Memory Management Unit (1502) of a processor core (1503) does the page lookup. The respective page is preferably of the system's standard size (SPAGE or LPAGE).

First, the tree structure (1597) according to e.g. FIG. 1 is searched for the physical address. The tree structure may comprise one or a plurality of nodes and/or caches, e.g. according to FIG. 3. Four of those nodes and/or caches are exemplary shown (1504); the dotted lines indicate that further units may exist. At least some of the units may comprise internal memories and have the ability to store and/or cache data. According to this invention, data of such units will be accessed if the respective physical address is found.

Only if the physical address is not found in any of the units within the tree (1598), the Main Memory (1505) is accessed (1599).

With respect to 1504 it shall be noted, that the respective memory structures (4 are shown), may be caches (e.g. Level-1, Level-2, Level-3, . . . ), nodes of the tree (e.g. Node 0,n; Node 1,n; Node 2,n), and/or local memories (e.g. TCM, LCM) according to FIG. 1, FIG. 8 and FIG. 9. Each rectangular plain of 1504 exemplary references one of those memory structures. Such memory structures not only transfer data with the main memory (1505) and processor(s) and/or processor cores, but also may obviously transfer data among themselves (indicated by 1511), according to the inventive tree (memory hierarchy).

As described, the page table is referencing full pages, such as the exemplary page 1506. Within the page 1506 a plurality of Micro-Pages are located (e.g. µPageA, µPageB, µPageC). The micro-pages may have different sizes, but are preferably a multiple of a base size. Preferably, the base size relates to the shortest cache line in the system and/or the page size of the TCM.

Local memories of the prior art, e.g. WO02/071248, PCT/EP 2009/007415, or in the ARM11 core (ARM Ltd, Cambridge), require standard page sizes in the local memories, while the inventive local memories (e.g. LCM, TCM) may operate on the granularity of micro-pages. Micro-pages are implemented by limiting the block size of a page transfer. Usually, for handling an address, the complete related page is handled (e.g. loaded and/or stored). For handling micro-pages, only the micro-page is handled. The boundaries for the data block transfer are adapted to alignment and size of a micro-page.

The virtual address is translated via the address translation table into a physical address referencing the standard page as a whole. Preferably, no entries at a smaller granularity than a standard page exist in the address translation table. The addresses may have the following format:

FIG. 15a shows an exemplary address arrangement (note: byte-wise addressing was used for simplification). A virtual address (1540) is divided into a pointer (1541) to the page entry of the address translation table constituted by the most significant address bits (MSB); and a pointer (1542) to the data within the page constituted by the least significant address bits (LSB). In one embodiment, those two pointers may have overlapping address bits.

The virtual address is translated into the respective physical address (e.g. by the MMU via an address translation table and/or Translation Lookaside Buffer (TLB)). The physical address may have the format of 1545. The most significant address bits (MSB) (1546) point to the table in the physical memory.

The least significant address bits (LSB) (1547) point to the data word within the page (PAGE). If the page is further sub-divided into micro-pages, the least significant address bits are "virtually split" into a most significant (1548) and least significant part (1549). "Virtually split" means, there might be no additional measure to split the address, the split may be constituted solely by the way the address is treated within the system. The most significant part (1548, µPagePointer) references a micro-page (e.g. µPageA, µPageB) within the page (PAGE), while the least significant part (1549) points to the data word within the micro-page. A plurality of µPagePointers may be joined (e.g. linearly subsequent addresses) to form larger micro-pages (µPageC).

The effect of this method is, that at main memory level from a hardware perspective or at page management level from a software (e.g. compiler, linker, operating system) perspective data is handled at page granularity. Therefore there is minimal or even no impact on such levels. At processor level and/or within the memory/cache/node hierarchy, particularly at TCM and/or LCM level, data may be treated in micro-pages, which are optimal for managing the finer grain granularity (smaller block sizes) of the respective memories (e.g. LCM, TCM, caches, nodes). Preferably, the micro-pages are arranged such that their size is compatible to the requirements (e.g. page size) of the TCM and/or LCM memories and/or caches (e.g. cache lines) and/or nodes. Various micro-page sizes might be used within a system, depending on the local memory requirements, such as the block size in a TCM or LCM, and/or the line size in a cache or node. Within the memory hierarchy (e.g. caches, nodes) and the local memories, micro-pages are handled and/or referenced as a whole. For example complete micro-pages are transferred (1507) between the main memory (1505) and memories of the memory hierarchy (1504). In other words, the micro-pages are defined by the page size of the respective memories (e.g. local memories such as LCM/TCM and/or caches) at a level lower than the main memory. Pages are defined and referenced by the address translation granularity of the Memory Management Unit (MMU). Micro-pages are located within and relative to a page and referenced relative to the page.

Two types of page misses exist:
a) a missing page in the main memory, causing a page fault: the page will be (re-)loaded from the mass storage media (e.g. disk drive)
b) a missing micro-page in a lower memory: the micro-page is (re-)loaded from a higher memory (e.g. higher level cache or node, or the main memory).

As previously described, in one preferred embodiment, pages may have TAGs indicating the type and treatment of the stored data. Such TAGs are typically stored in a page header and/or within the page table (i.e. the address translation table). When accessing a page, the TAG information is implicitly retrieved.

When a processor core or processor accesses a micro-page, the TAG information is equivalently available via the page table of the page containing the micro-page. A micro-page quasi inherits the TAG information from the page in which it is embodied. However, in some cases, e.g. if a micro-table is moved by the nodes within the tree without a processor core or processor being involved, accessing the page table might be too burdensome in terms of performance, power dissipation and/or implementation effort.

Therefore, in one preferred embodiment, the TAG information is copied (1508) from the page table into a TAG memory associated with memories (preferred with each memory) in the memory hierarchy (tree) below the main memory comprising a micro-page. Each micro-page sized storage area (e.g. a cache line and/or a TCM/LCM page) (1510) may have an attached TAG memory, as exemplary shown (1509) in FIG. 15. Additionally and/or alternatively the TAG may be cached in a TAG-Cache (1550). As described, when subsequently accessing the respective address, the processor/processor core may get the respective TAG from the TAG-Cache and signals it to the memory hierarchy (tree) via the bus. The TAG-Cache may release at least some of the memory structures in the tree (e.g. 1504) from the burden of storing the respective TAGs (1509). For most data accesses, it is sufficient, if the processor/processor core provides the respective TAG from the cache, as previously discussed. However, when data is autonomously transferred by and between the nodes and/or caches in the tree, the TAG information might not be provided by the processor/processor core. Therefore, it might be preferred to store the TAG information also inside the memory tree, as shown in 1509.

As described, a micro-pages is located within a page (PAGE) referenced by a page table and defined by its size, which is a subset of the size of the page (PAGE). The size of a micro-page may depend on various parameters and vary between micro-pages. Some embodiments may require that all micro-pages packed into the same page have the same size.

Micro-page sizes may be defined for example:
In software:
   a) In the page header/page table entry of the page (PAGE).
   b) Freely programmable; e.g. set by the application and/or operating system.
In hardware:
   a) Depend on the block size of a local memory (e.g. a TCM and/or LCM).
   b) Depend on the cache and/or node line size.

Micro-pages have preferably a size of a power of two ($2^m$) and are preferably aligned within a page (PAGE) in powers of two ($2^a$). In a preferred embodiment, within a page (PAGE) of the size $2^P$ n micro-pages of the size $2^m$ reside:

$$2^P = n*2^m;\ n \in \{2^a\}$$

Typically, micro-pages are transferred by block move units, such as a Direct Memory Access (DMA) controller. The block move units start the data transfer according to the alignment of the block and transfer $2^m$ data words.

Compiler Enhancements

The compiler backend has to be modified for generating code for the specific memory access instructions (e.g. load/store) and/or to support the maintenance of TAGs attached to sets of data.

The data representations within the compiler (e.g. trees and/or DAGs (Directed Acyclic Graphs) used in the intermediate code usually still reflect the structure of the source code's data. If not, the compiler is accordingly modified. The data representation usually comprises the base address of variables, such as e.g. integers, strings, structs, etc., and the offset (if any) to the position of a value being accessed.

The compiler back-end enhances the data representation with the TAG.

The compiler may generate code either for variables having TAGs or blocks of variables having a descriptor with a TAG. Whether tags shall be generated and which type may be selectable by e.g. a compiler flag. Some compilers may even support the simultaneous generation of both, variables with tags sorted into blocks having descriptors with tags. This code is the most flexible one, which can run on both hardware implementations.

For variable having TAGs, the code emitter then generates the assembler/binary code using the respective instructions. Base address and offset are recalculated in accordance with the position of the TAG. The base address is then transformed (either by the compiler or linker) into the base address <VariableBase> and the offset into the distance <VariableOffset> field of the respective instructions.

For data blocks having descriptors with TAGs, an optimizer on an intermediate level, in the backend or the code emitter first groups all variables having the same TAG into groups. The variables in the groups are arranges such, that a continuous address sequence within the group is formed. In a preferred embodiment the groups are then partitioned into blocks. Each block gets a descriptor, preferably at the beginning of the block, which may be called header too. The descriptor comprises the TAG and may comprise other runtime relevant information for optimizing the handling of the block in the memory hierarchy. Each block has a certain size, which is fixed to a power of 2 value ($2^n$) and the blocks are aligned to addresses in a fitting fixed grid, (e.g. AO . . . A7=0x00 for blocks of size 256 words, or AO . . . A15=0x0000 for blocks of size 65536 words). Preferably the block size and/or alignment the same as the cache line size and/or alignment in the hardware. At least the size and the alignment should be related to the hardware implementation by a fraction or multiplication of a power of 2 value ($2^n$).

In a preferred embodiment, all blocks may be grouped into a hyper-block, and the compiler uses one base address for the hyper-block. The base address of the hyper-block could be fixed or defined at runtime depending on the system.

The generation of the TAGs has been described previously. Some TAGs can be defined on basis of the data representation within the compiler. For example constants are known by the compiler and can accordingly be marked with a read-only TAG.

Some TAGs may not be definable by the compiler, which are then defined as "undefined". References to those TAGs are emitted by the compiler. Subsequently the linker may, in conjunction with profiling tools as described, fill in at least some of the "undefined" TAGs. The linker may embed a reference list of all TAGs or in a different embodiment at least of all remaining "undefined" TAGs into the linked (binary) code. Furthermore the linker may add runtime profiling/optimizing routines to the linked (binary) code, which will at runtime evaluate the character of "undefined" TAGs and define them accordingly. Such runtime routines may even analyze the character of set of data with defined TAGs and overwrite them when beneficial or necessary. The reference list may then be accessed by further tools (e.g. profiling tools) to fill in the remaining "undefined" TAGs at a later point in time.

The operating system (OS), runtime profiling tools or profilers/optimizers embedded in the code or included in the compiler library (e.g. C-Library) may use the reference list for defining other "undefined" TAGs at runtime.

The compiler analyzes the data representation (e.g. DAG) for the frequency of data access. As already described, profiling tools may provide additional information at compile-, debug- and/or run-time. Based on the frequency of access and the size of the respective data structures the compiler may allocate data structures to the TCM, LCM or Main memory space. Additionally hints provided by the programmer (e.g. by pragmas and/or attributes) may be used by the compiler for controlling the allocation.

Frequently accessed data is preferably located in the TCM memory space, in particular frequently used constants. Spilled register data may be preferably located in the TCM space. TCMs or LCM may support an automatic stack mode, in which the limited TCM (or LCM) space provides a window into the LCM or Main memory. The window is automatically controlled in hardware, stack data is moved in or out the TCM (or LCM) memory from or to the LCM or Main memory. Those operations are processed in the background and are transparent for the programmer. They might be supervised and/or controlled by the operating system. If TCM or LCM support a kind of virtual stack window, the stack is preferably located there. For details reference is made to the exemplary implementation of PCT/EP2009/007415, e.g. FIG. 14). Larger and/or less frequently used data structures are preferably located in the larger, but slower, LCM memory space. Very large and less frequently used data structures, or those having a random size (e.g. heap) are allocated to the Main Memory. However, the compiler may support memory allocation calls (e.g. C malloc( ), C++ new( )) providing the feature to make the location of the memory space to be allocated select-able by the programmer, e.g. by defining TCM, LCM or MAIN in the call.

The compiler defined base address for each of the LCM and TCM memories. Those base addresses (LCM BASE, TCM BASE[0 . . . n]) could be fixed, but are preferably defined at runtime depending on the system. As the number of TCM memories may depend on the processor implementation, the compiler uses the first TCM bases (TCM BASED being the first) for data which is most important—which has the highest performance impact. The executing processor may not support higher TCM memories and the respective data may be mapped at execution time into the Main Memory or preferably LCM space by the operating system and/or hardware (e.g. a processor having 8 TCM memories, will not support TCM BASE10.)

Operating System Enhancements

The operating system may support runtime profiling of code to define the TAGs as previously described.

Depending on the system, the operating system defines base addresses for e.g. LCM and or TCM memory space and passes the base addresses to the application code (tasks and or threads). E.g. LCM BASE and/or TCM BASE[0 . . . n]) are preferably defined at runtime depending on the system.

The operating system may get the base addresses from the systems BIOS or an equivalent function which describes the system hardware. Processors preferably have a register describing the capabilities (e.g. TAGs, type of memory hierarchy) of the processor and the size and/or amount (e.g. number of TCM memories) of the memories, which is evaluated by the BIOS, an equivalent function and/or the operating system.

The operating system may manage and virtualize the TCM memory space. If only a subset of TCM memories are implemented (e.g. 4 TCM memories) all other TCM addresses may be mapped by the operating system to the LCM and or Main Memory by setting the memory management accordingly. E.g. if only four (4) TCM memories are implemented and A18 and A19 according to Figure are not all zero (A[18 . . . 19]!=0x0), the addressed TCM is not available. The hardware preferably returns automatically a miss if respective addresses are detected. This miss causes the address to be handled by the next higher level in the memory hierarchy and/or directly by the main memory. E.g. TCM addresses might be mapped into the LCM space, by using the 1207 path in FIG. 12; LCM addresses might be mapped into the main address space, by using the 1217 path. It shall be noted, that TCM addresses could be directly mapped into the main memory space by the path 1241. The respective addresses are then mapped into the main memory space. The operating system may place the missing TCM space then:

a) either into the LCM space by building the page tables (address translation tables (e.g. 1112)) accordingly, so that the LCM is addressed instead the TCM;

b) or into the Main Memory space by setting the page tables of the Main Memory accordingly, so that the main memory is addressed instead the TCM.

Obviously, the LCM space depends also on the system implementation and may be managed by the operating system. Similar to the management of the TCM memories, missing LCM memory space is provided by setting the page tables of the Main Memory accordingly, so that the main memory is addressed instead the LCM.

The operating system may manage the eviction of data from TCM and/or LCM memories based on a certain strategy, which may be defined by the operating system and/or the executed application (e.g. tasks/threads). In particular the eviction strategy may be defined according to a runtime profiler and/or data provided by a profiler. The operating system preferably takes TAGs and locked information into consideration for managing the eviction. Locked memory sections or those having TAGs showing recent access, are least preferred for eviction.

Anyhow, depending on the strategy, eviction may be based on LRU (Least Recently Used) models.

Another method is the use of a Least Frequently Used (LFU) counter, which can be implemented instead of or in conjunction with the LRU.

The operating system may define the address lookup strategy, e.g. whether the lookups of 1201, 1211, and/or 1221 sequentially or at least partially concurrent. The strategy may be defined by the operating system and/or the executed application (e.g. tasks/threads). In particular the lookup strategy may be defined according to a runtime profiler and/or data provided by a profiler, e.g. based on user settings, and/or setting performance/power efficiency trade-offs.

The operating system may support the TAG and/or Lock management. In some cases, it may be necessary that TAGs and/or Locks are not only managed at thread level, but also by higher privileged instances. Examples are e.g. for terminating or killing threads (e.g. dead-locked, blocked and/or crashed threads), and/or debugging purposes.

In a preferred embodiment, the operating system may manage the TAGs and/or Locks. Respective functions are implemented in the operating system and the software either directly calls the operating system (e.g. via a System Call) or a code library (e.g. the C-Library) calls the operating system. The operating system may track the history of TAGs and/or Locks, e.g. by maintaining a Lock-Table, which is being updated by the respective Lock management System Functions. As previously described, the operating system may execute privileged instructions, so that it can e.g. release locks even if the ThreadlDs do not match.

In the exemplary case that a thread needs to be terminated, the operating system can release all locks in the Lock-Table.

It might be beneficial in some embodiments, that the operating system is able to automatically kill threads in case respective locks were not acquired (released) within a certain time. Such functionality can be implemented using the Lock Table. A periodically function (Lock Table Watchdog), e.g. triggered by a timer interrupt and/or periodic system trap), scans through the Lock-Table and increases a timer field associated to each of the Lock entries. By doing so the timer field of a lock increases with each execution of the Lock Table Watchdog. If the value exceeds a certain value, which might be fixed in the operating system, defined by the respective thread(s) and/or set by the system administrator, the operating system may kill the respective thread(s) under the assumption that the thread(s) are no longer executing properly (e.g. have terminated or in an erroneous condition).

In some embodiments a task and/or thread switch may be initiated if accessed data is not available in the memory hierarchy and must be loaded (e.g. into a cache, TCM and/or LCM). While switching to another task may be counterproductive, as other data may be required by that task, colliding with the current necessary data load, it is preferred to switch to another thread of the same task. As such a thread has the same ProcessID and is usually operating within the same address space, the likelihood of a collision is minimal. However, the other thread (of the same task) may be able to continue processing, without having to wait for the currently loaded data.

Automated Analysis

One aspect of the invention is to provide methods for automatically analyzing code for data shared between a plurality of threads and/or processors and/or processor cores. On the source code level, e.g. library functions can be analyzed and replace by other, which support the inventive access type hints for optimizing coherence handling.

Existing code, such as binaries, require different analyzing methods on binary level. Such analysis can be done by a linker and/or post-compiler/optimizer and/or the operating system.

Source Code Analysis and Optimization

APIs and/or libraries are commonly used to implement thread management and locking mechanisms (such as e.g. Mutex and Semaphores). For example, reference is made to POSIX Pthread API, see the ANSI/IEEE POSIX 1003.1-1995 and IEEE Std 1003.1, 2004 standards OpenMP, see e.g. Using OpenMP: Portable Shared Memory Parallel Programming (Scientific and Engineering Computation), Barbara Chapman, Gabriele Jost, Ruud van der Pas; ISBN-10: 0262533022; ISBN-13: 978-0262533027; e.g. OpenMP Application Program Interface Version 3.0 May 2008 (http://www.openmp.org/mp-documents/spec30.pdf).

Said documents are incorporated into this patent for full disclosure.

For optimization at source code level, the source code of the program might be altered according to the requirements. However, far more efficient, is the use of libraries, such as the exemplary mentioned above.

When using libraries, the respective modifications, e.g. for implementing the inventive locking mechanisms, are solely made in the code of the library. The compiler and/or linker may implement additional optimizations specifically for a library (e.g. such as POSIX, OpenMP and other well-known libraries), based on its detection.

All program code, consequently using the library, to implement coherence and/or thread management functions, can now easily rely on the implementation within the library, without any need to alter the code of the programs. This is particularly beneficial. As e.g. pre-compiled source code, which is linked to a respective library, has not to be touched again; only the files are newly linked using a linker. If the respective library is dynamically linked, it can be even replaced on the target system, without touching the program at all. Another advantage is, that the program has not to be newly tested and debugged (under the assumption that the libraries are compatible, fully debugged and stable).

Binary Code Analysis and Optimization

An optimizer tool can be part of a Software Development Toolkit, a System Administrator Toolkit or an Operating System, e.g. on which the respective binary is executed.

The optimizer detects atomic memory accesses, which are used to implement locks, e.g. for mutex or semaphores. Typically special instructions are used to implement atomic memory accesses, such as TSL (Test and Set Lock) or XCHG (eXCHanGe).

The TSL instruction reads the content of a memory location, stores it in a register and then stores a non-zero value at the address. This operation is guaranteed to be atomic: no other process can access that memory location until the TSL instruction has finished.

The following example assembly code describes the use of TSL:

mutex lock:
TSL register, mutex
CMP register, #0
JNZ mutex lock
RET
mutex unlock:
MOV mutex, #0
RET A process 0 calls mutex lock. TSL copies the mutex from the memory to a register and sets the memory it to a non-zero value. The procedure is atomic, no other process and/or processor and/or device can access the memory location mutex before the operation (read to register and set to non-zero) has completed.

The register is then compared to zero (cmpcompare) and
if the flag is non-zero (jnz—jump if non-zero) the routine loops back to the top (in this case the lock is set);
if the flag is zero, the lock is not set and the routine returns, enabling the continuation of the program execution and access to the locked area.

Only when the process 0 has set the flag to zero again, by calling mutex unlock, the mutex is unlocked and other processes can enter the protected area.

The implementation of a mutex lock using XCHG is basically the same. XCHG swaps atomically a memory content with a register:

mutex lock:
MOV register, #1
XCHG register, mutex
CMP register, #0
JNZ mutex lock
RET The code sections mutex lock and mutex unlock define a bracket, within data accesses might be shared. The labels mutex lock and mutex unlock cannot be detected at assembly or binary level (the labels may have different names and/or simply don't exist). But the accesses to a mutex are automatically detectable by a tool for
a) mutex lock, by e.g. a XCHG or TSL instruction with the address of the mutex; and
b) mutex unlock, by e.g. a MOV instruction with the address of the mutex.

The instruction being used for implemented atomic memory access depends on the instruction set (Instruction Set Architecture=ISA) of a specific processor. Other instructions then TSL and/or XCHG may be used by a specific processor, but the detection method is the same. E.g. Intel Pentium processors and HYPERION processors have XCHG implemented.

All memory accesses within the bracket (mutex lock to mutex unlock) must be regarded shared by the tool. Accordingly measures can be implemented to manage the shared access and/or e.g. coherency for the respective variables, depending on the systems and/or processors capabilities. For example, the variables accesses can be associated as previously described with respective TAGs. The TAGS may be directly attached to the respective variables or variables with the same TAGs may be sorted into data blocks with a respective TAG in a descriptor.

Description of the Remaining Figures

Figure 3:
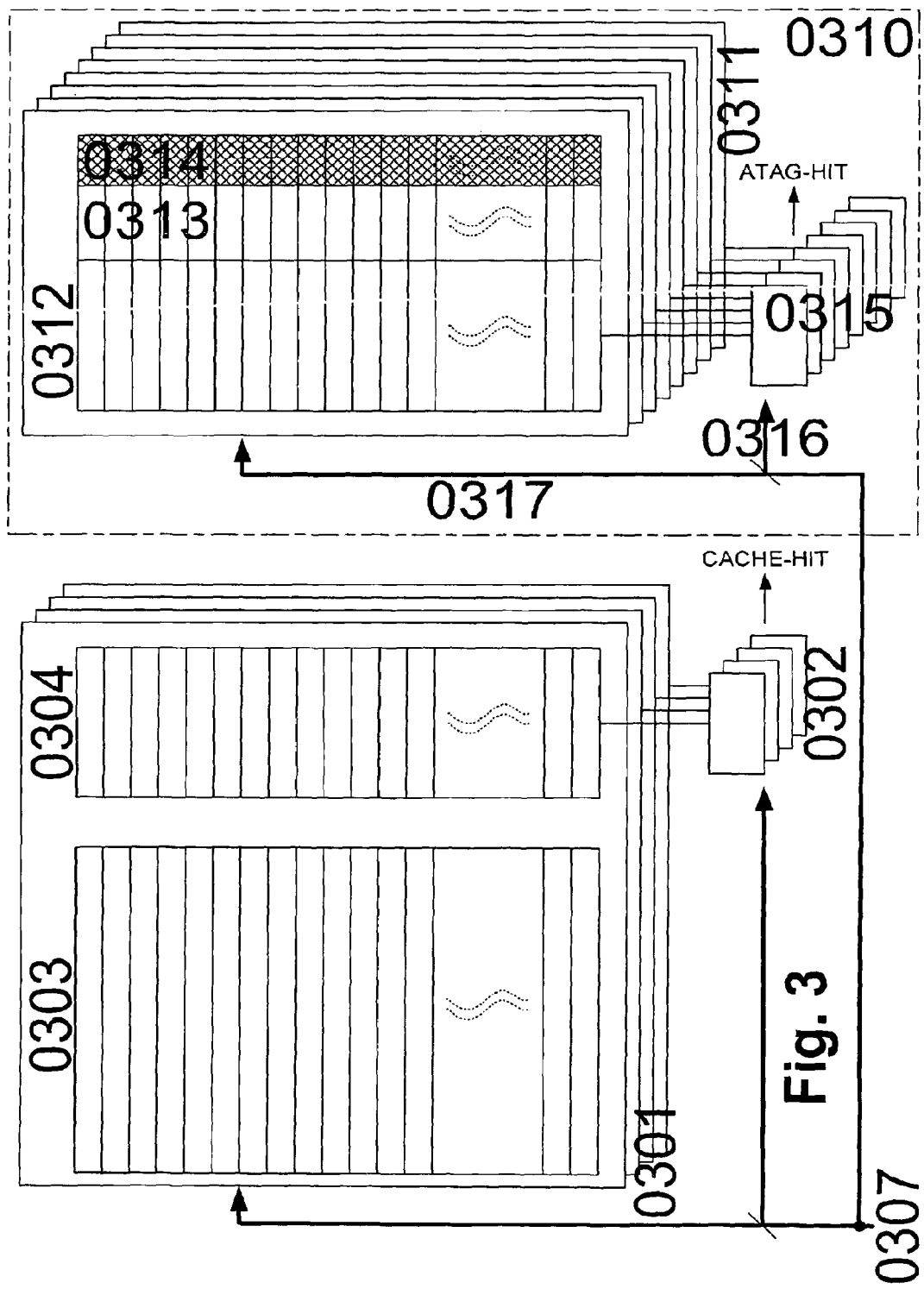
FIG. 3 is a diagrammatic illustration of an example tree structure including nodes and caches.

FIG. 3 shows one embodiment of the inventive ATAG. In this exemplary embodiment an LEVEL-1 Cache has 4 associative sets, 0301. Each set comprises the cache lines (0303) and a TAG memory (0304). 4 comparators 0302 compare the reference address part stored in the TAG memories with the respective address part (0306) of the cache access address (0307). If a compare is equal, the accessing address matches the address stored in the cache, resulting in a cache hit (CACHE-HIT).

Caching details are not in the scope of this patent, various implementations, modifications, and optimizations are known in the state of the art.

In this exemplary embodiment an ATAG (0310) having 8 associative sets (0311) is part of the LEVEL-1 cache. As known from TAG memories in the state of the art, a part of the address (0312) is stored in each set. The part of the address stored (0316) is the remaining part of the address (0307), which is not being used for selecting a cache line (0317). Each ATAG set contains a list of target cache addresses or identifications (CacheIDs) (0313), each address entry in the set having one related target cache address.

As for TAGs in the state of the art, the reference address part (0312) stored in the ATAG memories is compared via comparators (0315) with the respective address part of the cache access. If a compare is equal, the accessing address matches the address stored in the ATAG, resulting in an ATAG hit (ATAG-HIT).

In case of an ATAG-HIT, the address or identification (Cache-ID) of the LEVEL-1 cache containing the data is found in the ATAG. The CacheID is retrieved from the ATAG and transmitted together with the address request through the tree.

The CacheID enables the direct establishing of a data communication path from the requesting core to the owning core without the need of a search or CLT lookup in the nodes. ATAGs therefore reduce the effort for searching the tree, reduce required bandwidth and response time. It shall be noted that ATAGs may be implemented alternatively to CLTs in the nodes, as the ATAGs already deliver the Cache-ID of the owner's cache so that no further CLT lookups are required.

Embodiments without ATAGs may rely on CLTs in the nodes or have to initiate a full tree search in case even no CLTs are implemented.

However CLTs are beneficial for locating addresses in the tree. Therefore at least one of the implementation of ATAGs and the implementation of CLTs is preferred.

While current analysis shows that ATAGs are more efficient than CLTs and no CLTs may be implemented for saving area and energy, a combination of ATAGs and CLTs provides the fastest address detection and data transmission in the inventive cache system.

Each ATAG set may further contain a list of access-statistics-timers (0314), each address entry in the set having one related access-statistics-timer. Access-statistics-timers are used to measure the frequency of accesses of a specific address in an alien cache by the core.

The exemplary ATAG implementation is 8 way associative, while the TAG and Cache is 4 way associative. The reason therefore is to minimize the probability of clearing an access-statistics-timer because the respective line has to be reused. Increasing the number of sets in the ATAG reduces the risk of distorting the access statistics by clearing an access-statistics-timer of a quite recently used alien cache line due to limited associativity.

Figure 7:
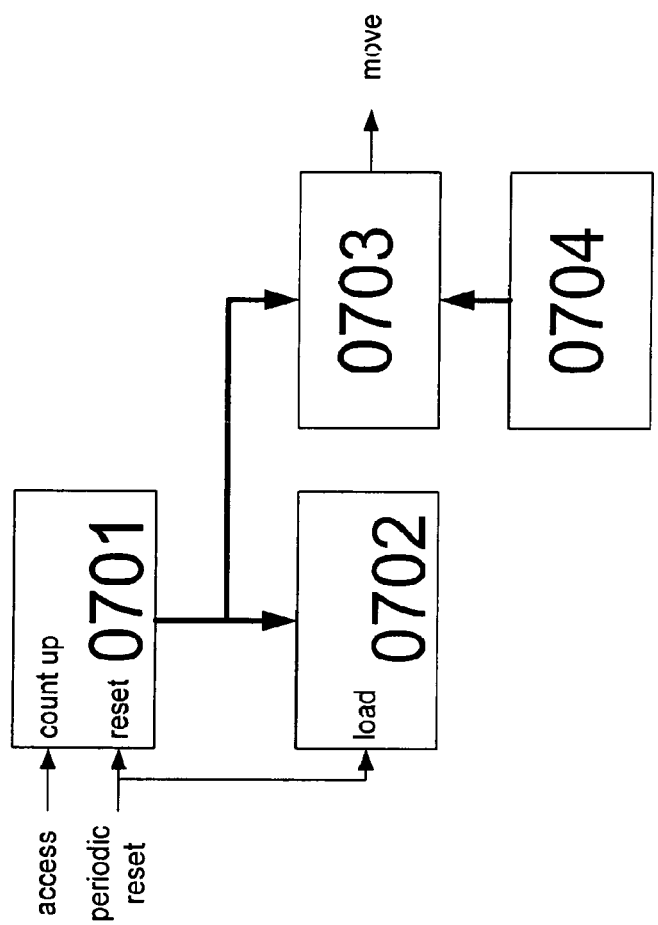
FIG. 7 is a block diagram illustrating an example implementation of an access-statistics timer.

FIG. 7 shows an exemplary implementation of an access-statistics-timer. It is based on a counter (0701) counting the number of data accesses (access). The timer is periodically reset, driven by a general global timer (GGT). This general global timer (GTT) could be global to all cores in the processor or local for each core. In case multiple GGTs are implemented, it is not important that they operate synchronously, but that they are measuring the same time span. It is good enough for the present invention if each of the GGTs counts the same number of clocks of the same clock frequency, preferably of the same clock base.

If the counter is reset, its last value is store in the TI-MER-MAX register (0702).

A reference register (0704) comprises the TIMER-THRESHOLD which may be set to a specific value right after reset of the core. During runtime the value of the TIMER-THRESHOLD register may be specified by the application software and/or the operating system. Another source for the TIMER-THRESHOLD is described previously, the cores may autonomously update specific TIMER-THRESHOLDs based on the last move of a cache line from one LEVEL-1 cache to another. The value of the TIMER-MAX register of the core owning the cache line, possibly plus an offset, may be used to define the TIMER-THRESHOLD of other accessing cores.

Various strategies can be implemented to update the TIMER-THRESHOLD register, e.g. it may be updated with each data access to the alien cache owning the cache line or only after the cache line has been moved.

The current timer value is monitored via a comparator (0703). If the timer value exceeds the TIMER-THRESHOLD (0704), the frequency of accesses within the time span defined by the GGT justifies the move of the cache line from the alien cache owning the cache into the core's local cache and accordingly a move operation is triggered (move).

In one embodiment, the timer value may be transmitted to the alien cache, where it is compared with the respective timer value in the alien cache. In case, the time value in the alien cache exceeds the transmitted timer value, the move re-quest might be rejected, as the alien processors still access the data more excessively than the calling processor. The timer value in the alien cache might be transmitted back to the calling core, so as to allow that core to update its own TIMER-THRESHOLD respectively.

Figure 6:
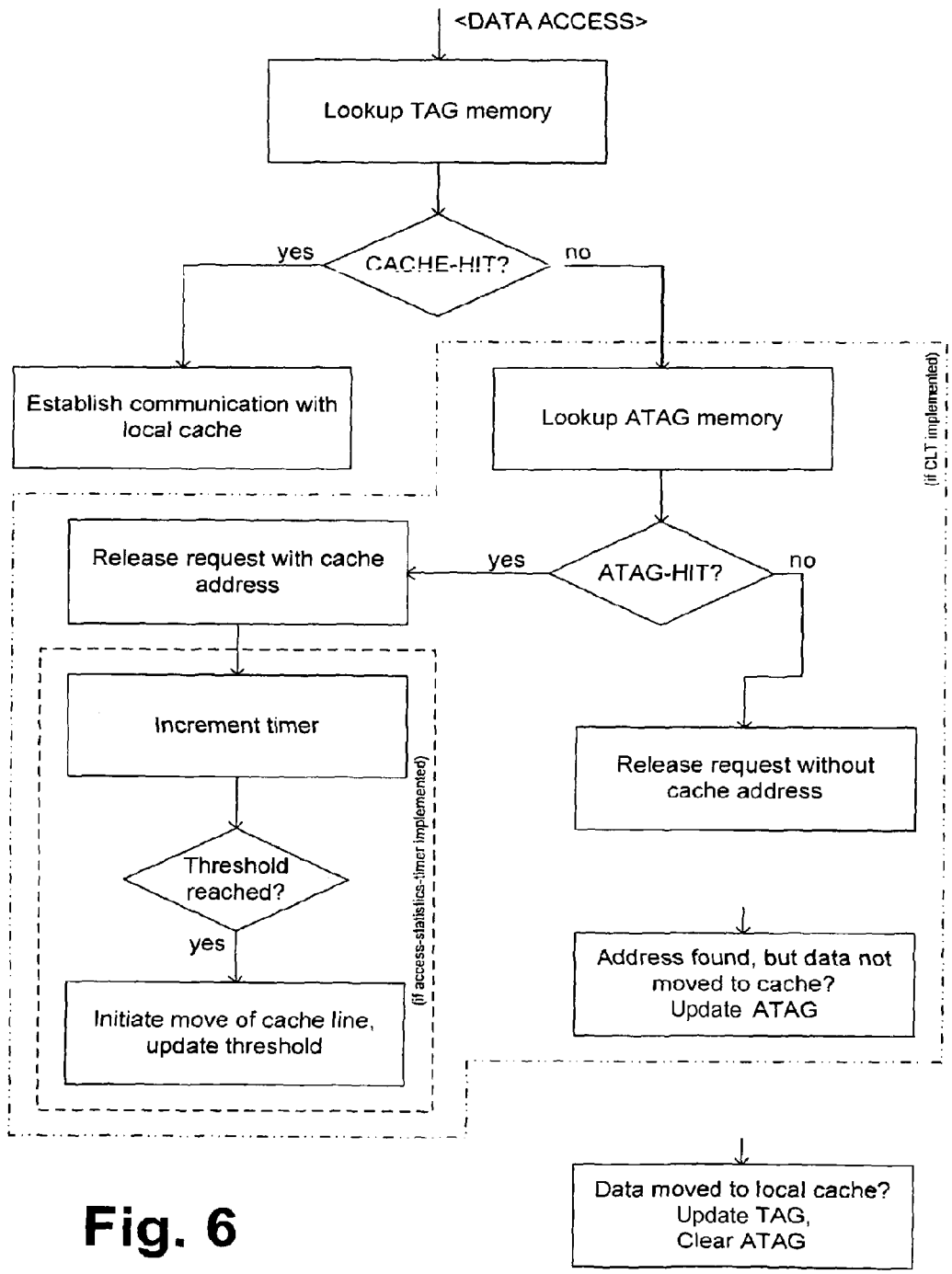
FIG. 6 is a flow diagram illustrating an example implementation of control of a LEVEL-1 cache.

FIG. 6 shows an exemplary implementation of the control of a LEVEL-1 cache.

A data access (<DATA ACCESS>) is started with an address lookup in the TAG memory of the cache. In case of a CACHE-HIT, data is transferred between the core and the cache.

In case of a cache miss, the address is looked up in the ATAG memory.

If the address is not found in the ATAG memory either, a request without a target's cache address may be issued to the tree. This may require searching the address within the tree, either using CLTs or using a fill tree search.

In case of an ATAG-HIT, the target's cache address has been found, and the request to the tree may be issued together with the target's cache address. This enables the tree to route the request directly to the target cache, avoiding un-necessary search operations as well as unnecessary distribution of the request in the tree, such decreasing response time and saving power, bandwidth and latency.

If an access-statistics-timer is implemented, the counter is incremented. In case the threshold is reached, a request for moving the data from the alien cache owning the respective cache line into the core's cache is initiated.

If the requested address is found in an alien cache, the ATAG is updated. Eviction strategies, such as Least-Recently-Used (LRU) are preferably used.

Another method is the use of a Least Frequently Used (LFU) counter, which can be implemented instead of or in conjunction with the LRU.

In case the requested address is found in a higher level memory and/or the respective cache line is moved to the cache (either from a higher level memory or an alien cache), the ATAG reference (if present) is cleared and the TAG is updated. Eviction strategies, such as Least-Recently-Used (LRU) are preferably used.

Another method is the use of a Least Frequently Used (LFU) counter, which can be implemented instead of or in conjunction with the LRU.

It shall be explicitly noted, that depending on the implementation both lookups, for TAG and ATAG, may be done simultaneously in parallel or, as shown, sequentially. It solely depends on the performance and power specification of the processor. The lookup simultaneously in parallel is faster, but consumes more power than a sequential lookup.

Figure 4:
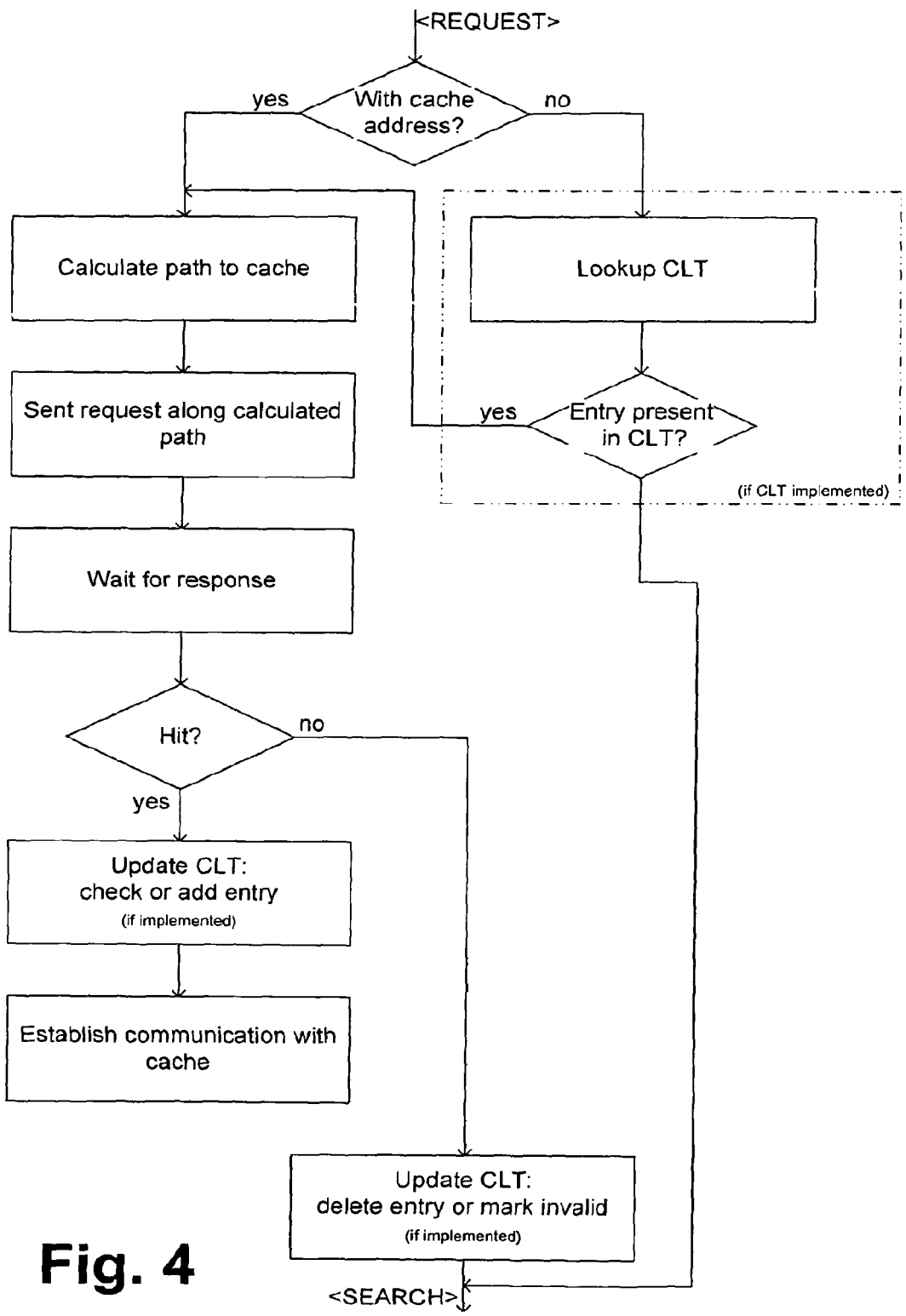
FIG. 4 is a flow diagram illustrating the handling of a request inside a node.

FIG. 4 shows the handling of a request (<REQUEST>) inside a node. If the request comprises the address of the target cache, the path to the target cache is calculated based on the address. The request is then sent along the calculated path to the next node.

If eventually the addressed LEVEL-1 cache is reached, it may happen that the data does not reside there anymore. Various reasons exist, e.g. the cache line may have been moved into another cache, have been flushed or overwritten.

In case of a CACHE-HIT, a new entry in the CLT might be created referencing the requested address to the target cache, if such an entry has not existed yet (and at least one CLT is implemented in the node). Furthermore to communication with the target cache is established, communication could be, e.g. data read, data write, read-modify-write access, semaphore exchange or lock, etc.

In case the cache reports a CACHE-MISS, the according CLT entry, if one existed and at least one CLT is implemented in the node, is deleted or marked invalid. A tree search is initiated (<SEARCH>) to find the requested address.

If the request does not contain the address of the target cache, either since no ATAG is implemented in the system or the ATAG did not contain an entry for the target cache, the CLT is looked up. If an entry for the requested address is found in the CLT, the path may be calculated as described above. If no entry is found in the CLT, the operation continues by searching the tree (<SEARCH>).

The tree is also searched in case the request does not contain the address of the target cache and no CLT is implemented in the node.

Figure 5:
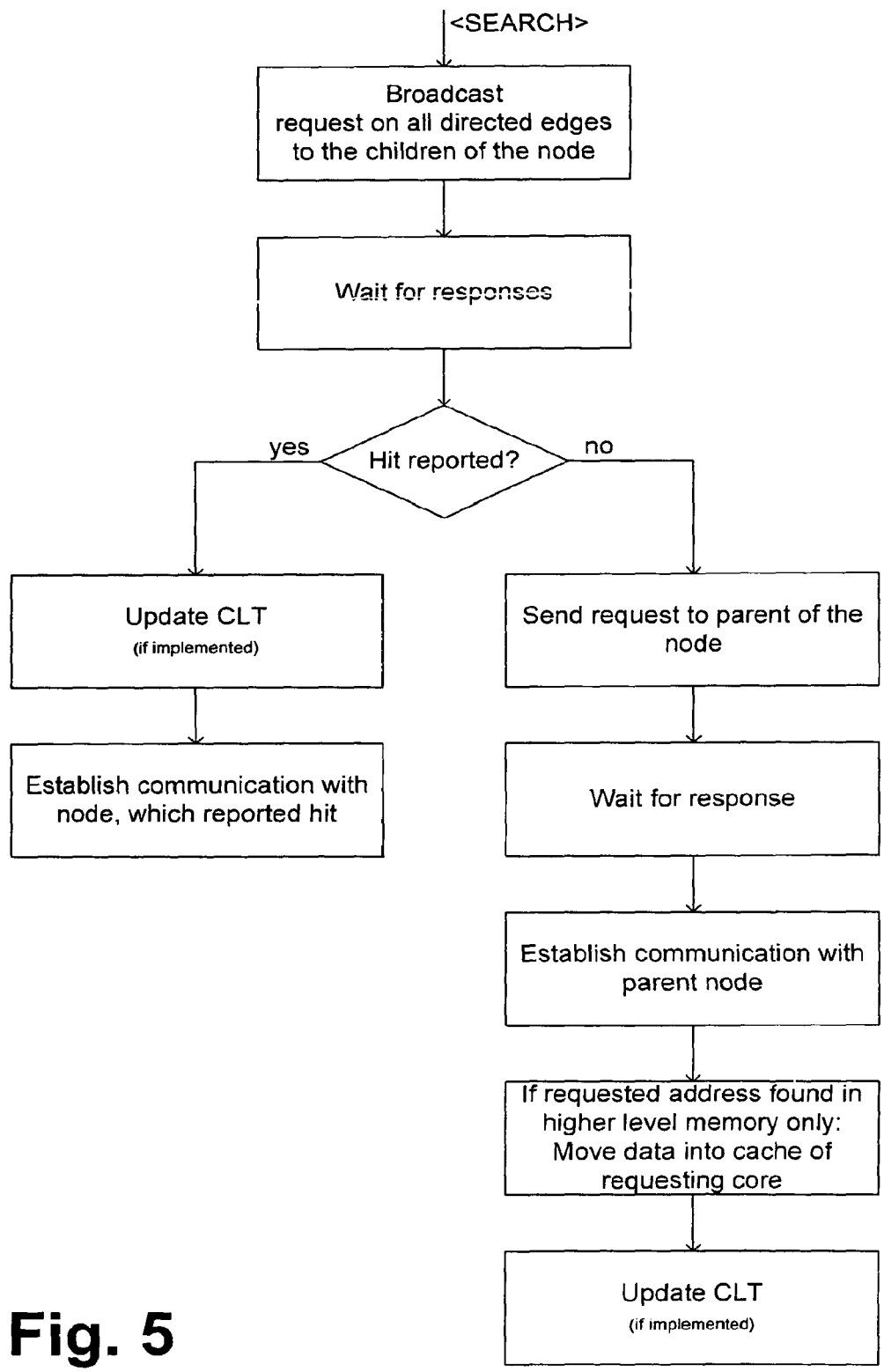
FIG. 5 is a flow diagram illustrating the searching of a tree.

FIG. 5 shows the searching of the tree. In response to a search request (<SEARCH>) the address request is broadcasted via all direct edges to the children of the node.

In case of a CACHE-HIT, a new entry in the CLT might be created referencing the requested address to the target cache, if such an entry has not existed yet (and at least one CLT is implemented in the node). Furthermore to communication with the target cache is established, communication could be, e.g. data read, data write, read-modify-write access, semaphore exchange or lock, etc.

If all caches below the node report a CACHE-MISS, an address request to the parent of the node is issued and communication with the parent is established.

If the requested address was only found in a higher level memory, a cache line is moved from the higher level memory into the requesting cores local cache. If at least one CLT is implemented, an entry is added to the CLT, referencing the requested address to the requesting cores local cache.

In order to overcome bandwidth limitations, it is preferred to implement nodes being capable of handling multiple accesses and/or transfers in parallel. This could be achieved by e.g. using multi-port memories for the lookup tables for the address lookup or the caches. Such nodes comprise multiple ports to the edges, each port being able to manage a data transfer with an edge. Also the state-machine is accordingly duplicated, so that n-accesses/transfers can be managed on n-ports by n-state-machines.

Accordingly each bus forming an edge of the tree is duplicated into a plurality of buses, according to the number of available ports per edge. Multiple accesses or transfers can be managed in parallel on the plurality of buses.

While, as said, in one embodiment each bus may be duplicated into a plurality of buses, in a more advances implementations, the amount of parallel buses may differ from node to node and/or level to level of the tree. In one embodiment the nodes on the lowest level may support 4 buses to the according LEVEL-1 cache below. The nodes on the second level may support 4 buses to the nodes on the lowest level. The nodes on the third level may support only 2 buses to the second level nodes and ultimately the highest level nodes have only one bus to the third level nodes below and the cache above.

A bus allocation unit may be implemented for at least some of the edges having multiple buses. The bus allocation unit selects and allocates a free unused bus to a requesting unit, which may be either a node or cache on each end of the edge.

The bus allocation unit exclusively allocates a free currently unused bus for a requesting unit. If currently no free unused bus is available the allocation unit may return a wait signal until a bus becomes available.

In one embodiment the bus allocation unit may comprise an arbiter for arbitrating the buses. The arbiter could for example be implemented as a priority arbiter or a round-robin arbiter.

Data/Instruction Tree

The inventive memory hierarchy is particularly well suited for processing data, as shown in the preferred embodiments. However, some parts of the invention are, obvious for one skilled in the art, also applicable to instructions. For ex-ample the tree architecture is well suited for caching instructions for multi-processor systems and/or multi-core processors. In some applications, it might be highly beneficial, if shared code does not have to be loaded from the main memory, but could be retrieved from other processors or processor cores at a lower level in the memory hierarchy. This is very similar to the data described access concepts.
Managing Virtual Addresses in the Tree For the sake of simplicity the specification is based on a memory hierarchy, in which physical addresses are managed. The caches and nodes are located in the physical address space, also the TCM and LCM addresses are used as physical addresses with a simple translation.

For saving the time to translate the virtual address, it may be preferred to manage virtual addresses within the memory hierarchy, at least partially (i.e. preferably at the lowest level (Level-1 caches and/or TCM). Then at higher levels, the address translation from virtual into physical may occur and physical addresses are managed in the higher levels of the memory hierarchy.

In this case, the Memory Management Unit is not located within a processor/processor core, but at a higher level in the memory hierarchy (tree).

As example, based on FIG. 1, the first nodes above the level-1 caches and/or TCM, the nodes NodeO,n (Node0,0; Node0,1; Node0,2; Node0,3) may still handle mainly virtual addresses in an according implementation for transferring data in between the Level-1 memories (e.g. transfer a) of FIG. 1).

This holds even for the Node1,n level (Node1,0; Node1, 1). Only above Node2,0, towards the LEVEL-2 Cache and higher memories, switching to physical addresses may be efficient.

Therefore Node2,0 may have a Memory Management Unit (0199) doing the address translation from virtual to physical accordingly.

In this exemplary embodiment, the tree below Node2,0 operates on virtual addresses, while all memories above Node2,0 (including the Level-2 cache and the main memory) operate on physical addresses.

According to preliminary analysis, it appears even preferable to move the address translation in larger multi-processor/multi-core systems even higher, e.g. above the LEVEL-2 cache or even above LEVEL-3. It appears most beneficial to put the border between the virtual and physical address space at the level of the first cache and/or node jointly owned by all processors, or respectively at the top, root of the tree. De-pending on other parameters in the system the memories at that respective level may be addressed either virtually or physically, which means, the address translation may occur either before or after this level.

The following implementations may be used exclusively or in combinations within the tree:
i) Physically indexed, physically tagged (PIPT) caches and/or nodes using the physical address for both the index and the tag. While this is simple and avoids problems with aliasing, it is also slow, as the physical address must be looked up (which could involve a TLB miss and access to main memory) before that address can be looked up in the cache.
ii) Virtually indexed, virtually tagged (VIVT) caches and/or nodes using the virtual address for both the index and the tag. This can result in much faster lookups as the MMU doesn't need to be consulted first. However, VIVT has the problem of aliasing, which is that several virtual addresses may refer to the same physical address. The result is that such addresses would be cached separately, even though they refer to the same memory, which can cause coherency problems. Another problem are homonyms. The same virtual address can map to a different physical address. Thus it is not possible to distinguish these mappings by only looking at the virtual index. Possible solutions are the flushing of the cache after each context switch, force non-overlapping address spaces, tag the virtual address with an address space ID (PROCESSID) or use physical tags. There is also a problem that virtual to physical mappings can change, which would require flushing cache lines, as the virtual addresses would no longer be valid.
iii) Virtually indexed, physically tagged (VIPT) caches and/or nodes use the virtual address for the index and the physical address in the tag. The advantage over PIPT is lower latency, as the cache line can be looked up in parallel with the TLB translation, however the tag can't be compared until the physical address is available. The advantage over VIVT is that since the tag has the physical address, the cache can detect homonyms. VIPT requires more tag bits, as the index bits no longer represent the same address.

Virtual Indexing and Virtual Aliases

The usual way the processor guarantees that virtually aliased addresses act as a single storage location is to arrange that only one virtual alias can be in the cache at any given time. Whenever a new entry is added to a virtually-indexed cache, the processor searches for any virtual aliases already resident and evicts them first. This special handling happens only during a cache miss. No special work is necessary during a cache hit, which helps keep the fast path fast. The most straightforward way to find aliases is to arrange for them all to map to the same location in the cache. This happens, for instance, if the TLB has e.g. 4 KB pages, and the cache is direct mapped and 4 KB or less.

Modern level-1 caches are much larger than 4 KB, but virtual memory pages have stayed that size. If the cache is e.g. 16 KB and virtually indexed, for any virtual address there are four cache locations that could hold the same physical location, but aliased to different virtual addresses. If the cache misses, all four locations must be probed to see if their corresponding physical addresses match the physical address of the access that generated the miss.

These probes are the same checks that a set associative cache uses to select a particular match. So if a 16 KB virtually indexed cache is 4-way set associative and used with 4 KiB virtual memory pages, no special work is necessary to evict virtual aliases during cache misses because the checks have already happened while checking for a cache hit.

Using the AMD Athlon as an example, it has a 64 KB level-1 data cache, 4 KB pages, and 2-way set associativity. When the level-1 data cache suffers a miss, 2 of the 16 (=64 KB/4 KB) possible virtual aliases have already been checked, and seven more cycles through the tag check hardware are necessary to complete the check for virtual aliases.

Homonym and Synonym Problems

The cache that relies on the virtual indexing and tagging becomes inconsistent after the same virtual address is mapped to a different physical address (homonym). This can be solved by using physical address for tagging or by storing the address space id in the cache line. However the latter of these two approaches does not help against the synonym problem, where several cache lines end up storing data for the same physical address. Writing to such a location may update only one location in the cache, leaving others with inconsistent data. Problem might be solved by using non overlapping memory layouts for different address spaces or otherwise the cache (or part of it) must be flushed when the mapping changes.

Virtual Tags and Vhints

Virtual tagging is possible too. The great advantage of virtual tags is that, for associative caches, they allow the tag match to proceed before the virtual to physical translation is done. However:

i) Coherence probes and evictions present a physical address for action. The hardware must have some means of converting the physical addresses into a cache index, generally by storing physical tags as well as virtual tags. For comparison, a physically tagged cache does not need to keep virtual tags, which is simpler.

ii) When a virtual to physical mapping is deleted from the TLB, cache entries with those virtual addresses will have to be flushed somehow. Alternatively, if cache en-tries are allowed on pages not mapped by the TLB, then those entries will have to be flushed when the access rights on those pages are changed in the page table.

It is also possible for the operating system to ensure that no virtual aliases are simultaneously resident in the cache. The operating system makes this guarantee by enforcing page 35 coloring, which is described below. This has not been used recently, as the hardware cost of detecting and evicting virtual aliases has fallen and the software complexity and performance penalty of perfect page coloring has risen.

It can be useful to distinguish the two functions of tags in an associative cache: they are used to determine which way of the entry set to select, and they are used to determine if the cache hit or missed. The second function must always be correct, but it is permissible for the first function to guess, and get the wrong answer occasionally.

Some processors have caches with both virtual and physical tags. The virtual tags are used for way selection, and the physical tags are used for determining hit or miss. This kind of cache enjoys the latency advantage of a virtually tagged cache, and the simple software interface of a physically tagged cache. It bears the added cost of duplicated tags, however. Also, during miss processing, the alternate ways of the cache line indexed have to be probed for virtual aliases and any matches evicted.

The extra area (and some latency) can be mitigated by keeping virtual hints with each cache entry instead of virtual tags. These hints are a subset or hash of the virtual tag, and are used for selecting the way of the cache from which to get data and a physical tag. Like a virtually tagged cache, there may be a virtual hint match but physical tag mismatch, in which case the cache entry with the matching hint must be evicted so that cache accesses after the cache fill at this address will have just one hint match. Since virtual hints have fewer bits than virtual tags distinguishing them from one another, a virtually hinted cache suffers more conflict misses than a virtually tagged cache.

Perhaps the ultimate reduction of virtual hints can be found in the Pentium 4 (Willamette and Northwood cores). In these processors the virtual hint is effectively 2 bits, and the cache is 4-way set associative. Effectively, the hardware maintains a simple permutation from virtual address to cache index, so that no content-addressable memory (CAM) is necessary to select the right one of the four ways fetched.

Die Stack Heat Fan Out—Chimneys

Reference is made to PCT/EP 2009/007415, Vorbach, which will be used for further explanation of the implementation details and is incorporated by reference into this patent application for full disclosure. A CNT chimney based heat spreading system for die stack is described in the patents, particularly in FIG. 21.

The described chimneys are closed at the bottom and are filled with air (as the typical surrounding gas during manufacturing).

The cooling capabilities of Chimneys can be further improved by enabling convection.

One approach to optimize the cooling capabilities of the chimneys is to open the bottom, by e.g. removing the metal (e.g. remaining silicon and/or the catalyst) on the bottom of the chimney. Various removal methods may be applied, e.g. etching, grinding, drilling, etc. The now opened chimney offer a much better airflow and convection, leading to an improved cooling of the die stack.

Further improve can be achieved by surrounding the die stack with a coolant, which vaporized in the chimneys and returns through capillary action. While a variety of working fluids are known, e.g. water, ethanol, acetone, sodium or mercury, ideally non-toxic, non-corrosive coolants with high electrical resistance are chosen. Alternatively or additionally the surfaces of the die stack may be coated for reducing the risk of corrosion. The carbon nanotubes (CNTs) within the chimney are highly resistant to corrosion.

A greater distance between the die stack and the substrate, the die stack is mounted on, is preferred for allowing the coolant (it may be air or a liquid) to enter the chimneys. The methods may be used alternatively or in combination:
1. Higher bumps are used for flip-chip die (pillars instead balls)
2. The pads on the substrate are elevated, e.g. by adding metal with a chemical (e.g. galvanic) or physical process or by removing material surrounding the pads
3. Capillaries may be milled into the bottom die, e.g. with chemical or plasma etching, laser milling or nano-machining Various manufacturing methods may be used, for example: The die stack may be mounted on the substrate, the package walls are mounted and before closing the lid, the liquid is inserted. In particular the lid may by mounted under the or surrounded by the liquid.

The die stack may be mounted on the substrate, the whole package is mounted and the lid is closed. Then, through one or a plurality of holes the liquid is inserted with pressure.

The hole(s) is/are then closed, e.g. using by soldering or gluing. Obviously, it is useful to have at least one hole for allowing the air to exhaust.

The excavation of the cavity for a chimney through the whole die stack may be no precise enough. For example using etching may lead to a much wider cavity at the beginning than at the end. Particularly the cavity might be unacceptably wide at the beginning.

This can be avoided, by caving the cavity into each die separately, before putting the die together to form the stack. Glue and insulator my now fill the cavity, which either must be avoided and/or removed after putting the die stack together.

In one embodiment, cavities are filled afterwards with a low resistance weak filler material, which is easy to remove. Note: Low resistance does not refer to electrical resistance but mechanical and/or chemical resistance. Depending on the removal method, different kind of fillers might be used. It could be for example a highly corrosive metal (e.g. Magnesium, Zinc, Beryllium, Cadmium, etc) for removal with chemical etching; or a structurally weak material (e.g. Tin, Lead, Wax, (some) Polymers, etc) for removal by drilling or micro-machining; or a thermally weak material (e.g. Tin, Lead, Wax, Thermoplastic, etc) for removal by laser. The low resistance weak materials fill the cavity but allow easy removal with minimum negative impact on the cavity walls after the die stack has been put together.

Alternatively or additionally in one embodiment the cavity walls may be coated with a passivation making it less vulnerable for the second excavation process. The passivation may be a metal (e.g. Graphite, Palladium, Platinum, Gold, Silver, Titanium, Stainless Steel), an oxide (e.g. Aluminium Oxide 20 $Al_2O_3$), glass or some polymers.

During assembly of the die stack, likely glue and/or silicon glass, Silicon Nitride (SiN) and/or Oxide ($SiO_2$) may get into the cavity. Those materials are typically removed using Hydrogen Fluoride (HF). In this case ideally the coating consists of Gold or Platinum which are not affected by HF or Silver, Copper or Lead which are highly resistant.

In yet another embodiment, different excavation methods are used for the first excavation of the die and the second excavation to clear the cavity after assembly of the die stack. For instance could a mechanically weak material having good thermal conductivity, such as copper or silver be implemented in the area of the chimney when building the chip. The first excavation is then done mechanically or by laser. After assembly of the die stack, the chimney is then cleaned with Hydrogen Fluoride (HF), which has only marginal affect on e.g. copper or silver.

After cleaning the cavity, the CNT is grown as described in the referenced patent. Various patent and literature documents are incorporated by reference into this specification for full disclosure and it is expressively stated, that using these methods within the scope of and in conjunction with this invention is regarded inventive per se and might be claimed.

Thus, what has been described is, inter alia, a single pack-age multi-core processor, comprising at least four processor cores, each core having a local LEVEL-1 cache, a tree communication structure combining the multiple LEVEL-1 caches, the tree having nodes, the processor cores with the respective local caches being leaves of the tree, a LEVEL-2 cache being root node of the tree; wherein each node checks whether a requested address is stored downstream the node, and if the requested address is stored downstream the node, the request is sent down the tree and the according data is delivered from a downstream LEVEL-1 cache, or if the requested address is not stored downstream the node, it is requested from an upstream node.

Furthermore, it has been suggested that in a single package multi-core the highest level node request addresses from the nearest LEVEL-2 cache, in case the requested address is not stored downstream the node and/or that each address is only cached once in the cache structure, and data is delivered from the according cache to cores requesting the address and/or that processing software is optimizing the locality of data in the LEVEL-1 cache vicinities during operation and/or that processing task or threads are optimized for keeping shared data local in vicinities of LEVEL-1 caches and/or that at least some of the nodes comprising a lookup table for referencing a requested address to the cache storing data related of the address and/or that at least some of the nodes are capable of handling multiple transfers and/or accesses in parallel and/or that at least some of the edges comprise a plurality of buses, the plurality of buses supporting a plurality of data transfers in parallel and/or that an arbiter selects a free unused bus for a node or cache requesting a bus.

Furthermore, a cache system for multi-core processors has been suggested, wherein each core has a closely coupled level 1 data cache, wherein an address is cached only once within all level 1 caches of the processor, at least some processors have access to the level 1 cache of at least one other processor for transmitting data, the at least some processors having an extended cache tag structure for storing a reference between an address and the at least one other processor having the data of the respective address cached.

Also, what has been suggested is a cache system for multi-core processors, each core having a closely coupled level 1 data cache, wherein an address is cached only once within all level 1 caches of the processor; and means to move the cache line related to an address from the cache of the core owning the cache line into the cache of the core requesting the address, in particular wherein the level 1 caches are interconnected by a tree structure, and/or wherein the move of the cache line is triggered by an access of a core being nominated as preferred owner, and/or wherein the move of the cache line is triggered by counter reaching a threshold value and/or wherein threshold value is defined by at least one of the application software and the operating system and/or wherein threshold value is defined by the owner of the cache line.

Furthermore, what has been suggested as well is a method for operating a level 1 caches in a multi-core processor, wherein an address is cached only once within all level 1 caches of the processor; and the cache line related to an address is moved from the cache of the core owning the cache line into the cache of the core requesting the address, preferably wherein the level 1 caches are interconnected by a tree structure and/or wherein the move of the cache line is triggered by an access of a core being nominated as preferred owner and/or wherein the move of the cache line is triggered by counter reaching a threshold value and/or wherein threshold value is defined by at least one of the application software and the operating system, and/or wherein threshold value is defined by the owner of the cache line.

Also, a single package multi-core processor has been suggested, comprising at least four processor cores, each core having a local LEVEL-1 cache, a tree communication structure combining the multiple LEVEL-1 caches, the tree having nodes, the processor cores with the respective local caches being leaves of the tree, a LEVEL-2 cache being root node of the tree, wherein at least some of the edges between the nodes comprise a plurality of buses being capable of handling multiple accesses and/or transfers in parallel; preferably wherein the at least some edges having of the plurality buses comprising an arbiter for allocating free buses for a requesting node or cache.

It should be noted that a single package multi-core processor has been suggested, comprising at least four processor cores, each core having a local LEVEL-1 cache, a tree communication structure combining the multiple LEVEL-1 caches, the tree having nodes, the processor cores with the respective local caches being leaves of the tree, a LEVEL-2 cache being root node of the tree; wherein at least some of the node being capable of handling multiple accesses and/or transfers in parallel; and that a single package multi-core processor has been suggested, comprising at least two processor cores, each core having a local LEVEL-1 cache, a tree communication structure combining the multiple LEVEL-1 caches, the tree having at least one node, and TAG information is associated to the data managed within the tree, defining the treatment of the data, wherein preferably at least some of the TAGs are used for implementing locks.

Furthermore, a processor system has been suggested, comprising at least two processor cores, and TAG information is associated to the data managed within the tree, defining the treatment of the data and/or wherein at least some of the TAGs are used for implementing locks.

Furthermore, a single package multi-core processor has been suggested comprising at least two processor cores, each core having a local LEVEL-1 cache, a tree communication structure combining the multiple LEVEL-1 caches, the tree having at least one node, and the cores are capable of accessing data in each others LEVEL-1 caches at runtime, and also, a single package processor has been suggested comprising at least one processor core, and a local memory; wherein the local memory's physical address space is defined by a window within the virtual address space, wherein preferably the local memory is a tightly coupled memory and/or the local memory is a locally coupled memory and/or wherein access rights for accessing the physical address space of the local memory are checked.

It should be noted that the above list of suggestions made in the preceding disclosure is not to be construed to limit the disclosure to the aspects listed above, but is meant to re-mind the reader of at least some of the aspects that are disclosed and considered inventive.

The invention claimed is:

1. A method for operating a data processing system, comprising:
   retrieving a thread for execution by at least one processor core of a plurality of processor cores connected to a data memory structure, wherein the data memory structure includes:
      one or more dedicated Level-1 data caches included in each of the plurality of processor cores, and
      a combined memory hierarchy physically connected to the one or more dedicated Level-1 data caches, the combined memory hierarchy having one or more shared higher level caches and a main memory, wherein the one or more shared higher level caches are at a level above the one or more dedicated Level-1 data caches;
   executing the thread, including associating tag information with data transmitted within the data memory structure, wherein the tag information is stored in respective Level-1 data caches of the one or more dedicated Level-1 data caches, and wherein the tag information defines a movement of the associated data in the data memory structure between the one or more shared higher level caches of the combined memory hierarchy; and
   managing, based on the tag information, at least one of:
      transmission of the data within the combined memory hierarchy, and
      transmission of the data between the combined memory hierarchy and one or more of the plurality of processor cores.

2. The method of claim 1 wherein the one or more shared higher level caches include a plurality of higher level caches arranged in a tree structure.

3. The method of claim 1 wherein the one or more shared higher level caches include a plurality of higher level caches arranged in a ring structure.

4. The method of claim 1 wherein the tag information is included in a cache tag.

5. The method of claim 1 wherein the tag information is attached to data that is at least one of:
   stored in the data memory structure; and
   transmitted in the data memory structure.

6. The method of claim 1 wherein the tag information is attached to a variable that is at least one of:
   stored in the data memory structure; and
   transmitted in the data memory structure.

7. The method of claim 1 wherein the tag information is located within a descriptor table.

8. The method of claim 1 wherein the tag information defines a positioning of the associated data in the data memory structure, wherein the positioning indicates one of:
   at least one of the one or more dedicated level-1 caches,
   at least one of the one or more shared higher level caches, and
   the main memory.

9. The method of claim 1 wherein the tag information defines a location of the associated data in the data memory structure.

10. The method of claim 1 wherein the tag information defines duplication of the associated data in the data memory structure.

11. The method of claim 1 wherein the tag information defines access to associated data stored in the data memory structure.

12. The method of claim 1 wherein the tag information is generated by a thread executed on one or multiple of the plurality of processor cores at an execution time of a program.

13. The method of claim 12 wherein the tag information is defined by at least one of the following executed on the one or multiple of the plurality of processor cores:
   an operating system,
   a runtime profiler,
   an optimizer, and
   a profiler embedded in code.

14. The method of claim 1 wherein the tag information is included in one or more tags generated at a compile time of a program.

15. The method of claim 1 wherein the tag information is defined at a software design time by one of:
   a programmer,
   a profiler, and
   a compiler.

16. The method of claim 1 wherein the tag information defines an ownership of the associated data by one or more threads executed on at least one of the plurality of processor cores.

17. The method of claim 1 wherein the tag information indicates at least one of:
   which of the plurality of processor cores owns the associated data;
   that the associated data is read-only;
   that the associated data can be duplicated;
   that the associated data is more frequently read from the data memory structure than written to the data memory structure;
   that the associated data is more frequently written to the data memory structure than read from the data memory structure;
   that associated data is written to the data memory structure and read from the data memory structure with approximately equal occurrence;
   that data associated with the tag information is written by a single source thread and read by a plurality of threads; and
   that the data associated with the tag information is randomly accessed by one or more of the plurality of processor cores.

18. A data processing system comprising:
   a plurality of processor cores; and
   a data memory structure connected to the plurality of processor cores, the data memory structure including:
      one or more dedicated Level-1 data caches included in each of the plurality of processor cores; and
   a combined memory hierarchy physically connected to the one or more dedicated Level-1 data caches, the combined memory hierarchy having one or more shared higher level caches and a main memory, wherein the one or more shared higher level caches are at a level above the one or more dedicated Level-1 data caches,
   wherein at least one processor core of the plurality of processor cores executes a thread, including associating tag information with data transmitted within the data memory structure, wherein the tag information is stored in respective Level-1 data caches of the one or more dedicated Level-1 data caches, wherein the tag information defines a movement of the associated data in the data memory structure between the one or more shared higher level caches of the combined memory hierarchy, and
   wherein the at least one processor core manages, based on the tag information, at least one of:
      transmission of the data within the combined memory hierarchy, and
      transmission of the data between the combined memory hierarchy and one or more of the plurality of processor cores.

19. The data processing system of claim 18 wherein the tag information defines management of associated data in the data memory structure.

* * * * *